(12) United States Patent
Falco et al.

(10) Patent No.: US 10,521,282 B2
(45) Date of Patent: *Dec. 31, 2019

(54) SYSTEM AND METHOD FOR PROVIDING A MESSAGING APPLICATION PROGRAM INTERFACE

(71) Applicant: ORACLE INTERNATIONAL CORPORATION, Redwood Shores, CA (US)

(72) Inventors: Mark Falco, Burlington, MA (US); Patrik Torstensson, Stockholm (SE); Gene Gleyzer, Lexington, MA (US); Cameron Purdy, Wilmington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/282,985

(22) Filed: Sep. 30, 2016

(65) Prior Publication Data

US 2017/0017532 A1    Jan. 19, 2017

Related U.S. Application Data

(63) Continuation of application No. 13/473,432, filed on May 16, 2012, now Pat. No. 9,477,536.
(Continued)

(51) Int. Cl.
*G06F 15/167* (2006.01)
*G06F 9/54* (2006.01)

(52) U.S. Cl.
CPC .............. *G06F 9/546* (2013.01); *G06F 9/541* (2013.01)

(58) Field of Classification Search
CPC .................................. G06F 9/546; G06F 9/541
See application file for complete search history.

(56) References Cited

U.S. PATENT DOCUMENTS 5,815,677 A    9/1998  Goodrum
6,615,383 B1 * 9/2003  Talluri .................. H04L 1/1614
                                              714/749
(Continued)

FOREIGN PATENT DOCUMENTS

CN    1491382    4/2004
JP    2005-310130    11/2005
JP    2006-516054    6/2006

OTHER PUBLICATIONS

Application No. 20660256784, dated Nov. 16, 2006, Feng et al.
(Continued)

*Primary Examiner* — Hua Fan
(74) *Attorney, Agent, or Firm* — Tucker Ellis LLP

(57) ABSTRACT

A system and method for providing a message bus component or version thereof (referred to herein as an implementation), and a messaging application program interface, for use in an enterprise data center, middleware machine system, or similar environment that includes a plurality of processor nodes together with a high-performance communication fabric (or communication mechanism) such as InfiniBand. In accordance with an embodiment, the messaging application program interface enables features such as asynchronous messaging, low latency, and high data throughput, and supports the use of in-memory data grid, application server, and other middleware components.

20 Claims, 5 Drawing Sheets

Related U.S. Application Data

(60) Provisional application No. 61/486,672, filed on May 16, 2011, provisional application No. 61/541,961, filed on Sep. 30, 2011, provisional application No. 61/646,826, filed on May 14, 2012.

(56) References Cited

U.S. PATENT DOCUMENTS

| | | | |
|---|---|---|---|
| 7,069,305 | B2 | 6/2006 | Serizawa et al. |
| 7,788,437 | B2 | 8/2010 | Schlansker et al. |
| 8,108,538 | B2 | 1/2012 | Oved |
| 8,244,826 | B2* | 8/2012 | Benner ............... H04L 67/1097 709/212 |
| 8,281,324 | B2 | 10/2012 | Kaehler et al. |
| 8,935,707 | B2 | 1/2015 | Falco et al. |
| 2002/0161848 | A1* | 10/2002 | Willman ................ G06F 9/54 709/213 |
| 2004/0049774 | A1* | 3/2004 | Boyd .................. G06F 11/2005 719/312 |
| 2005/0132327 | A1 | 6/2005 | Mountain |
| 2006/0256784 | A1* | 11/2006 | Feng ....................... G06F 13/28 370/381 |
| 2007/0288587 | A1* | 12/2007 | Aguilera .............. G06F 9/466 709/214 |
| 2011/0106905 | A1* | 5/2011 | Frey ...................... H04L 69/166 709/212 |
| 2012/0265837 | A1* | 10/2012 | Grant .................... H04L 67/025 709/212 |
| 2014/0126715 | A1 | 5/2014 | Lum et al. |

OTHER PUBLICATIONS

Attiya, "Sharing Memory Robustly in Message-Passing System", Journal of the Association for Computing Machinery, vol. 42, No. 1, Jan. 1995, pp. 124-142.

Cai, "Non-threaded and Threaded Approaches to MultiRail Communication with uDAPL, Network and Parallel Computing", 2009, NPC '09, Sixth IFIP International Conference, Oct. 19, 2009, pp. 233-239.

International Search Report dated Sep. 11, 2012 for Application No. PCT/US2012/038178, 15 pages.

Nakashima, et al., "Design and Evaluation of a Virtual Machine Migration Using RDMA Data Transfer Mechanism over 10 Gb Ethernet", Dec. 15, 2007, pp. 69-82, vol. 48, No. SIG 18(ACS 20), Journal of Information Processing, Information Processing Society of Japan.

Sur, RDMA Read Based Rendezvous Protocol for MPI over InfiniBand: Design Alternatives and Benefits, Proceedings of the Eleventh ADM Sigplan Symposium on Principles and Practice of Parallel Programming, Jan. 2006, pp. 32-39.

Taboada, Efficient Java Communication Libraries over InfiniBand, High Performance Computing and Communications, 2009, HPCC '09, 11th IEEE International Conference, IEEE, Jun. 25, 1999, pp. 329-338.

United States Patent and Trademark Office, Office Action dated Jun. 19, 2014 for U.S. Appl. No. 13/693,764, 23 Pages.

United States Patent and Trademark Office, Notice of Allowance dated Nov. 14, 2014 For U.S. Appl. No. 13/693,764, 17 Pages.

United States Patent and Trademark Office, Office Action dated Mar. 10, 2015 for U.S. Appl. No. 13/473,432, 17 Pages.

United States Patent and Trademark Office, Office Action dated Aug. 7, 2015 for U.S. Appl. No. 13/473,432, 11 Pages.

* cited by examiner

SYSTEM AND METHOD FOR PROVIDING A MESSAGING APPLICATION PROGRAM INTERFACE

CLAIM OF PRIORITY

This application is a continuation of U.S. patent application titled "SYSTEM AND METHOD FOR PROVIDING A MESSAGING APPLICATION PROGRAM INTERFACE", application Ser. No. 13/473,432, filed on May 15, 2012; which claims the benefit of priority to U.S. Provisional Patent Application titled "SYSTEM AND METHOD FOR PROVIDING A MESSAGING API FOR USE IN A MIDDLEWARE MACHINE SYSTEM", Application No. 61/486,672, filed on May 16, 2011; U.S. Provisional Patent Application titled "SYSTEM AND METHOD FOR PROVIDING A MESSAGING API FOR USE IN A MIDDLEWARE MACHINE SYSTEM", Application No. 61/541,961, filed on Sep. 30, 2011; and U.S. Provisional Patent Application titled "SYSTEM AND METHOD FOR PROVIDING A MESSAGING API FOR USE IN A MIDDLEWARE MACHINE SYSTEM", Application No. 61/646,826, filed on May 14, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to enterprise data centers and middleware, and is particularly related to a system and method for providing a messaging application program interface, for use in an enterprise data center, middleware machine system, or similar environment.

BACKGROUND

Modern high-performance enterprise data centers and middleware machine systems, such as Oracle's Exadata and Exalogic computer appliances, combine computer hardware and middleware software components that are engineered to work closely together. For example, a typical Exalogic appliance includes a cluster of processor nodes, each running one or more operating systems, virtual machines, application servers, and in-memory data grid software components; together with one or more storage or input/output nodes; all communicating with one another over high-speed communication fabrics.

In a multiple-node environment, such as an Exalogic-based environment, communicating efficiently between the multiple nodes and the software components executing thereon is an important factor in determining overall system performance. To address this, technologies such as InfiniBand can be used to provide a communication fabric between the nodes, which in turn delivers high data throughput, low latency, quality of service, failover, and scalability. These are the types of computing environments in which embodiments of the invention can be used.

SUMMARY

Disclosed herein is a system and method for providing a message bus component or version thereof (referred to herein as an implementation), and a messaging application program interface, for use in an enterprise data center, middleware machine system, or similar environment that includes a plurality of processor nodes together with a high-performance communication fabric (or communication mechanism) such as InfiniBand. In accordance with an embodiment, the messaging application program interface enables features such as asynchronous messaging, low latency, and high data throughput, and supports the use of in-memory data grid, application server, and other middleware components.

DETAILED DESCRIPTION

As described above, high-performance enterprise data centers and middleware machine systems, such as Oracle's Exadata and Exalogic appliances, combine hardware and middleware software components that are engineered to work closely together. For example, a typical Exalogic appliance can include a cluster of processor nodes, each running one or more operating systems, virtual machines, application servers, and in-memory data grid software components; together with one or more storage or input/output (I/O) nodes; all communicating with one another over InfiniBand.

To further improve both usability and performance in such environments, disclosed herein is a system and method for providing a message bus component or version thereof (referred to herein as an implementation), and a messaging application program interface (API), for use in an enterprise data center, middleware machine system, or similar environment. In accordance with an embodiment, the messaging API supports the use and increases performance of in-memory data grid components (e.g., Oracle Coherence), application server components (e.g., Oracle WebLogic), and other middleware components.

Generally described, an Exalogic environment includes one or more Exalogic appliances. Each Exalogic appliance is an enterprise-level computer system that can be provisioned in a variety of different rack configurations utilizing, e.g., SPARC, X86 or other microprocessors. A typical Exalogic configuration includes a plurality of hot-swappable processor nodes and high-performance disk storage subsystems, coupled with a high-bandwidth InfiniBand fabric (or communication mechanism) that enables communication between the software, input/output (I/O), and other components within each node, between different nodes within a particular appliance, and between nodes distributed over two or more different appliances.

Exalogic configurations are designed to be fully redundant, with no single point of failure. In addition to providing an extremely fast, high data throughput interconnection between the hardware components, communication fabrics such as InfiniBand also allow for scaling, application isolation, and elasticity. All of the components with a particular Exalogic environment, including those located within a single appliance and within multiple appliances forming part of the same environment, essentially appear and operate together as a single, high-performance, computer system.

In accordance with an embodiment, referred to herein as Exabus, a message bus implementation and a messaging API (referred to herein as MessageBus) can be provided. Embodiments of the messaging API can be used as a general purpose messaging interface, and are particularly useful when used in combination with, e.g., Coherence or WebLogic components, as part of an Exalogic environment.

Figure 1:
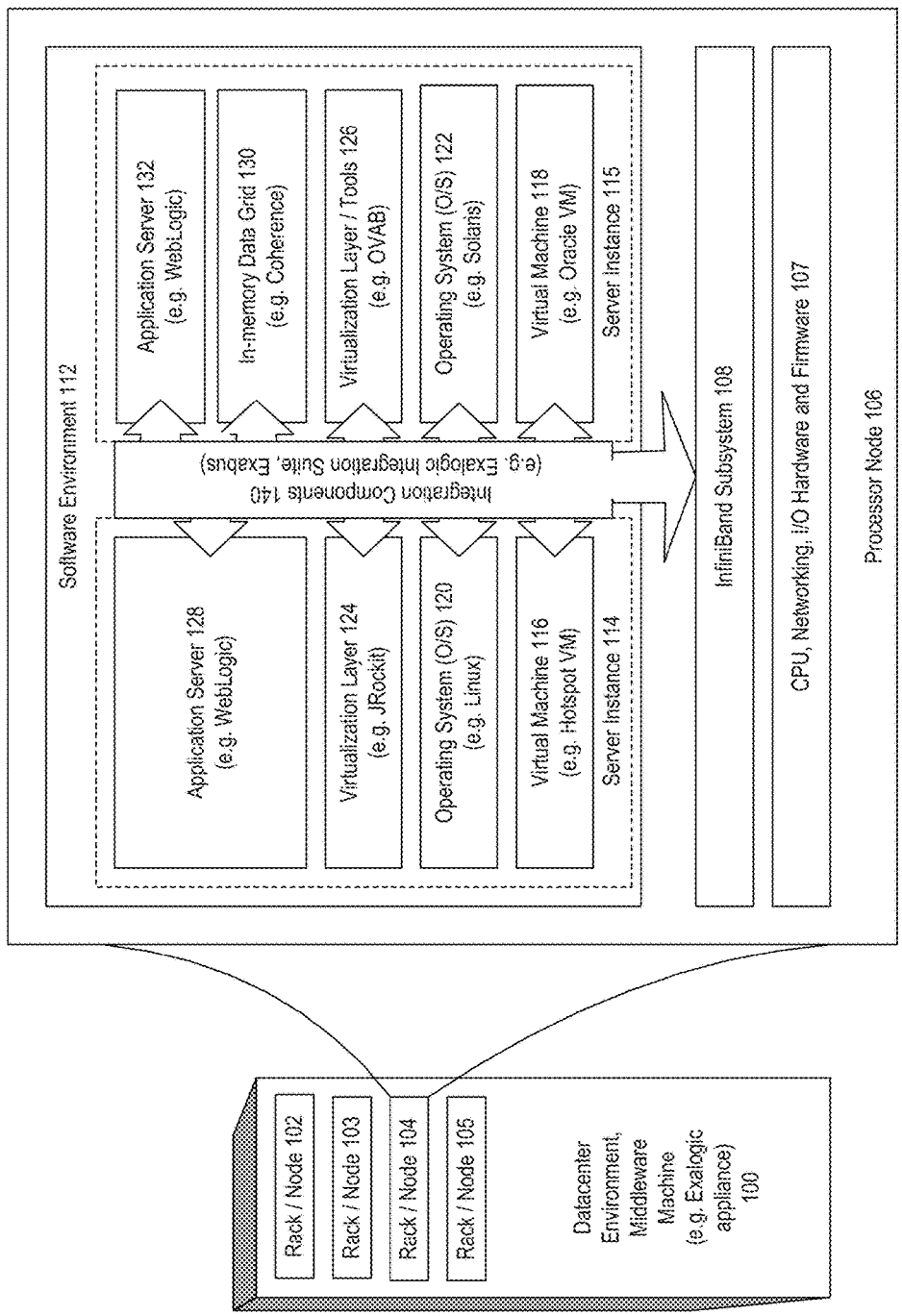
FIG. 1 illustrates an enterprise data center or middleware machine system, such as an Exalogic appliance, which includes a plurality of processor nodes in communication with one another via a communication fabric such as InfiniBand, in accordance with an embodiment.

FIG. 1 illustrates an enterprise data center or middleware machine system, such as an Exalogic appliance, which includes a plurality of processor nodes in communication with one another via a communication fabric such as InfiniBand, in accordance with an embodiment.

As shown in FIG. 1, a typical Exalogic appliance 100 includes a plurality of rack components 102, 103, 104, 105, such as processor nodes, I/O nodes, or high-performance disk subsystems. Typically, each Exalogic processor node 106 includes a computer hardware 107 (e.g., a plurality of 64-bit processors with high performance large memory, networking I/O, and firmware) and an InfiniBand subsystem 108 that provides InfiniBand connectivity. Each processor node also supports a software environment 112 that, depending on the particular needs of an organization, can be provisioned with a variety of different application server instances or other software components.

For example, as illustrated in FIG. 1, in accordance with an embodiment, a first application server instance 114 can comprise a virtual machine 116 (e.g., Hotspot), an operating system 120 (e.g., Linux), a virtualization layer 124 (e.g., JRockit), and an application server 128 (e.g., WebLogic). A second application server instance 115 can comprise a different virtual machine 118 (e.g., Oracle VM), a different operating system 122 (e.g., Solaris), a different virtualization layer and tools 126 (e.g., Oracle Virtual Assembly Builder, OVAB), and in the example shown, both an in-memory data grid layer 130 (e.g., Coherence), and an application server 132 (e.g., WebLogic).

The particular types and arrangement of server instances and software components shown in FIG. 1 are provided for purposes of illustration. In accordance with other embodiments, different types and arrangements of server instances and software components can be used, depending on the particular needs of an organization.

In accordance with an embodiment, each of the application server instances within an Exalogic environment can communicate with one another, with its own hardware or processor node, and with other hardware or processor nodes, using an integration component 140, such as an Exalogic integration suite and/or Exabus and the message bus implementation and messaging API it provides. In accordance with an embodiment, Exabus also includes support for InfiniBand, and Remote Direct Memory Access (RDMA), and can be optimized for high data throughput and low latency between nodes and components executing thereon, as described in further detail below.

Figure 2:
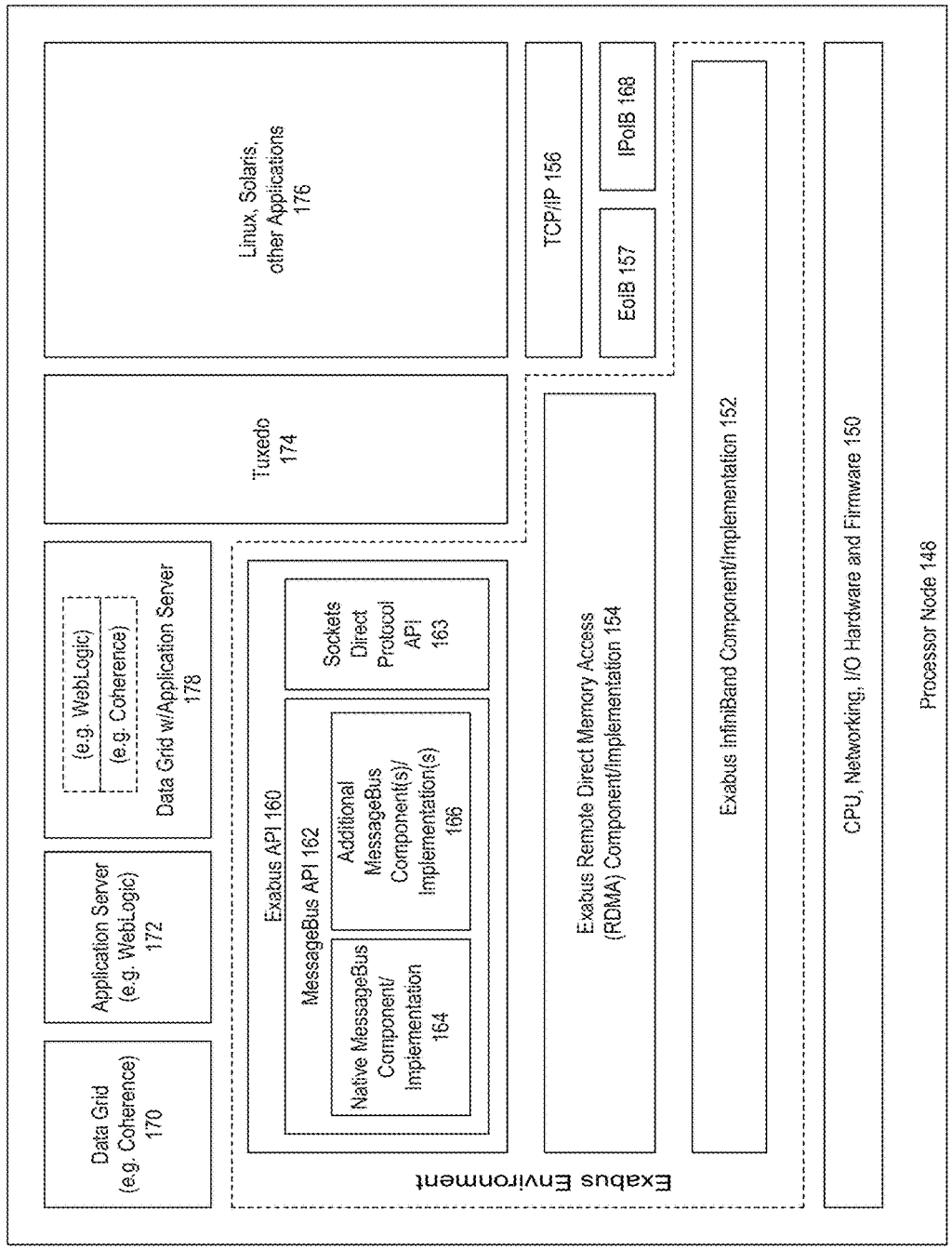
FIG. 2 illustrates a system for providing a message bus component/implementation and a messaging application program interface for use with an enterprise data center or middleware machine system, such as an Exalogic appliance, in accordance with an embodiment.

FIG. 2 illustrates a system for providing a message bus implementation and a messaging API for use with an enterprise data center or middleware machine system, such as an Exalogic appliance, in accordance with an embodiment.

As shown in FIG. 2, each or a selection of the processor nodes 148 in the Exalogic appliance can include a computer hardware 150, together with an Exabus environment which, as further shown in FIG. 2, can include an Exabus InfiniBand component/implementation 152, an Exabus RDMA component/implementation 154, and an Exabus API 160.

In accordance with an embodiment, the Exabus API can be extended to include several variants, such as, e.g., a MessageBus API 162 and a Sockets Direct Protocol (SDP) API 163, which can then be selected to best address the particular needs of an organization. In accordance with an embodiment, the MessageBus API can also be extended to include several variants such as, e.g., a native MessageBus implementation 164, or another MessageBus implementation 166, which again can then be selected to best address the particular needs of an organization. The Exabus environment, together with its API's, enables hardware nodes, middleware components and applications executing thereon to communicate efficiently with one another via a communication fabric such as InfiniBand, including those components and applications located within a particular appliance, or distributed over multiple appliances.

For example, in accordance with the embodiment illustrated in FIG. 2, an in-memory data grid component (e.g., Coherence) 170, an application server component (e.g., WebLogic) 172, and applications executing thereon, can communicate with one another, and with other nodes and other software components and applications, using Exabus. As another example, a WebLogic application server component can run atop, e.g., Coherence 178, and can use Coherence's functionality to access Exabus and thence communicate with other applications.

As further illustrated in FIG. 2, in accordance with an embodiment, other transaction processing systems (e.g., Tuxedo) 174, and other applications, e.g., Linux or Solaris applications 176, can similarly communicate with one another and with other processor nodes and other software components and applications using Exabus, including, where appropriate, the use of additional components such as Transmission Control Protocol/Internet Protocol (TCP/IP) 156, Ethernet over InfiniBand (EoIB) 157, and IP over InfiniBand (IPoIB) 168 components.

The types and arrangement of the various Exabus components shown in FIG. 2, including the API's, and the in-memory data grid and application server components that use those API's, are provided for purposes of illustration. In accordance with other embodiments, different Exabus configurations and types and arrangements of components can be used, depending on the particular needs of an organization.

Figure 3:
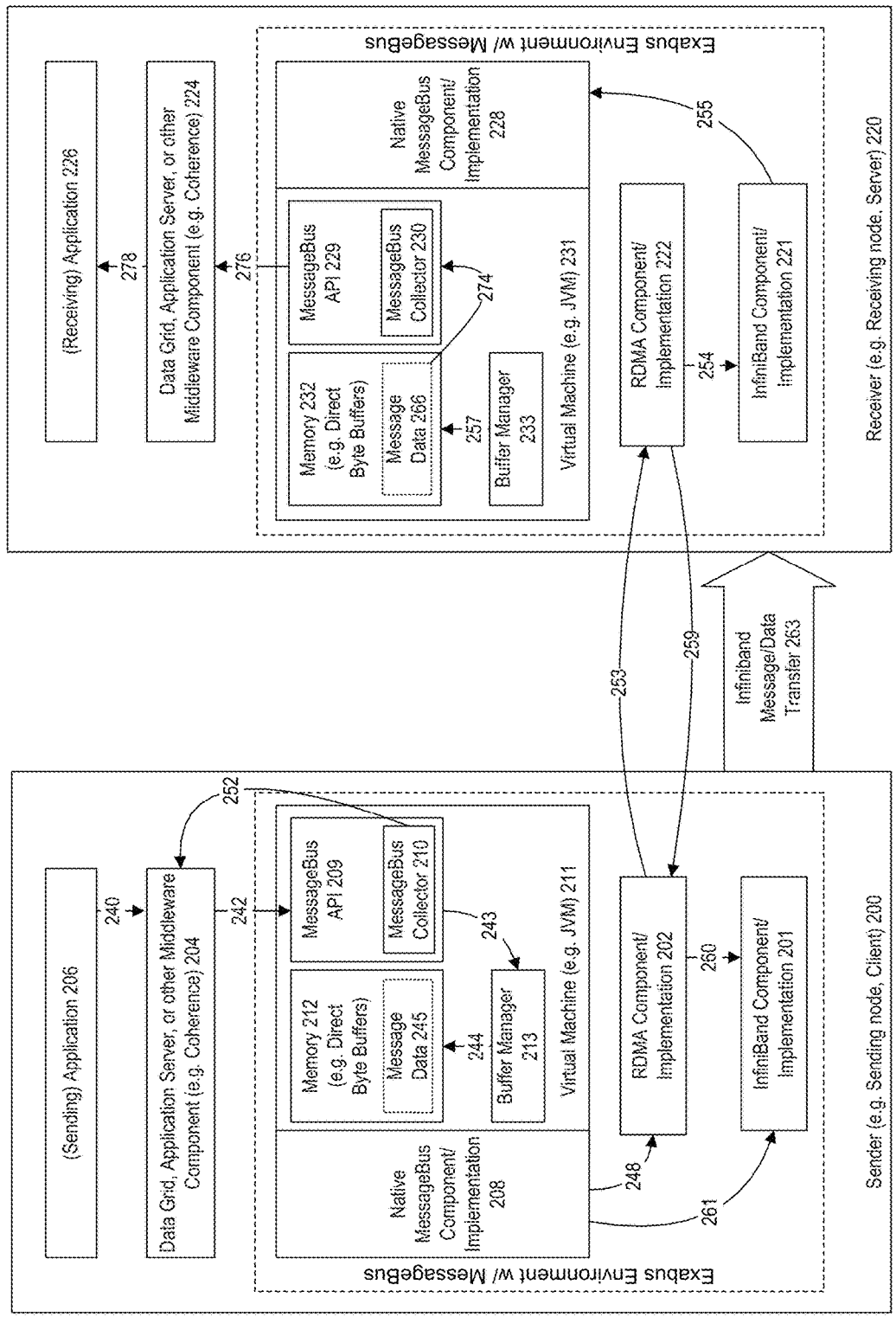
FIG. 3 illustrates the use of a messaging application program interface, in accordance with an embodiment.

FIG. 3 illustrates the use of a messaging API, in accordance with an embodiment. As shown in FIG. 3, a sender 200 (e.g., a sending node acting as a client) includes an Exabus environment having an InfiniBand component/ implementation 201, an RDMA component/implementation 202, a native MessageBus component/implementation 208, and a MessageBus API 209.

In accordance with an embodiment, the native MessageBus implementation includes a collector 210, for collecting events as they occur, and surfacing those events to the application tier. In accordance with an embodiment, the collector can be automatically injected into the MessageBus when an application environment (e.g., Coherence) makes use of the bus. A virtual machine 211, such as a Java Virtual Machine (JVM) includes a buffer manager 213 that maintains system memory in the form of direct byte buffers 212, which in turn are used for storing messages and message data to be transmitted (i.e., sent or received) between nodes or components via InfiniBand. The buffer manager can allocate areas (buffers) of memory within the direct byte buffers, under control of the native MessageBus implementation.

As shown in FIG. 3, a middleware component, such as an in-memory data grid or application server 204 component, can use the MessageBus to communicate with other middleware components. Similarly, a (sending) application 206 can use the middleware component to communicate with other applications, by sending messages or message data to another (receiving) middleware component and application 226 at a receiver 220 (e.g., a receiving node acting as a server). In each of these scenarios, while it may be used by them, the MessageBus is not itself aware of the sending/receiving middleware components (or applications).

As further shown in FIG. 3, the receiver can similarly include an Exabus environment having an InfiniBand component/implementation 221, an RDMA component/implementation 222, a native MessageBus component/implementation 228, a MessageBus API 229, a collector 230, a virtual machine 231 (e.g., JVM), direct byte buffers 232, and a buffer manager 233.

Depending on the particular needs of an organization, the sender and receiver can be on the same processor node, at different processor nodes within the same Exalogic appliance, or at processor nodes at different Exalogic appliances. Although indicated in FIG. 3 as a sender and a receiver, it will be evident that these labels are provided for purposes of illustration. In accordance with an embodiment, the sender can also receive messages from the receiver, and vice versa, such that the sending and receiving nodes and applications may properly be considered peers of one another.

In accordance with an embodiment, the MessageBus can be surfaced as an interface, and obtained via a factory class (in one embodiment, the Depot class), which means that a middleware component or application making use of the bus need not be concerned with the underlying bus implementation. For example, as shown in FIG. 3, at both the sending and receiving nodes, the applications communicate with the MessageBus API via one or more in-memory data grid, application server or other middleware components, the (end-user) application need not be concerned with the particular underlying messaging implementation and messaging API being used. For example, although FIG. 3 illustrates the use of the native MessageBus implementation and MessageBus API, in accordance with other embodiments different messaging implementations and API's can be used, e.g., the SDP API, or another MessageBus implementation, without the end-user application having to be re-programmed to take advantage of the new underlying implementation.

For example, in a Coherence-based environment, Coherence itself need not be aware of the bus implementation. In accordance with an embodiment, the selection of the bus implementation can be expressed in Coherence via the EndPoint name (URL) of each coherence node (i.e., it is part of the coherence configuration). For example, when running with a TCP-based bus the configured EndPoint might be tmb://192.168.1.1:8000; however when running on the native MessageBus the configured EndPoint would be imb://192.168.1.1:8000. In this example, the first part of the EndPoint name identifies both the protocol as well as the implementation. This data is not interpreted by the application (i.e., in this example Coherence), but is simply passed to the bus Depot for resolution. In response, the Depot will select the appropriate bus implementation. Similarly, a Coherence end-user application will be unaware if the underlying MessageBus API is used to communicate messages or message data via InfiniBand. Instead, the Coherence environment can recognize the transport interface being used, and communicate with it accordingly on behalf of the Coherence end-user application. The end-user application will continue to be aware of any ordering of messages, and will receive notification upon arrival of those messages at a particular recipient, but otherwise will perceive only that its messages are processed faster. The MessageBus API can be further extended to accommodate the particular needs of other software components, e.g., WebLogic or other middleware components.

In accordance with an embodiment, the MessageBus implementation surfaces any inbound messages through the use of callbacks. This allows a receiving application to be made aware of any inbound message data on a particular thread, but does not require thread polling as with other techniques. This also enables the benefits of InfiniBand's low latency to be provided upwards to the application tier, and also enables the MessageBus API to support both synchronous and asynchronous communication, and confirmed delivery reporting up to the application tier.

In accordance with an embodiment, the functionality of the virtual machine (e.g., JVM) can be extended such that each virtual machine can read and write directly against its peer's memory over InfiniBand, and so that their direct byte buffers can be registered with the InfiniBand subsystem. These pre-registered buffers can be maintained by the Exabus buffer manager. In accordance with an embodiment, the Java direct byte buffer class can be extended within the JVM to enable the direct byte buffer to automatically register its associated memory with the InfiniBand subsystem, which can then be used for RDMA-based access.

At runtime, when a (sending) application wishes to send a message data 240 (in the form of a message, request, etc) to another node and/or (receiving) application, its underlying middleware component (e.g., Coherence) can communicate 242 with the local MessageBus API and the InfiniBand implementation using a set of verbs. Examples of such verbs can include, e.g.: Send a message to peer; Receive a message from peer; Read from peer's memory space; and Write to peer's memory space. In accordance with other embodiments, additional types of verbs can be supported.

For example, if the sending application wishes to write a message to the receiving application (a typical large message might be 50 Mb in size), the sender's buffer manager can be requested 243 to allocate 244 sufficient memory space for the message data 245, which in accordance with an embodiment can be one or more memory buffers within the extended direct byte buffer that is registered locally with the InfiniBand subsystem. The sender can then write the message to the direct byte buffer, and request the MessageBus API to send the message to the destination peer. Optionally, a receipt 252, such as a Java object, can be returned to the sender, which will ultimately notify the sender of a successful delivery.

As further shown in FIG. 3, when the message data has been written to local memory, the native MessageBus implementation creates a small notification 248, describing the message data to be sent and providing a memory location where the message data is stored locally, and communicates that notification 253 to the receiver.

At the receiver (receiving) application, upon receipt of the notification from the sender, the receiving InfiniBand subsystem instructs 255 the buffer manager to allocate 257 memory space accordingly, and then uses an RDMA-read operation 259 to pull 260, 261, 263 the message from the (sender's) memory space to its (receiver's) memory space. When the operation completes, the receiver will have a copy 266 of the message data in its local memory space. The receiver can then notify the sender to provide its receipt to the (sending) application. At the same time, the receiver can push the message data upwards 274, 276, 278 through the Java space, asynchronously with the sending of the receipt.

In accordance with an embodiment, those memory buffers that are created for use in storing message data can be retained for subsequent use, and surfaced via the MessageBus, to avoid having to frequently register and deregister the buffers.

Although the above functionality is described in the context of InfiniBand, in accordance with other embodiments, the MessageBus API need not utilize or be dependent on InfiniBand, but can also accommodate, e.g., Java or HTTP versions of the API, or other communication fabrics, to provide similar asynchronous functionality.

Figure 4:
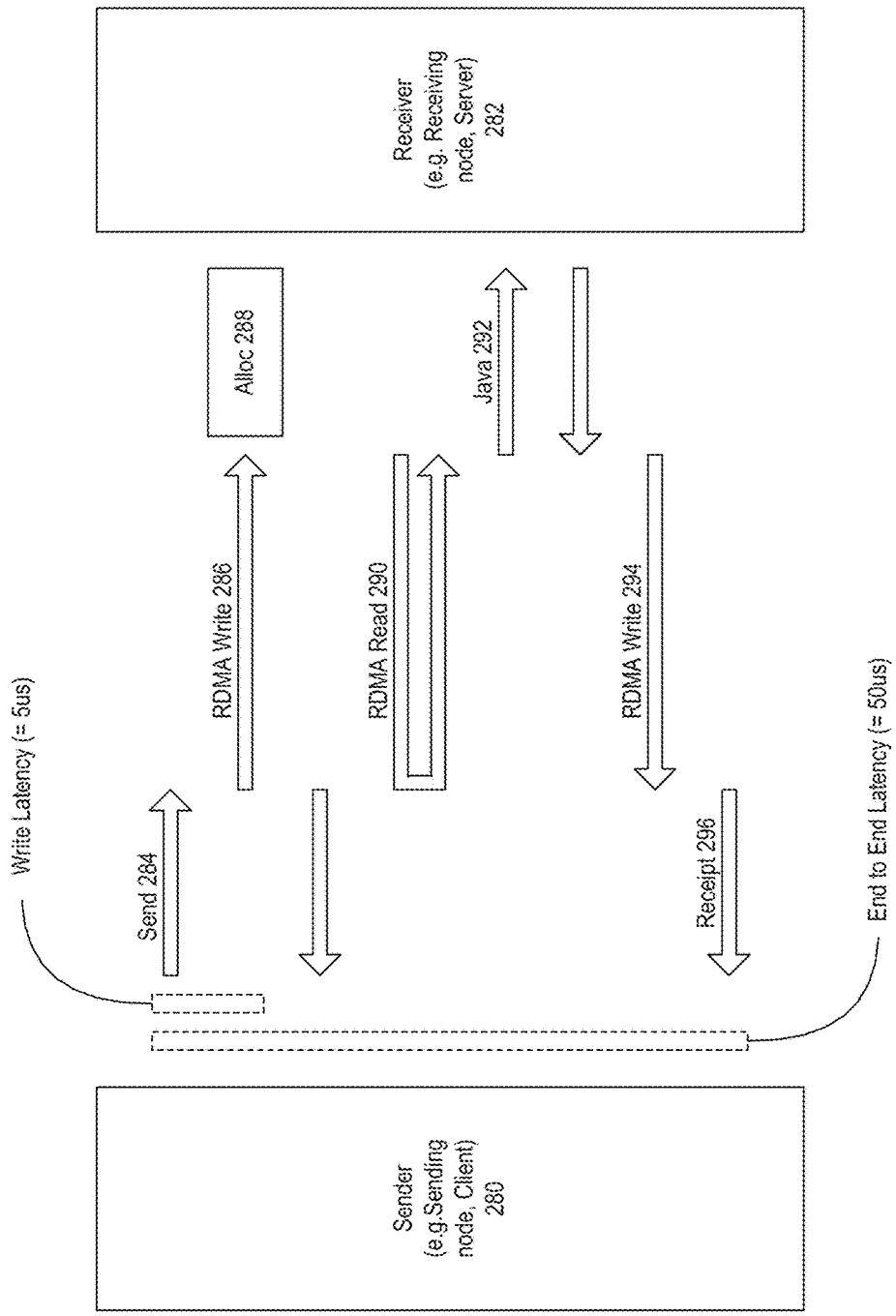
FIG. 4 illustrates the use of a message bus component/implementation and a messaging application program interface, including remote direct memory access, in accordance with an embodiment.

FIG. 4 illustrates the use of a message bus implementation and a messaging application program interface, including remote direct memory access, in accordance with an embodiment. As shown in FIG. 4, the messaging bus RDMA layer can assume the role of an intermediary between a client (sender) 280 and a server (receiver) 282. In accordance with an embodiment, the sender performs a send operation 284, which results in an RDMA write operation 286 on the receiver side, together with a memory allocation (Alloc) 288. The send then returns. The receiver then issues an RDMA read operation 290, and returns the message to Java 292. Thereafter, the receiver notifies the sender with an RDMA write 294, and a receipt 296 to provide to the sender.

It will be noted that as soon as the RDMA write operation has been scheduled, the send will immediately return. In the background, the receiver will receive the write on another thread, schedule the RDMA read, and return. As such, the RDMA operations can be thought of as memory copy operations that can be committed by both sides. For example, an RDMA read operation is really a memory copy operation from the sender to the receiver, but it is initiated from the receiver side.

Figure 5:
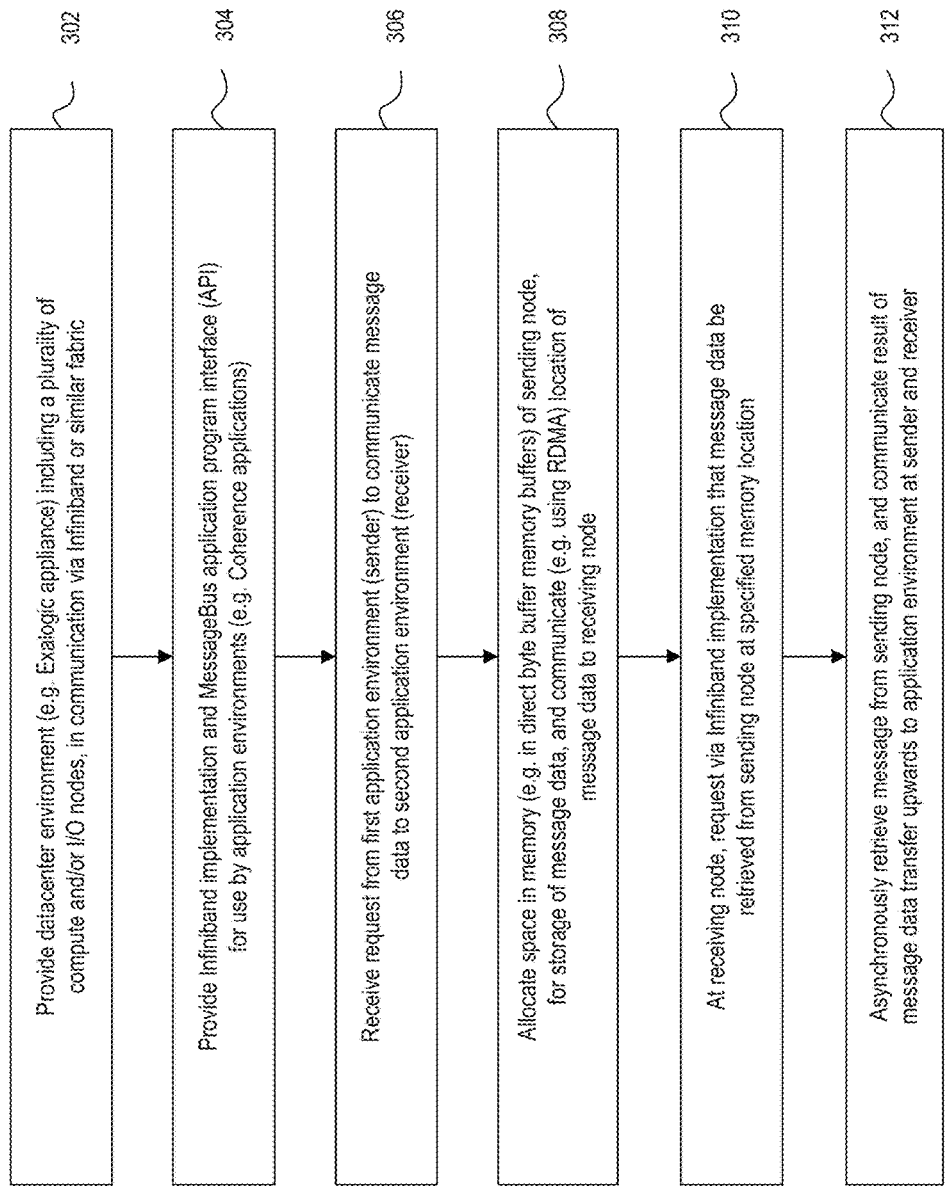
FIG. 5 illustrates a method of providing and using a message bus component/implementation and a messaging application program interface with an enterprise data center or middleware machine system, such as an Exalogic appliance, in accordance with an embodiment.

FIG. 5 illustrates a method of providing and using a message bus implementation and a messaging application program interface with an enterprise data center or middleware machine system, such as an Exalogic appliance, in accordance with an embodiment.

As shown in FIG. 5, at step 302, a datacenter environment or middleware machine system is provided (e.g., an Exalogic appliance) including a plurality of compute and/or I/O nodes, in communication via InfiniBand or similar communication fabric.

At step 304, an InfiniBand implementation and MessageBus component are provided, including an application program interface for use by application environments (e.g., Coherence applications).

At step 306, a request is issued by a first application environment (e.g., a sending node, sender) to communicate message data to a second application environment (e.g., a receiving node, receiver).

At step 308, space is allocated in the memory (e.g., direct byte buffer) of the sending node for storage of the message data, and a notification communicated (e.g., using RDMA) to the receiving node, with the location of the message data.

At step 310, at the receiving node, a request is issued via the InfiniBand implementation to retrieve the message data from the sending node at the specified memory location.

At step 312, the result of message data transfer is communicated upwards to the application environment, asynchronously with the sending of a receipt to the sender.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The following Appendix provides software package, class, and other information for implementing a messaging API, in accordance with an embodiment. There is a Class Hierarchy page for all packages, plus a hierarchy for each package. Each hierarchy page contains a list of classes and a list of interfaces. The classes are organized by inheritance structure starting with java.lang.Object. The interfaces do not inherit from java.lang.Object. The Index contains an alphabetic list of all classes, interfaces, constructors, methods, and fields Packages:
com.oracle.common.base
com.oracle.common.collections
com.oracle.common.internal.io com.oracle.common.internal.net
com.oracle.common.internal.net.socketbus
com.oracle.common.internal.net.ssl
com.oracle.common.internal.security
com.oracle.common.io
com.oracle.common.net
com.oracle.common.net.exabus
com.oracle.common.net.exabus.spi
com.oracle.common.net.exabus.util
com.oracle.common.util
Classes:
AbstractBufferManager
AbstractSocketBus
AbstractSocketBus.BusState
AbstractSocketBus.ConnectionState
AbstractSocketBus.HandshakePhase
AbstractStableIterator
Associated
Associator
Bandwidth
Bandwidth.Magnitude
Bandwidth.Rate
Binary
BufferedSocketBus
BufferManager
BufferManagers
Buffers
BufferSequence
BufferSequenceInputStream
BufferSequenceOutputStream
Bus
ChainedIterator
CheckedBufferManager
Collector
Converter
ConverterCollections
ConverterCollections.AbstractConverterEntry
ConverterCollections.ConverterCollection
ConverterCollections.ConverterComparator
ConverterCollections.ConverterEntry
ConverterCollections.ConverterEntrySet
ConverterCollections.ConverterEnumerator
ConverterCollections.ConverterList
ConverterCollections.ConverterListIterator
ConverterCollections.ConverterMap
ConverterCollections.ConverterSet
ConverterCollections.ConverterSortedMap
ConverterCollections.ConverterSortedSet
DaemonThreadFactory
DemultiplexedSocketProvider
Depot
Disposable
Driver
Duration
Duration.Magnitude
EndPoint
Event
Event.Type
Factory
Hasher
HashSelectionService
HashSelectionService.ServiceFactory
Holder
IdentityHasher
InetAddressComparator
InetAddressHasher
InetSocketAddress32
InetSocketAddressComparator
InetSocketAddressHasher
InetSocketProvider
InputStreaming
MemoryBus
MemorySize
MemorySize.Magnitude
MessageBus
MessageBusTest
MessageBusTest.DemultiplexingCollector
MessageBusTest.EchoBus
MessageBusTest.EchoBus.EchoDriver
MessageBusTest.EventProcessor
MessageBusTest.Receipt
MessageBusTest.SkipStream
MessageBusTest.StampedEvent
MessageBusTest.Transmitter
MultiBufferMessageEvent
MultiBufferSequence
MultiplexedSocketProvider
MultiplexedSocketProvider.DefaultDependencies
MultiplexedSocketProvider.Dependencies
MultiplexedSocketProvider.MultiplexedChannel
MultiplexedSocketProvider.MultiplexedSelector
MultiplexedSocketProvider.MultiplexedSelectorProvider
MultiplexedSocketProvider.MultiplexedServerSocketChannel
MultiplexedSocketProvider.MultiplexedSocket
MultiplexedSocketProvider.MultiplexedSocketChannel
MultiplexedSocketProvider.WellKnownSubPorts
MultiProviderSelectionService
NaturalAssociator
NaturalHasher
PeerX509TrustManager
PeerX509TrustManagerFactory
Predicate
ResumableSelectionService
ResumableSelectionService.ServiceFactory
RunnableSelectionService
SafeSelectionHandler
SdpSocketProvider
SecurityProvider
SegmentedBufferManager
SegmentedBufferManager.BufferAllocator
SelectionService
SelectionService.Handler
SelectionServices
SharedBuffer
SharedBuffer.Disposer
SimpleDepot
SimpleDepot.DefaultDependencies
SimpleDepot.Dependencies
SimpleEvent
SimpleHolder
SingleBufferMessageEvent
SingleBufferSequence
SocketBusDriver
SocketBusDriver.DefaultDependencies
SocketBusDriver.Dependencies
SocketMessageBus
SocketProvider
Sockets
SocketSettings
SSLSelectorProvider
SSLServerSocket
SSLServerSocketChannel
SSLSocket SSLSocketChannel
SSLSocketProvider
SSLSocketProvider.DefaultDependencies
SSLSocketProvider.Dependencies
TcpSocketProvider
ThreadLocalRandom
UnmodifiableSetCollection
UrlEndPoint
VolatileHolder
WrapperBufferManager
WrapperSelector
WrapperSelector.WrapperSelectableChannel
WrapperSelector.WrapperSelectionKey
WrapperServerSocket
WrapperServerSocketChannel
WrapperSocket
WrapperSocketChannel
Package Hierarchy:
com.oracle.common.base, com.oracle.common.collections, com.oracle.common.internal.io, com.oracle.common.internal.net, com.oracle.common.internal.net.socketbus, com.oracle.common.internal.net.ssl, com.oracle.common.internal.security, com.oracle.common.io, com.oracle.common.net, com.oracle.common.net.exabus, com.oracle.common.net.exabus.spi, com.oracle.common.net.exabus.util, com.oracle.common.util
Class Hierarchy:
  java.lang.Object
    com.oracle.common.internal.io.AbstractBufferManager (implements com.oracle.common.io.BufferManager)
    java.nio.channels.spi.AbstractInterruptibleChannel (implements java.nio.channels.Channel, java.nio.channels.InterruptibleChannel)
      java.nio.channels.SelectableChannel (implements java.nio.channels.Channel)
        java.nio.channels.spi.AbstractSelectableChannel
        java.nio.channels.ServerSocketChannel
          com.oracle.common.internal.net.MultiplexedSocketProvider.
MultiplexedServerSocketChannel (implements com.oracle.common.internal.net.
MultiplexedSocketProvider.MultiplexedChannel)
          com.oracle.common.internal.net.DemultiplexedSocketProvider.
DemultiplexedServerSocketChannel
          com.oracle.common.internal.net.WrapperServerSocketChannel (implements com.oracle.common.internal.net.WrapperSelector.WrapperSelectableChannel)
          com.oracle.common.internal.net.MultiplexedSocketProvider.ListenChannel (implements com.oracle.common.internal.net.MultiplexedSocketProvider.MultiplexedChannel)
          com.oracle.common.internal.net.ssl.SSLServerSocketChannel
        java.nio.channels.SocketChannel (implements java.nio.channels.ByteChannel, java.nio.channels.GatheringByteChannel, java.nio.channels.ScatteringByteChannel)
          com.oracle.common.internal.net.WrapperSocketChannel (implements com.oracle.common.internal.net.WrapperSelector.WrapperSelectableChannel)
          com.oracle.common.internal.net.MultiplexedSocketProvider.
          MultiplexedSocketChannel (implements com.oracle.common.internal.net.MultiplexedSocketProvider.MultiplexedChannel)
          com.oracle.common.internal.net.DemultiplexedSocketProvider.
DemultiplexedSocketChannel
          com.oracle.common.internal.net.ssl.SSLSocketChannel
    com.oracle.common.internal.net.socketbus.AbstractSocketBus (implements com.oracle.common.net.exabus.Bus)
      com.oracle.common.internal.net.socketbus.BufferedSocketBus
        com.oracle.common.internal.net.socketbus.SocketMessageBus (implements com.oracle.common.net.exabus.MessageBus)
    com.oracle.common.internal, net.socketbus.AbstractSocketBus. Connection (implements java.nio.channels.GatheringByteChannel, java.nio.channels.ScatteringByteChannel, com.oracle.common.net.SelectionService.Handler)
      com.oracle.common.internal.net.socketbus.BufferedSocketBus.BufferedConnection
      com.oracle.common.internal.net.socketbus.SocketMessageBus.MessageConnection
    com.oracle.common.collections.AbstractStableIterator<T> (implements java.util.Enumeration<E>, java.util.Iterator<E>)
    com.oracle.common.collections.ChainedIterator<T>
    com.oracle.common.io.Bandwidth
    com.oracle.common.internal.net.socketbus.BufferedSocketBus.
BufferedConnection.WriteBatch
    com.oracle.common.io.BufferManagers
    com.oracle.common.io.Buffers
    com.oracle.common.internal.io.CheckedBufferManager (implements com.oracle.common.io.BufferManager)
    com.oracle.common.collections.ConverterCollections
    com.oracle.common.collections.ConverterCollections.
AbstractConverterEntry<FK, TK, FV, TV> (implements java.util.Map.Entry<K, V>, java.io.Serializable)
      com.oracle.common.collections.ConverterCollections.
ConverterEntry<FK, TK, FV, TV>
      com.oracle.common.collections.ConverterCollections.ConverterEntrySet.ConverterEntry
    com.oracle.common.collections.ConverterCollections.
ConverterCollection<F, T> (implements java.util.Collection<E>, java.io.Serializable)
    com.oracle.common.collections.ConverterCollections.
ConverterList<F, T> (implements java.util.List<E>, java.io.Serializable)
    com.oracle.common.collections.ConverterCollections.
ConverterSet<F, T> (implements java.io.Serializable, java.util.Set<E>)
    com.oracle.common.collections.ConverterCollections.
ConverterSortedSet<F, T> (implements java.io.Serializable, java.util.SortedSet<E>)
    com.oracle.common.internal.net.WrapperSelector.KeySet
    com.oracle.common.collections.ConverterCollections.
ConverterComparator<F, T> (implements java.util.Comparator<T>, java.io.Serializable)
    com.oracle.common.collections.ConverterCollections.
ConverterEntrySet<FK, TK, FV, TV> (implements java.io.Serializable, java.util.Set<E>)
    com.oracle.common.collections.ConverterCollections.ConverterEntrySet.ConverterIterator (implements java.util.Iterator<E>)
    com.oracle.common.collections.ConverterCollections.
ConverterEnumerator<F, T> (implements java.util.Enumeration<E>, java.util.Iterator<E>)
    com.oracle.common.collections.ConverterCollections.
ConverterListIterator<F, T> (implements java.util.ListIterator<E>)

com.oracle.common.collections.ConverterCollections.
    ConverterMap<FK, TK, FV, TV> (implements
    java.util.Map<K, V>, java.io.Serializable)
com.oracle.common.collections.ConverterCollections.
ConverterSortedMap<FK, TK, FV, TV> (implements
    java.io.Serializable, java.util.SortedMap<K, V>)
com.oracle.common.util.DaemonThreadFactory (implements java.util.concurrent.ThreadFactory)
java.util.Dictionary<K, V>
    java.util.Hashtable<K, V> (implements java.lang.Cloneable, java.util.Map<K, V>, java.io.Serializable)
        java.util.Properties
            java.security.Provider
                com.oracle.common.internal.security.SecurityProvider
com.oracle.common.util.Duration
com.oracle.common.internal.net.HashSelectionService
    (implements com.oracle.common.net.SelectionService)
com.oracle.common.internal.net.HashSelectionService.
    ServiceFactory (implements com.oracle.common.base.Factory<T>)
com.oracle.common.base.IdentityHasher<V> (implements com.oracle.common.base.Hasher<V>)
com.oracle.common.net.InetAddressComparator (implements java.util.Comparator<T>)
com.oracle.common.net.InetAddressHasher (implements com.oracle.common.base.Hasher<V>)
com.oracle.common.net.InetSocketAddressComparator (implements java.util.Comparator<T>)
com.oracle.common.net.InetSocketAddressHasher (implements com.oracle.common.base.Hasher<V>)
com.oracle.common.net.InetSocketProvider (implements com.oracle.common.net.SocketProvider)
    com.oracle.common.internal.net.DemultiplexedSocketProvider
    com.oracle.common.net.SdpSocketProvider
    com.oracle.common.net.TcpSocketProvider
java.io.InputStream (implements java.io.Closeable)
    com.oracle.common.io.BufferSequenceInputStream
        (implements java.io.DataInput)
com.oracle.common.io.MemorySize
com.oracle.common.net.exabus.util.MessageBusTest
com.oracle.common.net.exabus.util.MessageBusTest.DemultiplexingCollector (implements com.oracle.common.base.Collector<V>)
com.oracle.common.net.exabus.util.MessageBusTest.EchoBus (implements com.oracle.common.net.exabus.MessageBus)
com.oracle.common.net.exabus.util.MessageBusTest.EchoBus.EchoDriver (implements com.oracle.common.net.exabus.spi.Driver)
com.oracle.common.net.exabus.util.MessageBusTest.Receipt
com.oracle.common.net.exabus.util.MessageBusTest.StampedEvent (implements com.oracle.common.net.exabus.Event)
com.oracle.common.io.MultiBufferSequence (implements com.oracle.common.io.BufferSequence)
com.oracle.common.internal.net.socketbus.MultiBufferMessageEvent (implements com.oracle.common.net.exabus.Event)
com.oracle.common.internal.net.MultiplexedSocketProvider (implements com.oracle.common.net.SocketProvider)
com.oracle.common.internal.net.MultiplexedSocketProvider.DefaultDependencies (implements com.oracle.common.internal.net.MultiplexedSocketProvider.Dependencies)
com.oracle.common.internal.net.MultiProviderSelectionService (implements com.oracle.common.net.SelectionService)
com.oracle.common.base.NaturalAssociator (implements com.oracle.common.base.Associator)
com.oracle.common.base.NaturalHasher<V> (implements com.oracle.common.base.Hasher<V>)
java.io.OutputStream (implements java.io.Closeable, java.io.Flushable)
    com.oracle.common.io.BufferSequenceOutputStream (implements java.io.DataOutput)
        com.oracle.common.net.exabus.util.MessageBusTest.SkipStream
com.oracle.common.internal.security.
    PeerX509TrustManager (implements javax.net.ssl.X509TrustManager)
com.oracle.common.internal.net.ResumableSelectionService.ServiceFactory (implements com.oracle.common.base.Factory<T>)
com.oracle.common.internal.net.RunnableSelectionService (implements java.lang.Runnable, com.oracle.common.net.SelectionService)
    com.oracle.common.internal.net.ResumableSelectionService
com.oracle.common.net.SafeSelectionHandler<C> (implements com.oracle.common.net.SelectionService.Handler)
    com.oracle.common.internal, net.socketbus.AbstractSocketBus.AcceptHandler
    com.oracle.common.internal.net.socketbus.AbstractSocketBus.HandshakeHandler
    com.oracle.common.internal.net.MultiplexedSocketProvider.Listener
    com.oracle.common.internal.net.MultiplexedSocketProvider.Listener.Switcher (implements java.lang.Runnable)
com.oracle.common.internal.io.SegmentedBufferManager (implements com.oracle.common.io.BufferManager, com.oracle.common.base.Disposable)
java. nio.channels.SelectionKey
    com.oracle.common.internal.net.WrapperSelector.WrapperSelectionKey
        com.oracle.common.internal.net.MultiplexedSocketProvider.
MultiplexedSocketChannel.SocketSelectionKey
    com.oracle.common.internal.net.ssl.SSLSocketChannel.SSLSelectionKey
com.oracle.common.net.SelectionServices
java.nio.channels.Selector
java.nio.channels.spi.AbstractSelector
    com.oracle.common.internal.net.WrapperSelector
        com.oracle.common.internal.net.MultiplexedSocketProvider.MultiplexedSelector
java.nio.channels.spi.SelectorProvider
    com.oracle.common.internal.net.MultiplexedSocketProvider.MultiplexedSelectorProvider
    com.oracle.common.internal.net.ssl.SSLSelectorProvider
java.net.ServerSocket
    com.oracle.common.internal.net.WrapperServerSocket
        com.oracle.common.internal.net.ssl.SSLServerSocket com.oracle.common.internal.net.socketbus.SharedBuffer (implements com.oracle.common.base.Disposable, com.oracle.common.base.Holder<V>)
com.oracle.common.internal.net.socketbus.SharedBuffer.Segment (implements com.oracle.common.base.Disposable, com.oracle.common.base.Holder<V>)
com.oracle.common.net.exabus.util.SimpleDepot (implements com.oracle.common.net.exabus.Depot)
com.oracle.common.net.exabus.util.SimpleDepot.DefaultDependencies (implements com.oracle.common.net.exabus.util.SimpleDepot.Dependencies)
com.oracle.common.net.exabus.util.SimpleEvent (implements com.oracle.common.net.exabus.Event)
com.oracle.common.base.SimpleHolder<V> (implements com.oracle.common.base.Holder<V>)
com.oracle.common.io.SingleBufferSequence (implements com.oracle.common.io.BufferSequence)
    com.oracle.common.internal.net.socketbus.SingleBufferMessageEvent (implements com.oracle.common.net.exabus.Event)
java.net.Socket
    com.oracle.common.internal.net.WrapperSocket
        com.oracle.common.internal.net.DemultiplexedSocketProvider.DemultiplexedSocket
        com.oracle.common.internal.net.MultiplexedSocketProvider.MultiplexedSocket
        com.oracle.common.internal.net.ssl.SSLSocket
java.net.SocketAddress (implements java.io.Serializable)
    com.oracle.common.net.InetSocketAddress32
com.oracle.common.internal.net.socketbus.SocketBusDriver (implements com.oracle.common.net.exabus.spi.Driver)
com.oracle.common.internal.net.socketbus.SocketBusDriver.DefaultDependencies (implements com.oracle.commnon.internal.net.socketbus.SocketBusDriver.Dependencies)
com.oracle.common.internal.net.socketbus.SocketMessageBus.
MessageConnection.ReadBatch (implements com.oracle.common.base.Disposable)
    com.oracle.common.internal.net.socketbus.SocketMessageBus.
MessageConnection.ReadBatch.SharedBufferDisposer (implements com.oracle.common.internal.net.socketbus.SharedBuffer.Disposer)
    com.oracle.common.internal.net.socketbus.SocketMessageBus.
MessageConnection.ReadBatch.TaskEvent (implements com.oracle.common.net.exabus.Event)
com.oracle.common.net.Sockets
com.oracle.common.net.SocketSettings (implements java.net.SocketOptions)
com.oracle.common.net.SSLSocketProvider (implements com.oracle.common.net.SocketProvider)
com.oracle.common.net.SSLSocketProvider.DefaultDependencies (implements com.oracle.common.net.SSLSocketProvider.Dependencies)
java.lang.Thread (implements java.lang.Runnable)
    com.oracle.common.net.exabus.util.MessageBusTest.EventProcessor (implements java.lang.Runnable)
    com.oracle.common.net.exabus.util.MessageBusTest.Transmitter
com.oracle.common.util.ThreadLocalRandom
javax.net.ssl.TrustManagerFactorySpi
    com.oracle.common.internal.security.PeerX509TrustManagerFactory com.oracle.common.collections.UnmodifiableSetCollection<E> (implements java.util.Set<E>)
com.oracle.common.net.exabus.util.UrlEndPoint (implements com.oracle.common.net.exabus.EndPoint)
com.oracle.common.base.VolatileHolder<V> (implements com.oracle.common.base.Holder<V>)
com.oracle.common.internal.io.WrapperBufferManager (implements com.oracle.common.io.BufferManager)

Interface Hierarchy:
    com.oracle.common.base.Associated
    com.oracle.common.base.Associator
    com.oracle.common.base.Binary
    com.oracle.common.net.exabus.Bus
        com.oracle.common.net.exabus.MemoryBus
        com.oracle.common.net.exabus.MessageBus
    com.oracle.common.base.Collector<V>
    com.oracle.common.base.Converter<F, T>
    com.oracle.common.net.exabus.Depot
    com.oracle.common.base.Disposable
        com.oracle.common.io.BufferManager
        com.oracle.common.io.BufferSequence
        com.oracle.common.net.exabus.Event
    com.oracle.common.net.exabus.spi.Driver
    com.oracle.common.net.exabus.EndPoint
    com.oracle.common.base.Factory<T>
    com.oracle.common.base.Hasher<V>
    com.oracle.common.base.Holder<V>
    com.oracle.common.io.InputStreaming
    com.oracle.common.internal.net.MultiplexedSocketProvider.Dependencies
    com.oracle.common.internal.net.MultiplexedSocketProvider.MultiplexedChannel
    com.oracle.common.base.Predicate<T>
    com.oracle.common.internal.io.SegmentedBufferManager.BufferAllocator
    com.oracle.common.net.SelectionService
    com.oracle.common.net.SelectionService.Handler
    com.oracle.common.internal.net.socketbus.SharedBuffer.Disposer
    com.oracle.common.net.exabus.util.SimpleDepot.Dependencies
    com.oracle.common.internal.net.socketbus.SocketBusDriver.Dependencies
    com.oracle.common.net.SocketProvider
    com.oracle.common.net.SSLSocketProvider.Dependencies
    com.oracle.common.internal.net.WrapperSelector.WrapperSelectableChannel Enum Hierarchy:
    java.lang.Object
        java.lang.Enum<E> (implements java.lang.Comparable<T>, java.io.Serializable)
        com.oracle.common.net.exabus.Event.Type
        com.oracle.common.internal.net.socketbus.AbstractSocketBus.ConnectionState
        com.oracle.common.internal.net.socketbus.AbstractSocketBus.HandshakePhase
        com.oracle.common.internal.net.socketbus.AbstractSocketBus.BusState
        com.oracle.common.io.MemorySize.Magnitude
        com.oracle.common.io.Bandwidth.Magnitude
        com.oracle.common.io.Bandwidth.Rate
        com.oracle.common.util.Duration.Magnitude
        com.oracle.common.internal, net.MultiplexedSocketProvider.WellKnownSubPorts Class Index:
AbstractBufferManager—Class in com.oracle.common.internal.io
　　AbstractBufferManager provides a skeletal implementation of the BufferManager interface.
AbstractBufferManager( )—Constructor for class com.oracle.common.internal.io.AbstractBufferManager
AbstractSocketBus—Class in com.oracle.common.internal.net.socketbus
　　AbstractSocketBus provides a common base class for Socket based Bus implementations.
AbstractSocketBus(SocketBusDriver, UrlEndPoint)—Constructor for class com.oracle.common.internal.net.socketbus.AbstractSocketBus
　　Create an AbstractSocketBus around a ServerSocketChannel
AbstractSocketBus.AcceptHandler—Class in com.oracle.common.internal.net.socketbus
　　AcceptHandler accepts new client connections.
AbstractSocketBus.AcceptHandler(ServerSocketChannel)—Constructor for class com.oracle.common.internal.net.socketbus.AbstractSocketBus.AcceptHandler
　　Construct an AcceptHandler for the bus.
AbstractSocketBus.BusState—Enum in com.oracle.common.internal.net.socketbus
　　BusState represents the various states a Bus may be in.
AbstractSocketBus.Connection—Class in com.oracle.common.internal.net.socketbus
　　Connection contains the state associated with the connection to each connected peer.
AbstractSocketBus.Connection(UrlEndPoint)—Constructor for class com.oracle.common.internal, net.socketbus.AbstractSocketBus. Connection
　　Construct a Connection for the specified EndPoint.
AbstractSocketBus.ConnectionState—Enum in com.oracle.common.internal.net.socketbus
　　ConnectionState represents the state of the underlying Connection.
AbstractSocketBus.HandshakeHandler—Class in com.oracle.common.internal.net.socketbus
　　HandshakeHandler handles the initial transmissions on a SocketChannel as two buses handshake.
AbstractSocketBus.HandshakeHandler(SocketChannel, AbstractSocketBus.Connection)—Constructor for class com.oracle.common.internal.net.socketbus.AbstractSocketBus.HandshakeHandler
　　Construct a HandshakeHandler for the give SocketChannel.
AbstractSocketBus.HandshakePhase—Enum in com.oracle.common.internal.net.socketbus
　　HandshakePhase represents the state of the handshake protocol.
AbstractStableIterator<T>—Class in com.oracle.common.collections
　　An abstract Iterator implementation that is stable between the
AbstractStableIterator.hasNext( ) and AbstractStableIterator.next( )methods, and between the
AbstractStableIterator.next( ) and AbstractStableIterator.remove( )methods.
AbstractStableIterator( )—Constructor for class com.oracle.common.collections.AbstractStableIterator
　　Default constructor.
accept( )—Method in class com.oracle.common.internal, net.DemultiplexedSocketProvider.DemultiplexedServerSocketChannel
accept( )—Method in class com.oracle.common.internal.net.MultiplexedSocketProvider.ListenChannel accept( )—Method in class com.oracle.common.internal, net.MultiplexedSocketProvider.Listener.Switcher
　　Accept the channel and queue it to the appropriate MultiplexedServerSocketChannel accept( )—Method in class com.oracle.common.internal.net.MultiplexedSocketProvider.MultiplexedServerSocketChannel
accept( )—Method in class com.oracle.common.internal.net.ssl.SSLServerSocket
accept( )—Method in class com.oracle.common.internal.net.ssl.SSLServerSocketChannel
accept( )—Method in class com.oracle.common.internal.net.WrapperServerSocket
accept( )—Method in class com.oracle.common.internal.net.WrapperServerSocketChannel
acquire(int)—Method in class com.oracle.common.internal.io.CheckedBufferManager
　　Acquire a free ByteBuffer.
acquire(int)—Method in class com.oracle.common.internal.io.SegmentedBufferManager
acquire(int)—Method in class com.oracle.common.internal.io.WrapperBufferManager
acquire(int)—Method in interface com.oracle.common.io.BufferManager
　　Acquire a free ByteBuffer.
acquirePref(int)—Method in class com.oracle.common.internal.io.AbstractBufferManager
　　Acquire a free ByteBuffer, of any size.
acquirePref(int)—Method in class com.oracle.common.internal.io.CheckedBufferManager
　　Acquire a free ByteBuffer, of any size.
acquirePref(int)—Method in class com.oracle.common.internal.io.SegmentedBufferManager
acquirePref(int)—Method in class com.oracle.common.internal.io.WrapperBufferManager
acquirePref(int)—Method in interface com.oracle.common.io.BufferManager
　　Acquire a free ByteBuffer, of any size.
acquireSum(int)—Method in class com.oracle.common.internal.io.AbstractBufferManager
　　Acquire a free ByteBuffer, of any size.
acquireSum(int)—Method in class com.oracle.common.internal.io.CheckedBufferManager
　　Acquire a free ByteBuffer, of any size.
acquireSum(int)—Method in class com.oracle.common.internal.io.SegmentedBufferManager
acquireSum(int)—Method in class com.oracle.common.internal.io.WrapperBufferManager
acquireSum(int)—Method in interface com.oracle.common.io.BufferManager
　　Acquire a free ByteBuffer, of any size.
add(V)—Method in interface com.oracle.common.base.Collector
　　Notify the collector of a item of interest.
add(T)—Method in class com.oracle.common.collections.ConverterCollections.ConverterCollection
add(Map.Entry<TK, TV>)—Method in class com.oracle.common.collections.ConverterCollections.ConverterEntrySet
add(int, T)—Method in class com.oracle.common.collections.ConverterCollections.ConverterList add(T)—Method in class com.oracle.common.collections.ConverterCollections.ConverterListIterator add(E)—Method in class com.oracle.common.collections.UnmodifiableSetCollection add(SocketChannel)—Method in class com.oracle.common.internal.net.MultiplexedSocketProvider.MultiplexedServerSocketChannel
  Add an SocketChannel to the accept queue add(Event)—Method in class com.oracle.common.net.exabus.util.MessageBusTest.DemultiplexingCollector
  Notify the collector of a item of interest.

add(Event)—Method in class com.oracle.common.net.exabus.util.MessageBusTest.EventProcessor
  Add an event for the processor to handle.

addAll(Collection<? extends T>)—Method in class com.oracle.common.collections.ConverterCollections.ConverterCollection addAll(Collection<? extends Map.Entry<TK, TV>>)—Method in class com.oracle.common.collections.ConverterCollections.ConverterEntrySet addAll(int, Collection<? extends T>)—Method in class com.oracle.common.collections.ConverterCollections.ConverterList addAll(Collection<? extends E>)—Method in class com.oracle.common.collections.UnmodifiableSetCollection addEvent(Event)—Method in class com.oracle.common.internal.net.socketbus.AbstractSocketBus
  Add the specified Event to the Event Collector.

addFlushable(AbstractSocketBus.Connection)—Method in class com.oracle.common.internal.net.socketbus.AbstractSocketBus
  Add a Connection to the set of connections awaiting a flush.

addPendingKey(SelectionKey)—Method in class com.oracle.common.internal.net.MultiplexedSocketProvider.MultiplexedSelector
  Add the ready SelectionKey to the pending set.

addReceipt(Object)—Method in class com.oracle.common.internal, net.socketbus.AbstractSocketBus. Connection
  Track a receipt associated with this peer.

addWriter( )—Method in class com.oracle.common.internal.net.socketbus.BufferedSocketBus.BufferedConnection.WriteBatch
  Add a thread to the set of concurrent writers.

advance( )—Method in class com.oracle.common.collections.AbstractStableIterator
  Advance to the next object.

advance( )—Method in class com.oracle.common.collections.ChainedIterator
  Advance to the next object.

advance(ByteBuffer[ ], int, int)—Method in class com.oracle.common.internal.net.ssl.SSLSocketChannel
  Identify the distance to the next buffer which has available space.

ALGORITHM—Static variable in class com.oracle.common.internal.security.PeerX509TrustManager
  The alogorithm used by this TrustManager.

allocate(int)—Method in interface com.oracle.common.internal.io.SegmentedBufferManager.BufferAllocator
  Allocate and return buffer of the specified size.

append(ByteBuffer, boolean)—Method in class com.oracle.common.internal.net.socketbus.BufferedSocketBus.BufferedConnection.WriteBatch
  Append the specified ByteBuffer to the batch.

append(BufferSequence)—Method in class com.oracle.common.internal.net.socketbus.BufferedSocketBus.BufferedConnection.WriteBatch
  Append the specified BufferSequence to the batch.

append(BufferedSocketBus.BufferedConnection.WriteBatch)—Method in class com.oracle.common.internal.net.socketbus.BufferedSocketBus.BufferedConnection.WriteBatch
  Append the specified WriteBatch to this WriteBatch applyDriverProperties(String, Properties, SocketBusDriver.DefaultDependencies)—Static method in class com.oracle.common.net.exabus.util.MessageBusTest
  Configure a SocketBusDriver from the provided properties.

as(Bandwidth.Magnitude)—Method in class com.oracle.common.io.Bandwidth
  Obtain the Bandwidth as a value in the specified Bandwidth.Magnitude.

as(Bandwidth.Rate)—Method in class com.oracle.common.io.Bandwidth
  Obtain the Bandwidth as a value in the specified Bandwidth.Rate.

as(MemorySize.Magnitude)—Method in class com.oracle.common.io.MemorySize
  Obtain the MemorySize as a value in the specified MemorySize.Magnitude.

as(Duration.Magnitude)—Method in class com.oracle.common.util.Duration
  Obtains the Duration in the specified Duration.Magnitude (rounded down).

Associated—Interface in com.oracle.common.base
  The Associated interface facilitates the creation of a very generic equivalence relation between different objects and allows to group them based on the equality of the "association key" object returned by the Associated.getAssociatedKey( )method.

Associator—Interface in com.oracle.common.base
  The Associator interface facilitates the creation of a very generic equivalence relation between different objects and allows to group them based on the equality of the "association key" object returned by the Associator.getAssociatedKey(java.lang.Object) method.

attach( )—Method in class com.oracle.common.internal.net.socketbus.SharedBuffer
  Increment the reference count.

available( )—Method in class com.oracle.common.io.BufferSequenceInputStream available( )—Method in interface com.oracle.common.io.InputStreaming
  Returns the number of bytes that can be read (or skipped over) from this input stream without causing a blocking I/O condition to occur.

Bandwidth—Class in com.oracle.common.io
  A Bandwidth represents an amount of memory (measured in bits) being transferred per second.

Bandwidth(String)—Constructor for class com.oracle.common.io.Bandwidth
  Construct a Bandwidth by parsing the specified String.

Bandwidth(double, Bandwidth.Rate)—Constructor for class com.oracle.common.io.Bandwidth
  Construct a Bandwidth given a specified units and Bandwidth.Rate.

Bandwidth(int, Bandwidth. Rate)—Constructor for class com.oracle.common.io.Bandwidth
Construct a Bandwidth given a specified units and Bandwidth.Rate.
Bandwidth(long, Bandwidth.Rate)—Constructor for class com.oracle.common.io.Bandwidth
Construct a Bandwidth give a specified number of bytes.
Bandwidth.Magnitude—Enum in com.oracle.common.io
A Bandwidth.Magnitude of Bandwidth.
Bandwidth.Rate—Enum in com.oracle.common.io
A Bandwidth.Rate of a Bandwidth per second.
Binary—Interface in com.oracle.common.base
A thread-safe immutable binary object.
bind(SocketAddress)—Method in class com.oracle.common.internal, net.DemultiplexedSocketProvider.DemultiplexedSocket
bind(SocketAddress)—Method in class com.oracle.common.internal, net.MultiplexedSocketProvider.MultiplexedSocket
bind(SocketAddress)—Method in class com.oracle.common.internal.net.WrapperServerSocket
bind(SocketAddress, int)—Method in class com.oracle.common.internal.net.WrapperServerSocket
bind(SocketAddress)—Method in class com.oracle.common.internal.net.WrapperSocket
BUF_MIN_SIZE—Static variable in class com.oracle.common.internal.io.SegmentedBufferManager
The absolute minimum ByteBuffer size supported by this implementation.
BufferedSocketBus—Class in com.oracle.common.internal.net.socketbus
BufferedSocketBus adds write buffering to the AbstractSocketBus.
BufferedSocketBus(SocketBusDriver, UrlEndPoint)—Constructor for class com.oracle.common.internal.net.socketbus.BufferedSocketBus
Construct a BufferedSocketMessageBus.
BufferedSocketBus.BufferedConnection—Class in com.oracle.common.internal.net.socketbus
BufferedConnection implements a reliable stream connection with I/O offloading.
BufferedSocketBus.BufferedConnection(UrlEndPoint)—Constructor for class com.oracle.common.internal, net.socketbus.BufferedSocketBus.BufferedConnection
Create a BufferedConnection for the specified peer.
BufferedSocketBus.BufferedConnection.WriteBatch—Class in com.oracle.common.internal.net.socketbus
WriteBatch is used to encapsulate an array of ByteBuffers which are to be written to the connection.
BufferedSocketBus.BufferedConnection.WriteBatch( )—Constructor for class com.oracle.common.internal.net.socketbus.BufferedSocketBus.BufferedConnection.WriteBatch
BufferManager—Interface in com.oracle.common.io
BufferManager defines a mechanism for efficient buffer re-use.
BufferManagers—Class in com.oracle.common.io
BufferManagers provides access to pre-defined system-wide managers.
BufferManagers( )—Constructor for class com.oracle.common.io.BufferManagers
Buffers—Class in com.oracle.common.io
Buffers contains a number of Buffer related helpers.
Buffers( )—Constructor for class com.oracle.common.io.Buffers
BufferSequence—Interface in com.oracle.common.io
BufferSequence represents a series of ByteBuffers.
BufferSequenceInputStream—Class in com.oracle.common.io
An InputStream implementation on top of a BufferSequence.
BufferSequenceInputStream(BufferSequence)—Constructor for class com.oracle.common.io.BufferSequenceInputStream
Construct a BufferSequenceInputStream over a BufferSequence object.
BufferSequenceOutputStream—Class in com.oracle.common.io
BufferSequenceOutputStream is an implementation of an OutputStream which which produces a BufferSequence.
BufferSequenceOutputStream(BufferManager)—Constructor for class com.oracle.common.io.BufferSequenceOutputStream
Construct a BufferSequenceOutputStream.
BufferSequenceOutputStream(BufferManager, int)—Constructor for class com.oracle.common.io.BufferSequenceOutputStream
Construct a BufferSequenceOutputStream.
Bus—Interface in com.oracle.common.net.exabus
A Bus represents a communication mechanism that allows the exchange of information between multiple peers, called EndPoints.
calculateSegmentSizes(int, int)—Static method in class com.oracle.common.internal.io.SegmentedBufferManager
Creates an array with the sizes of each segment based on the cbBufferMin and the growth factor.
cancel( )—Method in class com.oracle.common.internal.net.ssl.SSLSocketChannel.SSLSelectionKey
cancel( )—Method in class com.oracle.common.internal.net.WrapperSelector.WrapperSelectionKey
ChainedIterator<T>—Class in com.oracle.common.collections
Provide an Iterator which iterates over the contents of multiple Iterators.
Chained Iterator(Iterator<T>, Iterator<T>)—Constructor for class com.oracle.common.collections.ChainedIterator
Construct an enumerator that will first enumerate the first Iterator and then will enumerate the second Iterator as if they were together a single Iterator.
ChainedIterator(Iterator<T>[ ])—Constructor for class com.oracle.common.collections.ChainedIterator
Construct an enumerator that will first enumerate the Iterators passed in the array as if they were together a single enumerator.
channel( )—Method in class com.oracle.common.internal.net.MultiplexedSocketProvider.MultiplexedSocketChannel.SocketS electionKey
channel( )—Method in class com.oracle.common.internal.net.ssl.SSLSocketChannel.SSLSelectionKey
channel( )—Method in class com.oracle.common.internal.net.WrapperSelector.WrapperSelection Key
checkClientTrusted(X509Certificate[ ], String)—Method in class com.oracle.common.internal.security.

PeerX509TrustManager
  Determine if the leaf certificate in the given certificate chain is contained in the trusted peer key store.
CheckedBufferManager—Class in com.oracle.common.internal.io
  CheckedBufferManager is a BufferManager wrapper which adds on safety checks to detect improper re-use of ByteBuffers.
CheckedBufferManager(BufferManager)—Constructor for class com.oracle.common.internal.io.CheckedBufferManager
  Construct a CheckedBufferManager around the specified manager.
checkPeerTrusted(X509Certificate[ ], String)—Method in class com.oracle.common.internal.security.PeerX509TrustManager
  Determine if the leaf certificate in the given certificate chain is contained in the trusted peer key store.
checkServerTrusted(X509Certificate[ ], String)—Method in class com.oracle.common.internal.security.PeerX509TrustManager
  Determine if the leaf certificate in the given certificate chain is contained in the trusted peer key store.
clear( )—Method in class com.oracle.common.collections.ConverterCollections.ConverterCollection
clear( )—Method in class com.oracle.common.collections.ConverterCollections.ConverterEntrySet
clear( )—Method in class com.oracle.common.collections.ConverterCollections.ConverterMap
clear( )—Method in class com.oracle.common.collections.UnmodifiableSetCollection
close(InetSocketAddress32)—Method in class com.oracle.common.internal.net.MultiplexedSocketProvider
  Stop listening for connections on the specified address.
close( )—Method in class com.oracle.common.internal,net.MultiplexedSocketProvider.MultiplexedSocket
close( )—Method in class com.oracle.common.internal.net.socketbus.AbstractSocketBus
  Close the bus, preventing any further data exchanges.
close( )—Method in class com.oracle.common.internal.net.socketbus.AbstractSocketBus.Connection
close(Throwable)—Method in class com.oracle.common.internal.net.socketbus.AbstractSocketBus.HandshakeHandler
  Close the HandshakeHandler's channel.
close( )—Method in class com.oracle.common.internal.net.WrapperServerSocket
close( )—Method in class com.oracle.common.internal.net.WrapperSocket
close( )—Method in class com.oracle.common.io.BufferSequenceInputStream
close( )—Method in class com.oracle.common.io.BufferSequenceOutputStream
close( )—Method in interface com.oracle.common.io.InputStreaming
  Close the InputStream and release any system resources associated with it.
close( )—Method in interface com.oracle.common.net.exabus.Bus
  Close the bus, preventing any further data exchanges.
close( )—Method in class com.oracle.common.net.exabus.util.MessageBusTest.EchoBus
closeOutbound( )—Method in class com.oracle.common.internal.net.ssl.SSLSocketChannel
  Called to terminate to accept termination of the end of the connection.
Collector<V>—Interface in com.oracle.common.base
  A Collector is mechanism for receiving items.
com.oracle.common.base—package com.oracle.common.base
com.oracle.common.collections—package com.oracle.common.collections
com.oracle.common.internal.io—package com.oracle.common.internal.io
com.oracle.common.internal.net—package com.oracle.common.internal.net
com.oracle.common.internal.net.socketbus—package com.oracle.common.internal.net.socketbus
com.oracle.common.internal.net.ssl—package com.oracle.common.internal.net.ssl
com.oracle.common.internal.security—package com.oracle.common.internal.security
com.oracle.common.io—package com.oracle.common.io
com.oracle.common.net—package com.oracle.common.net
com.oracle.common.net.exabus—package com.oracle.common.net.exabus
com.oracle.common.net.exabus.spi—package com.oracle.common.net.exabus.spi
com.oracle.common.net.exabus.util—package com.oracle.common.net.exabus.util
com.oracle.common.util—package com.oracle.common.util
comparator( )—Method in class com.oracle.common.collections.ConverterCollections.ConverterSortedMap
comparator( )—Method in class com.oracle.common collections. ConverterCollections.ConverterSortedSet
compare(T, T)—Method in class com.oracle.common.collections.ConverterCollections.ConverterComparator
compare(InetAddress, InetAddress)—Method in class com.oracle.common.net.InetAddressComparator
compare(SocketAddress, SocketAddress)—Method in class com.oracle.common.net.InetSocketAddressComparator
compareAndSwap(EndPoint, long, long, long, Holder<Long>, Object)—Method in interface com.oracle.common.net.exabus.MemoryBus
  Request an atomic compare and swap (CAS) operation on an eight byte word in the peer's memory.
computeLength(ByteBuffer[ ], int, int)—Static method in class com.oracle.common.io.MultiBufferSequence
  Return the number of remaining bytes in the supplied ByteBuffer array.
computePort(int, int)—Static method in class com.oracle.common.internal.net.MultiplexedSocketProvider
  Compute the 32 bit port from the specified base and sub port
configure(ServerSocket, SocketOptions)—Static method in class com.oracle.common.net.Sockets
  Apply the specified options to a socket.
configure(Socket, SocketOptions)—Static method in class com.oracle.common.net.Sockets
  Apply the specified options to a socket.
configure(DatagramSocket, SocketOptions)—Static method in class com.oracle.common.net.Sockets Apply the specified options to a socket.
configure(MulticastSocket, SocketOptions)—Method in class com.oracle.common.net.Sockets
 Apply the specified options to a socket.
configureSocket(Socket)—Method in class com.oracle.common.internal.net.socketbus.AbstractSocketBus
 Configure the specified Socket
configureSocket(ServerSocket)—Method in class com.oracle.common.internal.net.socketbus.AbstractSocketBus
 Configure the specified ServerSocket
connect(SocketAddress)—Method in class com.oracle.common.internal, net.DemultiplexedSocketProvider.DemultiplexedSocket
connect(SocketAddress, int)—Method in class com.oracle.common.internal, net.DemultiplexedSocketProvider.DemultiplexedSocket
connect(SocketAddress)—Method in class com.oracle.common.internal.net.DemultiplexedSocketProvider.DemultiplexedSocketChannel
connect(SocketAddress)—Method in class com.oracle.common.internal, net.MultiplexedSocketProvider.MultiplexedSocket
connect(SocketAddress, int)—Method in class com.oracle.common.internal, net.MultiplexedSocketProvider.MultiplexedSocket
connect(SocketAddress)—Method in class com.oracle.common.internal.net.MultiplexedSocketProvider.MultiplexedSocketChannel
connect(EndPoint)—Method in class com.oracle.common.internal.net.socketbus.AbstractSocketBus
 Connect this bus to an EndPoint.
connect(SocketAddress, int)—Method in class com.oracle.common.internal.net.ssl.SSLSocket
connect(SocketAddress)—Method in class com.oracle.common.internal.net.WrapperSocket
connect(SocketAddress, int)—Method in class com.oracle.common.internal.net.WrapperSocket
connect(SocketAddress)—Method in class com.oracle.common.internal.net.WrapperSocketChannel
connect(EndPoint)—Method in interface com.oracle.common.net.exabus.Bus
 Connect this bus to an EndPoint.
connect(EndPoint)—Method in class com.oracle.common.net.exabus.util.MessageBusTest.EchoBus
contains(Object)—Method in class com.oracle.common collections. ConverterCollections.ConverterCollection
contains(Object)—Method in class com.oracle.common.collections.ConverterCollections.ConverterEntrySet
contains(Object)—Method in class com.oracle.common.collections.UnmodifiableSetCollection
containsAll(Collection<?>)—Method in class com.oracle.common collections. ConverterCollections.ConverterCollection
containsAll(Collection<?>)—Method in class com.oracle.common.collections.ConverterCollections.ConverterEntrySet
containsAll(Collection<?>)—Method in class com.oracle.common.collections.UnmodifiableSetCollection
containsKey(Object)—Method in class com.oracle.common.collections.ConverterCollections.ConverterMap
containsValue(Object)—Method in class com.oracle.common.collections.ConverterCollections.ConverterMap
continueProtocol( )—Method in class com.oracle.common.internal.net.ssl.SSLSocketChannel
 Continue the protocol by waking up the selector.
convert(F)—Method in interface com.oracle.common.base.Converter
 Convert the passed object to another object.
convert(long, Bandwidth.Rate, Bandwidth.Rate)—Static method in enum com.oracle.common.io.Bandwidth.Rate
 Convert a number of units of the specified Bandwidth.Rate to another Bandwidth.Rate.
convertArray(Object[ ], Converter<F, T>)—Static method in class com.oracle.common.collections.ConverterCollections
 Convert the contents of the passed array.
convertArray(Object[ ], Converter<F, T>, Object[ ])—Static method in class com.oracle.common.collections.ConverterCollections
 Convert the contents of the passed source array into an array with the component type of the passed destination array, using the destination array itself if it is large enough, and placing a null in the first unused element of the destination array if it is larger than the source array.
Converter<F, T>—Interface in com.oracle.common.base
 Provide for "pluggable" object conversions.
ConverterCollections—Class in com.oracle.common.collections
 A collection of Collection implementation classes that use the Converter interface to convert the items stored in underlying collection objects.
ConverterCollections( )—Constructor for class com.oracle.common.collections.ConverterCollections
ConverterCollections.AbstractConverterEntry<FK, TK, FV, TV>—Class in com.oracle.common.collections
 An abstract Map Entry that lazily converts the key and value.
ConverterCollections.AbstractConverterEntry (Map.Entry<FK, FV>)—Constructor for class com.oracle.common collections. ConverterCollections.AbstractConverterEntry
 Constructor.
ConverterCollections.ConverterCollection<F, T>—Class in com.oracle.common.collections
 A Converter Collection views an underlying Collection through a Converter.
ConverterCollections.ConverterCollection(Collection<F>, Converter<F, T>, Converter<T, F>)—Constructor for class com.oracle.common.collections.ConverterCollections.ConverterCollection
 Constructor.
ConverterCollections.ConverterComparator<F, T>—Class in com.oracle.common.collections
 A Comparator that Converts the elements before comparing them.
ConverterCollections.ConverterComparator(Comparator<? super F>, Converter<T, F>)—Constructor for class com.oracle.common collections. ConverterCollections.ConverterComparator
 Constructor.
ConverterCollections.ConverterEntry<FK, TK, FV, TV>—Class in com.oracle.common.collections
 A Map Entry that lazily converts the key and value.

ConverterCollections.ConverterEntry(Map.Entry<FK, FV>, Converter<FK, TK>, Converter<FV, TV>, Converter<TV, FV>)—Constructor for class com.oracle.common.collections.ConverterCollections.ConverterEntry
Constructor.
ConverterCollections.ConverterEntrySet<FK, TK, FV, TV>—Class in com.oracle.common.collections
A Converter Entry Set views an underlying Entry Set through a set of key and value Converters.
ConverterCollections.ConverterEntrySet (Collection<Map.Entry<FK, FV>>, Converter<FK, TK>, Converter<TK, FK>, Converter<FV, TV>, Converter<TV, FV>)—Constructor for class com.oracle.common.collections.ConverterCollections.ConverterEntrySet
Constructor.
ConverterCollections.ConverterEntrySet.ConverterEntry—Class in
com.oracle.common.collections
A Map Entry that lazily converts the key and value.
ConverterCollections.ConverterEntrySet.ConverterEntry (Map.Entry<FK, FV>)—Constructor for class com.oracle.common.collections.ConverterCollections.ConverterEntrySet.ConverterEntry
Constructor.
ConverterCollections.ConverterEntrySet.ConverterIterator—Class in
com.oracle.common.collections
A Map Entry Iterator that converts the key and value types.
ConverterCollections.ConverterEntrySet.ConverterIterator (Iterator<Map.Entry<FK, FV>>)—Constructor for class com.oracle.common.collections.ConverterCollections.ConverterEntrySet.ConverterIterator
Constructor.
ConverterCollections.ConverterEnumerator<F, T>—Class in com.oracle.common.collections
Provide an implementation of an enumerator which converts each of the items which it enumerates.
ConverterCollections.ConverterEnumerator (Enumeration<F>, Converter<F, T>)—Constructor for class com.oracle.common.collections.ConverterCollections.ConverterEnumerator
Construct the Converter enumerator based on an Enumeration.
ConverterCollections.ConverterEnumerator(Iterator<F>, Converter<F, T>)—Constructor for class com.oracle.common.collections.ConverterCollections.ConverterEnumerator
Construct the Converter enumerator based on an Iterator.
ConverterCollections.ConverterEnumerator(Object[ ], Converter<F, T>)—Constructor for class com.oracle.common.collections.ConverterCollections.ConverterEnumerator
Construct the Converter enumerator based on an array of objects.
ConverterCollections.ConverterList<F, T>—Class in com.oracle.common.collections
A Converter List views an underlying List through a Converter.
ConverterCollections.ConverterList(List<F>, Converter<F, T>, Converter<T, F>)—Constructor for class com.oracle.common.collections.ConverterCollections.ConverterList
Constructor.
ConverterCollections.ConverterListIterator<F, T>—Class in com.oracle.common.collections
A Converter ListIterator views an underlying ListIterator through a Converter.
ConverterCollections.ConverterListIterator (ListIterator<F>, Converter<F, T>, Converter<T, F>)—Constructor for class com.oracle.common.collections.ConverterCollections.ConverterListIterator
Constructor.
ConverterCollections.ConverterMap<FK, TK, FV, TV>—Class in com.oracle.common.collections
A Converter Map views an underlying Map through a set of key and value Converters.
ConverterCollections.ConverterMap(Map<FK, FV>, Converter<FK, TK>, Converter<TK, FK>, Converter<FV, TV>, Converter<TV, FV>)—Constructor for class com.oracle.common.collections.ConverterCollections.ConverterMap
Constructor.
ConverterCollections.ConverterSet<F, T>—Class in com.oracle.common.collections
A Converter Set views an underlying Set through a Converter.
ConverterCollections.ConverterSet(Set<F>, Converter<F, T>, Converter<T, F>)—Constructor for class com.oracle.common.collections.ConverterCollections.ConverterSet
Constructor.
ConverterCollections.ConverterSortedMap<FK, TK, FV, TV>—Class in
com.oracle.common.collections
A Converter SortedMap views an underlying SortedMap through a set of key and value
Converters.
ConverterCollections.ConverterSortedMap (SortedMap<FK, FV>, Converter<FK, TK>, Converter<TK, FK>, Converter<FV, TV>, Converter<TV, FV>)—Constructor for class com.oracle.common.collections.ConverterCollections.ConverterSortedMap
Constructor.
ConverterCollections.ConverterSortedSet<F, T>—Class in com.oracle.common.collections
A Converter SortedSet views an underlying SortedSet through a Converter.
ConverterCollections.ConverterSortedSet(SortedSet<F>, Converter<F, T>, Converter<T, F>)—Constructor for class com.oracle.common.collections.ConverterCollections.ConverterSortedSet
Constructor.
copyDependencies(MultiplexedSocketProvider.Dependencies)—Method in class com.oracle.common.internal.net.MultiplexedSocketProvider
Produce a copy of the specified Dependencies object.
copyDependencies(SocketBusDriver.Dependencies)—Method in class com.oracle.common.internal.net.socketbus.SocketBusDriver
Produce a shallow copy of the supplied dependencies.
copyDependencies(SimpleDepot.Dependencies)—Method in class com.oracle.common.net.exabus.util.SimpleDepot Produce a shallow copy of the supplied dependencies.
copyDependencies(SSLSocketProvider.Dependencies)—Method in class com.oracle.common.net.SSLSocketProvider
Produce a shallow copy of the supplied dependencies.
create( )—Method in interface com.oracle.common.base.Factory
Create a new instance.
create( )—Method in class com.oracle.common.internal.net.HashSelectionService.ServiceFactory
Create a new instance.
create( )—Method in class com.oracle.common.internal.net.ResumableSelectionService.ServiceFactory
Create a new instance.
createBus(EndPoint)—Method in class com.oracle.common.internal.net.socketbus.SocketBusDriver
Create a new Bus bound to the specified local EndPoint.
createBus(EndPoint)—Method in interface com.oracle.common.net.exabus.spi.Driver
Create a new Bus bound to the specified local EndPoint.
createBus(EndPoint)—Method in class com.oracle.common.net.exabus.util.MessageBusTest.EchoBus.EchoDriver
createMemoryBus(EndPoint)—Method in interface com.oracle.common.net.exabus.Depot
Create a new MemoryBus bound to the specified local EndPoint.
createMemoryBus(EndPoint)—Method in class com.oracle.common.net.exabus.util.SimpleDepot
Create a new MemoryBus bound to the specified local EndPoint.
createMessageBus(EndPoint)—Method in interface com.oracle.common.net.exabus.Depot
Create a new MessageBus bound to the specified local EndPoint.
createMessageBus(EndPoint)—Method in class com.oracle.common.net.exabus.util.SimpleDepot
Create a new MessageBus bound to the specified local EndPoint.
createServerSocket( )—Method in class com.oracle.common.internal, net.DemultiplexedSocketProvider.DemultiplexedServerSocketChannel
createServerSocket( )—Method in class com.oracle.common.internal.net.MultiplexedSocketProvider.MultiplexedServerSocketChannel
createUnresolved(String, int)—Static method in class com.oracle.common.net.InetSocketAddress32
Creates an unresolved socket address from a hostname and a port number.
DaemonThreadFactory—Class in com.oracle.common.util
DaemonThreadFactory is a ThreadFactory which produces daemon threads.
DaemonThreadFactory( )—Constructor for class com.oracle.common.util.DaemonThreadFactory
Construct a new DaemonThreadFactory.
DaemonThreadFactory(String)—Constructor for class com.oracle.common.util.DaemonThreadFactory
Construct a new DaemonThreadFactory.
decrypt(ByteBuffer[ ], int, int)—Method in class com.oracle.common.internal.net.ssl.SSLSocketChannel
Decrypt from the incoming network buffer into the supplied buffers.
DEFAULT_BUF_MIN_SIZE—Static variable in class com.oracle.common.internal.io.SegmentedBufferManager
The default size of the smallest ByteBuffer.
DEFAULT_BUFFER_MANAGER—Static variable in class com.oracle.common.internal.net.socketbus.SocketBusDriver.DefaultDependencies
Default BufferManager.
DEFAULT_OPTIONS—Static variable in class com.oracle.common.internal.net.socketbus.SocketBusDriver.DefaultDependencies
Default SocketOptions.
DEFAULT_SEGMENT_COUNT—Static variable in class com.oracle.common.internal.io.SegmentedBufferManager
The default number of segments.
DEFAULT_STATS_FREQUENCY—Static variable in class com.oracle.common.internal.io.SegmentedBufferManager
The default release frequency at which to records statistics.
delayProtocol(int, int, int)—Method in class com.oracle.common.internal.net.ssl.SSLSocketChannel
Delay the protocol waiting to do the specified operation.
delegate( )—Method in class com.oracle.common.internal.net.MultiplexedSocketProvider.MultiplexedSocketChannel
Return the delegate channel
DemultiplexedSocketProvider—Class in com.oracle.common.internal.net
DemultiplexedSocketProvider is a bridge Socket provider that allows to use MultiplexedSocketProvider without converting the socket addresses into InetSocketAddress32.
DemultiplexedSocketProvider(MultiplexedSocketProvider, int)—Constructor for class com.oracle.common.internal.net.DemultiplexedSocketProvider
Construct a DemultiplexedSocketProvider
DemultiplexedSocketProvider. DemultiplexedServerSocketChannel—Class in com.oracle.common.internal.net
DemultiplexedServerSocketChannel extends MultiplexedServerSocketChannel so that it can covert all the SocketAddresses into InetSocketAddress32
DemultiplexedSocketProvider.DemultiplexedServerSocketChannel(MultiplexedSocketProvider)—Constructor for class com.oracle.common.internal, net.DemultiplexedSocketProvider.DemultiplexedServerSocketChannel
Create a DemultiplexedServerSocketChannel
DemultiplexedSocketProvider.DemultiplexedSocket—Class in com.oracle.common.internal.net
DemultiplexedSocketChannel extends MultiplexedSocketChannel so that it can convert all the SocketAddresses into InetSocketAddress32
DemultiplexedSocketProvider.DemultiplexedSocket (Socket, SocketChannel)—Constructor for class com.oracle.common.internal, net.DemultiplexedSocketProvider.DemultiplexedSocket
Create a DemultiplexedSocket.
DemultiplexedSocketProvider.DemultiplexedSocketChannel—Class in com.oracle.common.internal.net
DemultiplexedSocketChannel extends MultiplexedSocketChannel so that it can convert all the SocketAddresses into InetSocketAddress32
DemultiplexedSocketProvider.DemultiplexedSocketChannel(MultiplexedSocketProvider.MultiplexedSocketChannel)—Constructor for class com.oracle.common.internal, net.DemultiplexedSocketProvider.DemultiplexedSocketChannel
  Create a DemultiplexedSocketChannel
DemultiplexedSocketProvider.DemultiplexedSocketChannel(MultiplexedSocketProvider)—Constructor for class com.oracle.common.internal, net.DemultiplexedSocketProvider.DemultiplexedSocketChannel
  Create a DemultiplexedSocketChannel
Depot—Interface in com.oracle.common.net.exabus
  A Depot serves as a factory for creating EndPoints and Buses.
deregister(int)—Method in class com.oracle.common.internal.net.MultiplexedSocketProvider.Listener
  Deregister an acceptor.
detach( )—Method in class com.oracle.common.internal.net.socketbus.SharedBuffer
  Decrement the reference count, releasing the buffer if the count reaches zero.
disconnect(EndPoint)—Method in class com.oracle.common.internal.net.socketbus.AbstractSocketBus
  Disconnect an EndPoint from this bus.
disconnect(EndPoint)—Method in interface com.oracle.common.net.exabus.Bus
  Disconnect an EndPoint from this bus.
disconnect(EndPoint)—Method in class com.oracle.common.net.exabus.util.MessageBusTest.EchoBus
Disposable—Interface in com.oracle.common.base
  The Disposable interface is used for life-cycle management of resources.
dispose( )—Method in interface com.oracle.common.base.Disposable
  Invoked when all resources owned by the implementor can safely be released.
dispose( )—Method in class com.oracle.common.internal.io.CheckedBufferManager
  Invoked when all resources owned by the implementor can safely be released.
dispose( )—Method in class com.oracle.common.internal.io.SegmentedBufferManager
dispose( )—Method in class com.oracle.common.internal.io.WrapperBufferManager
dispose( )—Method in class com.oracle.common.internal, net.socketbus.MultiBufferMessageEvent
  Invoked when all resources owned by the implementor can safely be released.
dispose( )—Method in class com.oracle.common.internal.net.socketbus.SharedBuffer
  Decrement the SharedBuffer's reference count, once it reaches zero the shared buffer will be released to the manager.
dispose(ByteBuffer)—Method in interface com.oracle.common.internal.net.socketbus.SharedBuffer.Disposer
  Dispose byte buffer
dispose( )—Method in class com.oracle.common.internal.net.socketbus.SharedBuffer.Segment
  Decrement the reference count of the SharedBuffer associated with this Segment.
dispose( )—Method in class com.oracle.common.internal, net.socketbus.SingleBufferMessageEvent
  Invoked when all resources owned by the implementor can safely be released.
dispose( )—Method in class com.oracle.common.internal.net.socketbus.SocketMessageBus.MessageConnection.ReadBatch
  Invoked when all resources owned by the implementor can safely be released.
dispose(ByteBuffer)—Method in class com.oracle.common.internal.net.socketbus.SocketMessageBus.MessageConnection.ReadBatch.SharedBufferDisposer
dispose( )—Method in class com.oracle.common.internal.net.socketbus.SocketMessageBus.MessageConnection.ReadBatch.TaskEvent
dispose( )—Method in class com.oracle.common.io.MultiBufferSequence
  Invoked when all resources owned by the implementor can safely be released.
dispose( )—Method in class com.oracle.common.io.SingleBufferSequence
  Invoked when all resources owned by the implementor can safely be released.
dispose( )—Method in interface com.oracle.common.net.exabus.Event
  Dispose of the event, releasing any resources associated with it.
dispose( )—Method in class com.oracle.common.net.exabus.util.MessageBusTest.StampedEvent
dispose( )—Method in class com.oracle.common.net.exabus.util.SimpleEvent
  Dispose of the event, releasing any resources associated with it.
drainClearBuffer(ByteBuffer[ ], int, int)—Method in class com.oracle.common.internal.net.ssl.SSLSocketChannel
  Drain as much of the clear-text buffer into the supplied buffers The caller must hold the read monitor.
Driver—Interface in com.oracle.common.net.exabus.spi
  A Driver represents a distinct bus implementation.
Duration—Class in com.oracle.common.util
  A Duration represents an amount of time, with nanosecond accuracy.
Duration(Duration)—Constructor for class com.oracle.common.util.Duration
  Construct a Duration given another Duration.
Duration(long)—Constructor for class com.oracle.common.util.Duration
  Construct a Duration give a specified number of nano seconds.
Duration(String)—Constructor for class com.oracle.common.util.Duration
  Construct a Duration by parsing the specified String.
Duration(double, Duration.Magnitude)—Constructor for class com.oracle.common.util.Duration
  Construct a Duration given a specified amount of a Duration.Magnitude.
Duration(int, Duration.Magnitude)—Constructor for class com.oracle.common.util.Duration
  Construct a Duration given a specified amount of a Duration.Magnitude.
Duration(String, Duration.Magnitude)—Constructor for class com.oracle.common.util.Duration
  Construct a Duration by parsing the specified String.
Duration.Magnitude—Enum in com.oracle.common.util
  The Duration.Magnitude of the Duration.
emitEvent(Event)—Method in class com.oracle.common.internal.net.socketbus.AbstractSocketBus
  Emit the specified Event to the Event Collector.

encrypt(ByteBuffer[ ], int, int)—Method in class com.oracle.common.internal.net.ssl.SSLSocketChannel
  Encrypt the supplied contents, storing them in the outgoing buffer.
EndPoint—Interface in com.oracle.common.net.exabus
  EndPoint provides an opaque representation of an address for a Bus.
endProtocol( )—Method in class com.oracle.common.internal.net.ssl.SSLSocketChannel
  Update the SelectionKeys once the handshake protocol has completed.
engineGetTrustManagers( )—Method in class com.oracle.common.internal.security.PeerX509TrustManagerFactory
  Return one trust manager for each type of trust material.
engineInit(KeyStore)—Method in class com.oracle.common.internal.security.PeerX509TrustManagerFactory
  Initialize this factory with a source of certificate authorities and related trust material.
engineInit(ManagerFactoryParameters)—Method in class com.oracle.common.internal.security.PeerX509TrustManagerFactory
  Initialize this factory with a source of provider-specific key material.
ensureAdditionalBufferCapacity(int)—Method in class com.oracle.common.internal.net.socketbus.BufferedSocketBus.BufferedConnection.WriteBatch
  Ensure the buffer array has enough capacity to add the specified number of buffers.
ensureAdditionalRecycleCapacity(int)—Method in class com.oracle.common.internal.net.socketbus.BufferedSocketBus.BufferedConnection.WriteBatch
  Ensure the recycle buffer array has enough capacity to add the specified number of buffers.
ensureArgument(Object, String)—Static method in class com.oracle.common.internal.net.socketbus.SocketBusDriver.DefaultDependencies
  Ensure that the specified object is non-null
ensureArgument(Object, String)—Static method in class com.oracle.common.net.exabus.util.SimpleDepot.DefaultDependencies
  Ensure that the specified object is non-null.
ensureArgument(Object, String)—Static method in class com.oracle.common.net.SSLSocketProvider.DefaultDependencies
  Ensure that the specified object is non-null
ensureBufferList( )—Method in class com.oracle.common.io.BufferSequenceOutputStream
  Return the buffer list, creating it if necessary.
ensureCapacity(long)—Method in class com.oracle.common.internal.net.socketbus.SocketMessageBus.MessageConnection.ReadBatch
  Ensure that m_aBuffer has sufficient writable capacity.
ensureCompatibility(ByteBuffer)—Method in class com.oracle.common.internal.io.AbstractBufferManager
  Ensure that the specified buffer is compatible with this manager.
ensureConnection(EndPoint)—Method in class com.oracle.common.internal.net.socketbus.AbstractSocketBus
  Return the bus connection for the specified EndPoint.
ensureIOException(Exception)—Static method in class com.oracle.common.net.SdpSocketProvider
  Return an IOException for the specified Exception
ensureOpen( )—Method in class com.oracle.common.internal.net.MultiplexedSocketProvider.MultiplexedSelector
  Ensure that the Selector is open.
ensureRegistration( )—Static method in class com.oracle.common.internal.security.SecurityProvider
  Ensure that an instance of this provider has been registered with the system.
ensureSessionValidity(SSLSession, Socket)—Method in class com.oracle.common.net.SSLSocketProvider
  Ensure that supplied session is acceptable.
ensureThread( )—Method in class com.oracle.common.internal.net.ResumableSelectionService
  Ensure that there is a service thread running.
ensureValid( )—Method in class com.oracle.common.internal, net.socketbus.AbstractSocketBus. Connection
  Ensure that the connection is usable.
entrySet( )—Method in class com.oracle.common.collections.ConverterCollections.ConverterMap
EPHEMERAL_SUB_PORT_START—Static variable in class com.oracle.common.internal.net.MultiplexedSocketProvider
  The start of the ephemeral sub-port range.
equals(V, V)—Method in interface com.oracle.common.base.Hasher
  Compare two objects for equality.
equals(V, V)—Method in class com.oracle.common.base.IdentityHasher
  Compare two objects for equality.
equals(V, V)—Method in class com.oracle.common.base.NaturalHasher
  Compare two objects for equality.
equals(Object)—Method in class com.oracle.common collections. ConverterCollections.AbstractConverterEntry
equals(Object)—Method in class com.oracle.common collections. ConverterCollections.ConverterCollection
  Compares the specified object with this collection for equality.
equals(Object)—Method in class com.oracle.common.collections.ConverterCollections.ConverterEntrySet
equals(Object)—Method in class com.oracle.common.collections.ConverterCollections.ConverterList
  Compares the specified object with this collection for equality.
equals(Object)—Method in class com.oracle.common.collections.ConverterCollections.ConverterMap
equals(Object)—Method in class com.oracle.common.collections.ConverterCollections.ConverterSet
  Compares the specified object with this collection for equality.
equals(Object)—Method in class com.oracle.common.collections.UnmodifiableSetCollection
equals(Object)—Method in class com.oracle.common.internal.net.MultiplexedSocketProvider.MultiplexedSelectorProvider
equals(Object)—Method in class com.oracle.common.internal.net.ssl.SSLSelectorProvider
equals(Object)—Method in class com.oracle.common.io.Bandwidth
equals(BufferSequence, BufferSequence)—Static method in class com.oracle.common.io.Buffers Compare two BufferSequences for byte sequence equality.
equals(Object)—Method in class com.oracle.common.io.MemorySize
equals(Object)—Method in interface com.oracle.common.net.exabus.EndPoint
Return true iff the specified object in an EndPoint representing the same bus as this EndPoint.
equals(Object)—Method in class com.oracle.common.net.exabus.util.UrlEndPoint
Return true iff the specified object in an EndPoint representing the same bus as this EndPoint.
equals(InetAddress, InetAddress)—Method in class com.oracle.common.net.InetAddressHasher
Compare two objects for equality.
equals(Object)—Method in class com.oracle.common.net.InetSocketAddress32
Compares this object against the specified object.
equals(SocketAddress, SocketAddress)—Method in class com.oracle.common.net.InetSocketAddressHasher
Compare two objects for equality.
equals(Object)—Method in class com.oracle.common.util.Duration
evaluate(T)—Method in interface com.oracle.common.base.Predicate
Return true iff the specified object satisfies the predicate.
Event—Interface in com.oracle.common.net.exabus
An Event indicates that a special condition has occurred on a Bus.
Event.Type—Enum in com.oracle.common.net.exabus
Enumeration of event types.
FACTOR—Variable in enum com.oracle.common.util.Duration.Magnitude
The number of nanoseconds in a single unit of this magnitude.
Factory<T>—Interface in com.oracle.common.base
The Factory interface provides a means of producing objects of a given type.
fillClearBuffer( )—Method in class com.oracle.common.internal.net.ssl.SSLSocketChannel
Fill the clear-text buffer by decrypting any buffered encrypted data.
finishConnect( )—Method in class com.oracle.common.internal.net.MultiplexedSocketProvider.MultiplexedSocketChannel
finishConnect( )—Method in class com.oracle.common.internal.net.WrapperSocketChannel
first( )—Method in class com.oracle.common collections. ConverterCollections.ConverterSortedSet
firstKey( )—Method in class com.oracle.common.collections.ConverterCollections.ConverterSortedMap
flush( )—Method in interface com.oracle.common.base.Collector
Request processing of any added values.
flush( )—Method in class com.oracle.common.internal, net.socketbus.AbstractSocketBus. Connection
Flush the connection.
flush( )—Method in class com.oracle.common.internal.net.socketbus.AbstractSocketBus
Ensure that any buffered asynchronous operations are dispatched.
flush( )—Method in class com.oracle.common.internal.net.socketbus.BufferedSocketBus.BufferedConnection
Send any scheduled BufferSequences.
flush(boolean)—Method in class com.oracle.common.internal.net.socketbus.BufferedSocketBus.BufferedConnection
Send any scheduled BufferSequences.
flush( )—Method in class com.oracle.common.io.BufferSequenceOutputStream
flush( )—Method in interface com.oracle.common.net.exabus.Bus
Ensure that any buffered asynchronous operations are dispatched.
flush( )—Method in class com.oracle.common.net.exabus.util.MessageBusTest.DemultiplexingCollector
Request processing of any added values.
flush( )—Method in class com.oracle.common.net.exabus.util.MessageBusTest.EchoBus
flush Events( )—Method in class com.oracle.common.internal.net.socketbus.AbstractSocketBus
Flush the event collector.
fromBits(long)—Method in enum com.oracle.common.io.Bandwidth.Rate
Convert the specified number of bits to units of this Bandwidth.Rate.
fromSuffix(String)—Static method in enum com.oracle.common.io.Bandwidth.Magnitude
Determine the Bandwidth.Magnitude given the specified suffix.
fromSuffix(String)—Static method in enum com.oracle.common.io.Bandwidth.Rate
Determine the Bandwidth.Rate given the specified suffix.
fromSuffix(String)—Static method in enum com.oracle.common.io.MemorySize.Magnitude
Determine the MemorySize.Magnitude given the specified suffix.
fromSuffix(String)—Static method in enum com.oracle.common.util.Duration.Magnitude
Determine the Duration.Magnitude given the specified suffix.
get( )—Method in interface com.oracle.common.base.Holder
Return the held object.
get( )—Method in class com.oracle.common.base.SimpleHolder
Return the held object.
get( )—Method in class com.oracle.common.base.VolatileHolder
Return the held object.
get(int)—Method in class com.oracle.common.collections.ConverterCollections.ConverterList
get(Object)—Method in class com.oracle.common.collections.ConverterCollections.ConverterMap
get( )—Method in class com.oracle.common.internal.net.socketbus.SharedBuffer
Return the held object.
get( )—Method in class com.oracle.common.internal.net.socketbus.SharedBuffer.Segment
Return the held object.
get(int)—Method in class com.oracle.common.net.SocketSettings
Return the specified option.
get( )—Static method in class com.oracle.common.util.ThreadLocalRandom
Get the Random instance object associated with this thread.
getAcceptedIssuers( )—Method in class com.oracle.common.internal.security.PeerX509TrustManager
Return an array of certificate authority certificates which are trusted for authenticating peers.

getAddress( )—Method in class com.oracle.common.net.exabus.util.UrlEndPoint
Return the SocketAddress represented by this EndPoint.

getAddress( )—Method in class com.oracle.common.net.InetSocketAddress32
Gets the InetAddress.

getAddressString(Socket)—Method in class com.oracle.common.internal.net.MultiplexedSocketProvider
Return the string form of the socket's address, suitable for resolving via SocketProvider.resolveAddress(java.lang.String), on a remote host.

getAddressString(ServerSocket)—Method in class com.oracle.common.internal.net.MultiplexedSocketProvider
Return the string form of of the server's address, suitable for resolving via SocketProvider.resolveAddress(java.lang.String), on a remote host.

getAddressString(Socket)—Method in class com.oracle.common.net. InetSocketProvider
Return the string form of of the socket's address, suitable for resolving via SocketProvider.resolveAddress(java.lang.String), on a remote host.

getAddressString(ServerSocket)—Method in class com.oracle.common.net. InetSocketProvider
Return the string form of of the server's address, suitable for resolving via SocketProvider.resolveAddress(java.lang.String), on a remote host.

getAddressString(Socket)—Method in interface com.oracle.common.net.SocketProvider
Return the string form of of the socket's address, suitable for resolving via SocketProvider.resolveAddress(java.lang.String), on a remote host.

getAddressString(ServerSocket)—Method in interface com.oracle.common.net.SocketProvider
Return the string form of of the server's address, suitable for resolving via SocketProvider.resolveAddress(java.lang.String), on a remote host.

getAddressString(Socket)—Method in class com.oracle.common.net.SSLSocketProvider
Return the string form of of the socket's address, suitable for resolving via SocketProvider.resolveAddress(java.lang.String), on a remote host.

getAddressString(ServerSocket)—Method in class com.oracle.common.net.SSLSocketProvider
Return the string form of of the server's address, suitable for resolving via SocketProvider.resolveAddress(java.lang.String), on a remote host.

getAndAdd(EndPoint, long, long, Holder<Long>, Object)—Method in interface com.oracle.common.net.exabus.MemoryBus
Request an atomic increment on an eight byte word on the peer.

getAssociatedKey( )—Method in interface com.oracle.common.base.Associated
Determine the host key (or base) object to which this object is associated.

getAssociatedKey(Object)—Method in interface com.oracle.common.base.Associator
Determine the host key (or base) object to which the specified object is associated.

getAssociatedKey(Object)—Method in class com.oracle.common.base.NaturalAssociator
Determine the host key (or base) object to which the specified object is associated.

getAutoFlushThreshold( )—Method in class com.oracle.common.internal.net.socketbus.BufferedSocketBus.BufferedConnection
Return the threshold at which a send/signal operation should perform an auto-flush of the unflushed write batch.

getAutoFlushThreshold( )—Method in class com.oracle.common.internal.net.socketbus.SocketBusDriver.DefaultDependencies
Threshold at which a send/signal operation should perform an auto-flush of the unflushed write batch.

getAutoFlushThreshold( )—Method in interface com.oracle.common.internal, net.socketbus.SocketBusDriver.Dependencies
Threshold at which a send/signal operation should perform an auto-flush of the unflushed write batch.

getBacklog( )—Method in class com.oracle.common.internal.net.MultiplexedSocketProvider.DefaultDependencies getBacklog( )—Method in interface com.oracle.common.internal.net.MultiplexedSocketProvider.Dependencies
Return the backlog setting for the underlying SocketProvider.

getBacklogExcessiveThreshold( )—Method in class com.oracle.common.internal.net.socketbus.BufferedSocketBus.BufferedConnection
Return the threshold at which to declare backlog getBasePort(int)—Static method in class com.oracle.common.internal.net.MultiplexedSocketProvider
Return the base (transport) port for a given 32b port.

getBuffer(int)—Method in interface com.oracle.common.io.BufferSequence
Return the ByteBuffer for a given index.

getBuffer( )—Method in class com.oracle.common.io.BufferSequenceOutputStream
Return the current ByteBuffer with some remaining capacity.

getBuffer(int)—Method in class com.oracle.common.io.MultiBufferSequence
Return the ByteBuffer for a given index.

getBuffer(int)—Method in class com.oracle.common.io.SingleBufferSequence
Return the ByteBuffer for a given index.

getBufferCount( )—Method in interface com.oracle.common.io.BufferSequence
Return the number of ByteBuffers contained in the sequence.

getBufferCount( )—Method in class com.oracle.common.io.MultiBufferSequence
Return the number of ByteBuffers contained in the sequence.

getBufferCount( )—Method in class com.oracle.common.io.SingleBufferSequence
Return the number of ByteBuffers contained in the sequence.

getBufferManager( )—Method in class com.oracle.common.internal.net.socketbus.SocketBusDriver.DefaultDependencies
  Return the BufferManager to use in creating temporary buffers.
getBufferManager( )—Method in interface com.oracle.common.internal, net.socketbus.SocketBusDriver.Dependencies
  Return the BufferManager to use in creating temporary buffers.
getBuffers( )—Method in interface com.oracle.common.io.BufferSequence
  Return an array of ByteBuffers representing the sequence.
getBuffers(int, int, ByteBuffer[ ], int)—Method in interface com.oracle.common.io.BufferSequence
  Copy ByteBuffer duplicates into the supplied array.
getBuffers( )—Method in class com.oracle.common.io.MultiBufferSequence
  Return an array of ByteBuffers representing the sequence.
getBuffers(int, int, ByteBuffer[ ], int)—Method in class com.oracle.common.io.MultiBufferSequence
  Copy ByteBuffer duplicates into the supplied array.
getBuffers( )—Method in class com.oracle.common.io.SingleBufferSequence
  Return an array of ByteBuffers representing the sequence.
getBuffers(int, int, ByteBuffer[ ], int)—Method in class com.oracle.common.io.SingleBufferSequence
  Copy ByteBuffer duplicates into the supplied array.
getBufferTemp( )—Method in class com.oracle.common.io.BufferSequenceInputStream
  Return the stream's reusable buffer.
getBufferTemp( )—Method in class com.oracle.common.io.BufferSequenceOutputStream
  Return the stream's reusable buffer.
getBus( )—Method in class com.oracle.common.net.exabus.util.MessageBusTest.EventProcessor
  Return the MessageBus used by this processor.
getByteBuffer( )—Method in class com.oracle.common.io.BufferSequenceInputStream
  Obtain the ByteBuffer that this InputStream is based on.
getByteCount( )—Method in class com.oracle.common.io.MemorySize
  Obtain the number of bytes represented by the MemorySize.
getByteCount( )—Method in enum com.oracle.common.io.MemorySize.Magnitude
  Determine the number of bytes in a single unit of this MemorySize.Magnitude For example, a kilobyte has 1024 bytes.
getBytesIn( )—Method in class com.oracle.common.net.exabus.util.MessageBusTest.EventProcessor
  Return the number of bytes received.
getBytesOut( )—Method in class com.oracle.common.net.exabus.util.MessageBusTest.EventProcessor
  Return the number of bytes sent.
getBytesOut( )—Method in class com.oracle.common.net.exabus.util.MessageBusTest.Transmitter
  Return the number of bytes sent.
getCanonicalName( )—Method in interface com.oracle.common.net.exabus.EndPoint
  Return the string representation of the EndPoint.
getCanonicalName( )—Method in class com.oracle.common.net.exabus.util.UrlEndPoint
  Return the string representation of the EndPoint.
getCapacity(EndPoint)—Method in interface com.oracle.common.net.exabus.MemoryBus
  Return the capacity of a peer's hosted memory in bytes.
getChannel( )—Method in class com.oracle.common.internal, net.DemultiplexedSocketProvider. DemultiplexedServerSocketChannel
getChannel( )—Method in class com.oracle.common.internal, net.DemultiplexedSocketProvider.DemultiplexedSocket
getChannel( )—Method in class com.oracle.common.internal.net.MultiplexedSocketProvider.MultiplexedServerSocketChannel
getChannel( )—Method in class com.oracle.common.internal, net.MultiplexedSocketProvider.MultiplexedSocket
getChannel( )—Method in class com.oracle.common.internal.net.WrapperServerSocket
getChannel( )—Method in class com.oracle.common.internal.net.WrapperSocket
getChannel( )—Method in class com.oracle.common.net.SafeSelectionHandler
  Return the associated channel.
getCollection( )—Method in class com.oracle.common collections. ConverterCollections.ConverterCollection
  Return the underlying Collection.
getCollection(Collection<F>, Converter<F, T>, Converter<T, F>)—Static method in class com.oracle.common.collections.ConverterCollections
  Returns an instance of Collection that uses a Converter to view an underlying Collection.
getCommonName(Principal)—Method in class com.oracle.common.internal.security.PeerX509TrustManager
  Return the common name of the given principal
getConcurrentWriters( )—Method in class com.oracle.common.internal.net.socketbus.BufferedSocketBus.BufferedConnection
  Return the number of concurrently executing writers.
getConcurrentWriters( )—Method in class com.oracle.common.internal.net.socketbus.BufferedSocketBus.BufferedConnection.WriteBatch
  Return the number of concurrently executing writers.
getConcurrentWriters( )—Method in class com.oracle.common.internal, net.socketbus.SocketMessageBus.MessageConnection
getConnectionCount( )—Method in class com.oracle.common.net.exabus.util.MessageBusTest.EventProcessor
  Return the number of connections.
getContent( )—Method in class com.oracle.common.internal, net.socketbus.MultiBufferMessageEvent
  Obtain the content associated with this event.
getContent( )—Method in class com.oracle.common.internal.net.socketbus.SingleBufferMessageEvent
  Obtain the content associated with this event.
getContent( )—Method in class com.oracle.common.internal.net.socketbus.SocketMessageBus.MessageConnection.ReadBatch.TaskEvent
getContent( )—Method in interface com.oracle.common.net.exabus.Event
  Obtain the content associated with this event.
getContent( )—Method in class com.oracle.common.net.exabus.util.MessageBusTest.StampedEvent getContent( )—Method in class com.oracle.common.net.exabus.util.SimpleEvent
Obtain the content associated with this event.
getConverterDown( )—Method in class com.oracle.common collections. ConverterCollections.ConverterCollection
Return the Converter used to pass values down to the underlying Collection.
getConverterDown( )—Method in class com.oracle.common.collections.ConverterCollections.ConverterListIterator
Return the Converter used to pass values down to the underlying ListIterator.
getConverterKeyDown( )—Method in class com.oracle.common.collections.ConverterCollections.ConverterEntrySet
Return the Converter used to pass keys down to the underlying Entry Set.
getConverterKeyDown( )—Method in class com.oracle.common.collections.ConverterCollections.ConverterMap
Return the Converter used to pass keys down to the underlying Map.
getConverterKeyUp( )—Method in class com.oracle.common collections. ConverterCollections.AbstractConverterEntry
Return the Converter to view the underlying Entry's key through.
getConverterKeyUp( )—Method in class com.oracle.common.collections.ConverterCollections.ConverterEntry
Return the Converter to view the underlying Entry's key through.
getConverterKeyUp( )—Method in class com.oracle.common.collections.ConverterCollections.ConverterEntrySet.ConverterEntry
Return the Converter to view the underlying Entry's key through.
getConverterKeyUp( )—Method in class com.oracle.common.collections.ConverterCollections.ConverterEntrySet
Return the Converter used to view the underlying Entry Set's keys through.
getConverterKeyUp( )—Method in class com.oracle.common.collections.ConverterCollections.ConverterMap
Return the Converter used to view the underlying Map's keys through.
getConverterUp( )—Method in class com.oracle.common collections. ConverterCollections.ConverterCollection
Return the Converter used to view the underlying Collection's values through.
getConverterUp( )—Method in class com.oracle.common.collections.ConverterCollections.ConverterListIterator
Return the Converter used to view the underlying ListIterator's values through.
getConverterValueDown( )—Method in class com.oracle.common collections. ConverterCollections.AbstractConverterEntry
Return the Converter used to change value in the underlying Entry.
getConverterValueDown( )—Method in class com.oracle.common.collections.ConverterCollections.ConverterEntry
Return the Converter used to change value in the underlying Entry.
getConverterValueDown( )—Method in class com.oracle.common.collections.ConverterCollections.ConverterEntrySet.ConverterEntry
Return the Converter used to change value in the underlying Entry.
getConverterValueDown( )—Method in class com.oracle.common.collections.ConverterCollections.ConverterEntrySet
Return the Converter used to pass values down to the underlying Entry Set.
getConverterValueDown( )—Method in class com.oracle.common.collections.ConverterCollections.ConverterMap
Return the Converter used to pass values down to the underlying Map.
getConverterValueUp( )—Method in class com.oracle.common collections. ConverterCollections.AbstractConverterEntry
Return the Converter to view the underlying Entry's value through.
getConverterValueUp( )—Method in class com.oracle.common.collections.ConverterCollections.ConverterEntry
Return the Converter to view the underlying Entry's value through.
getConverterValueUp( )—Method in class com.oracle.common.collections.ConverterCollections.ConverterEntrySet.ConverterEntry
Return the Converter to view the underlying Entry's value through.
getConverterValueUp( )—Method in class com.oracle.common.collections.ConverterCollections.ConverterEntrySet
Return the Converter used to view the underlying Entry Set's values through.
getConverterValueUp( )—Method in class com.oracle.common.collections.ConverterCollections.ConverterMap
Return the Converter used to view the underlying Map's values through.
getDataReadyOps( )—Method in class com.oracle.common.internal.net.ssl.SSLSocketChannel.SSLSelectionKey
Return the SelectionKey ops which apply to the SSLSelectableChannel but not necessarily to the delegate channel.
getDefaultMemoryBusEndPoint( )—Method in class com.oracle.common.net.exabus.util.SimpleDepot.DefaultDependencies
Return the default MessageBus EndPoint name.
getDefaultMemoryBusEndPoint( )—Method in interface com.oracle.common.net.exabus.util.SimpleDepot.Dependencies
Return the default MessageBus EndPoint name.
getDefaultMemoryBusEndPoint( )—Method in class com.oracle.common.net.exabus.util.SimpleDepot
Return the default local MemoryBus EndPoint.
getDefaultMessageBusEndPoint( )—Method in class com.oracle.common.net.exabus.util.SimpleDepot.DefaultDependencies
Return the default MessageBus EndPoint name.
getDefaultMessageBusEndPoint( )—Method in interface com.oracle.common.net.exabus.util.SimpleDepot.Dependencies
Return the default MessageBus EndPoint name.

getDefaultMessageBusEndPoint( )—Method in class com.oracle.common.net.exabus.util.SimpleDepot
  Return the default local MessageBus EndPoint.
getDefaultService( )—Static method in class com.oracle.common.net.SelectionServices
  Return A singleton instance of a SelectionService which is suitable for managing a large number of SelectableChannels efficiently.
getDelegate( )—Method in class com.oracle.common.internal.net.DemultiplexedSocketProvider
  Return the delegate SocketProvider.
getDelegate( )—Method in class com.oracle.common.internal.net.MultiplexedSocketProvider
  Return the SocketProvider which this provider delegates to, or null if this is a root provider.
getDelegate( )—Method in class com.oracle.common.internal.net.WrapperSelector
  Return the Selector to which this selector delegates.
getDelegate( )—Method in class com.oracle.common.net.SdpSocketProvider
getDelegate( )—Method in interface com.oracle.common.net.SocketProvider
  Return the SocketProvider which this provider delegates to, or null if this is a root provider.
getDelegate( )—Method in class com.oracle.common.net.SSLSocketProvider
  Return the SocketProvider which this provider delegates to, or null if this is a root provider.
getDelegate( )—Method in class com.oracle.common.net.TcpSocketProvider
getDelegateProvider( )—Method in class com.oracle.common.internal.net.MultiplexedSocketProvider.DefaultDependencies
getDelegateProvider( )—Method in interface com.oracle.common.internal.net.MultiplexedSocketProvider.Dependencies
  Return the underlying SocketProvider to use.
getDelegateSocketProvider( )—Method in class com.oracle.common.net.SSLSocketProvider.DefaultDependencies
  Return the SocketProvider to use in producing the underling sockets which will be wrapped with SSL.
getDelegateSocketProvider( )—Method in interface com.oracle.common.net.SSLSocketProvider.Dependencies
  Return the SocketProvider to use in producing the underling sockets which will be wrapped with SSL.
getDependencies( )—Method in class com.oracle.common.internal.net.MultiplexedSocketProvider
  Return the provider's dependencies.
getDependencies( )—Method in class com.oracle.common.internal.net.socketbus.SocketBusDriver
  Return the driver's Dependencies.
getDependencies( )—Method in class com.oracle.common.net.exabus.util.SimpleDepot
  Return the Depot's dependencies.
getDependencies( )—Method in class com.oracle.common.net.SSLSocketProvider
  Return the SocketProvider's dependencies.
getDepot( )—Method in class com.oracle.common.internal.net.socketbus.SocketBusDriver
  Return the depot associated with this driver.
getDepot( )—Method in interface com.oracle.common.net.exabus.spi.Driver
  Return the depot associated with this driver.
getDepot( )—Method in class com.oracle.common.net.exabus.util.MessageBusTest.EchoBus.EchoDriver
getDescription( )—Method in enum com.oracle.common.io.Bandwidth.Magnitude
  Obtain the name of the Bandwidth.Magnitude.
getDescription( )—Method in enum com.oracle.common.io.Bandwidth.Rate
  Determine the name of the Bandwidth.Rate.
getDescription( )—Method in enum com.oracle.common.io.MemorySize.Magnitude
  Obtain the name of the MemorySize.Magnitude For example, a kilobyte has the description "kilobyte".
getDirectManager( )—Static method in class com.oracle.common.io.BufferManagers
  Return the direct ByteBuffer based BufferManager.
getDirectWriteThreadThreshold( )—Method in class com.oracle.common.internal.net.socketbus.SocketBusDriver.DefaultDependencies
getDirectWriteThreadThreshold( )—Method in interface com.oracle.common.internal, net.socketbus.SocketBusDriver.Dependencies
  Return the maximum number of threads which should concurrently attempt direct writes.
getDrivers( )—Method in class com.oracle.common.net.exabus.util.SimpleDepot.DefaultDependencies
  Return the Drivers to use in this Depot.
getDrivers( )—Method in interface com.oracle.common.net.exabus.util.SimpleDepot.Dependencies
  Return the Drivers to use in this Depot.
getEmptyBufferArray( )—Static method in class com.oracle.common.io.Buffers
  Return the empty ByteBuffer array singleton.
getEmptyBufferSequence( )—Static method in class com.oracle.common.io.Buffers
  Return the empty BufferSequence singleton.
getEnabledCipherSuites( )—Method in class com.oracle.common.net.SSLSocketProvider.DefaultDependencies
  Return the set of enabled SSL cipher suites.
getEnabledCipherSuites( )—Method in interface com.oracle.common.net.SSLSocketProvider.Dependencies
  Return the set of enabled SSL cipher suites.
getEndPoint( )—Method in class com.oracle.common.internal, net.socketbus.MultiBufferMessageEvent
  Return the EndPoint associated with the event, if any.
getEndPoint( )—Method in class com.oracle.common.internal.net.socketbus.SingleBufferMessageEvent
  Return the EndPoint associated with the event, if any.
getEndPoint( )—Method in class com.oracle.common.internal.net.socketbus.SocketMessageBus.MessageConnection.ReadBatch.TaskEvent
getEndPoint( )—Method in interface com.oracle.common.net.exabus.Event
  Return the EndPoint associated with the event, if any.
getEndPoint( )—Method in class com.oracle.common.net.exabus.util.MessageBusTest.StampedEvent
getEndPoint( )—Method in class com.oracle.common.net.exabus.util.SimpleEvent
  Return the EndPoint associated with the event, if any.
getEntry( )—Method in class com.oracle.common collections. ConverterCollections.AbstractConverterEntry Return the underlying Map. Entry.

getEntry(Map.Entry<FK, FV>, Converter<FK, TK>, Converter<FV, TV>, Converter<TV, FV>)—Static method in class com.oracle.common.collections.ConverterCollections Returns an instance of a MapEntry that uses Converters to retrieve the Entry's data.

getEntrySet( )—Method in class com.oracle.common.collections.ConverterCollections.ConverterEntrySet Return the underlying Entry Set.

getEntrySet(Collection<Map.Entry<FK, FV>>, Converter<FK, TK>, Converter<TK, FK>, Converter<FV, TV>, Converter<TV, FV>)—Static method in class com.oracle.common.collections.ConverterCollections Returns a Converter instance of a Set that holds Entry objects for a ConverterMap.

getEventCollector( )—Method in class com.oracle.common.internal.net.socketbus.AbstractSocketBus Obtain the registered event collector.

getEventCollector( )—Method in interface com.oracle.common.net.exabus.Bus

Obtain the registered event collector.

getEventCollector( )—Method in class com.oracle.common.net.exabus.util.MessageBusTest.EchoBus getExecutor( )—Method in class com.oracle.common.net.SSLSocketProvider.DefaultDependencies Return the Executor to use in offloading delegated tasks.

getExecutor( )—Method in interface com.oracle.common.net.SSLSocketProvider.Dependencies Return the Executor to use in offloading delegated tasks.

getFactor( )—Method in enum com.oracle.common.io.Bandwidth.Magnitude

Obtain the factor of the Bandwidth.Magnitude.

getFactor( )—Method in enum com.oracle.common.util.Duration.Magnitude

Determine the factor of the Duration.Magnitude relative to the number of nanoseconds.

getForceAckThreshold( )—Method in class com.oracle.common.internal.net.socketbus.BufferedSocketBus.BufferedConnection Return the threshold at which forced acks of pending receipts is requested from the peer.

getGarbage( )—Method in class com.oracle.common.net.exabus.util.MessageBusTest.Receipt getHeapManager( )—Static method in class com.oracle.common.io.BufferManagers Return the heap ByteBuffer based BufferManager.

getHostName( )—Method in class com.oracle.common.net.InetSocketAddress32

Gets the hostname.

getHostnameVerifier( )—Method in class com.oracle.common.net.SSLSocketProvider.DefaultDependencies Return the SSL HostnameVerifier to be used to verify hostnames once an SSL session has been established.

getHostnameVerifier( )—Method in interface com.oracle.common.net.SSLSocketProvider.Dependencies Return the SSL HostnameVerifier to be used to verify hostnames once an SSL session has been established.

getIdentificationTimeoutMillis( )—Method in class com.oracle.common.internal.net.MultiplexedSocketProvider.DefaultDependencies Return the number of milliseconds an accepted connection has to provide a multiplexed protocol header before it is considered to be a standard (non-multiplexed) connection.

getIdentificationTimeoutMillis( )—Method in interface com.oracle.common.internal.net.MultiplexedSocketProvider.Dependencies Return the number of milliseconds an accepted connection has to provide a multiplexed protocol header before it is considered to be a standard (non-multiplexed) connection.

getIdleTimeout( )—Method in class com.oracle.common.internal.net.RunnableSelectionService Return the duration the RunnableSelectionService.run( )method should block with no registered keys before returning.

getInetAddress( )—Method in class com.oracle.common.internal.net.WrapperServerSocket getInetAddress( )—Method in class com.oracle.common.internal.net.WrapperSocket getInfiniBusDriver( )—Method in class com.oracle.common.net.exabus.util.SimpleDepot.DefaultDependencies Instantiate an InfiniBusDriver.

getInputStream( )—Method in class com.oracle.common.internal.net.WrapperSocket getIterator( )—Method in class com.oracle.common.collections.ConverterCollections.ConverterEntrySet.ConverterIterator Return the underlying Iterator.

getIterator(Iterator<F>, Converter<F, T>)—Static method in class com.oracle.common.collections.ConverterCollections Returns an instance of Iterator that uses a Converter to view an underlying Iterator.

getKeepAlive( )—Method in class com.oracle.common.internal.net.WrapperSocket getKey( )—Method in class com.oracle.common collections. ConverterCollections.AbstractConverterEntry getKeyString(SelectionKey)—Method in class com.oracle.common.internal.net.WrapperSelector.WrapperSelection Key Return a description of the SelectionKey.

getLength( )—Method in class com.oracle.common.internal.net.socketbus.BufferedSocketBus.BufferedConnection.WriteBatch Return the number of bytes remaining in the batch.

getLength( )—Method in interface com.oracle.common.io.BufferSequence

Return the byte length of the sequence.

getLength( )—Method in class com.oracle.common.io.MultiBufferSequence

Return the byte length of the sequence.

getLength( )—Method in class com.oracle.common.io.SingleBufferSequence

Return the byte length of the sequence.

getList( )—Method in class com.oracle.common.collections.ConverterCollections.ConverterList Return the underlying List.

getList(List<F>, Converter<F, T>, Converter<T, F>)—Static method in class com.oracle.common.collections.ConverterCollections Returns a Converter instance of List.

getListIterator( )—Method in class com.oracle.common collections. ConverterCollections.ConverterListIterator Return the underlying ListIterator.
getListIterator(ListIterator<F>, Converter<F, T>, Converter<T, F>)—Static method in class com.oracle.common.collections.ConverterCollections
  Returns a Converter instance of ListIterator.
getLocalAddress( )—Method in class com.oracle.common.internal.net.WrapperSocket
getLocalBacklogEvents( )—Method in class com.oracle.common.net.exabus.util.MessageBusTest.EventProcessor
  Return the number of local backlog events received.
getLocalBacklogMillis( )—Method in class com.oracle.common.net.exabus.util.MessageBusTest.EventProcessor
  Return the total duration of local backlogs.
getLocalEndPoint( )—Method in class com.oracle.common.internal.net.socketbus.AbstractSocketBus
  Return the EndPoint this bus is bound to.
getLocalEndPoint( )—Method in interface com.oracle.common.net.exabus.Bus
  Return the EndPoint this bus is bound to.
getLocalEndPoint( )—Method in class com.oracle.common.net.exabus.util.MessageBusTest.EchoBus
getLocalPort( )—Method in class com.oracle.common.internal, net.DemultiplexedSocketProvider.DemultiplexedSocket
getLocalPort( )—Method in class com.oracle.common.internal, net.MultiplexedSocketProvider.MultiplexedSocket
getLocalPort( )—Method in class com.oracle.common.internal.net.WrapperServerSocket
getLocalPort( )—Method in class com.oracle.common.internal.net.WrapperSocket
getLocalSegment(long, long)—Method in interface com.oracle.common.net.exabus.MemoryBus
  Return a read-only BufferSequence representing a segment of the locally hosted memory.
getLocalSocketAddress( )—Method in class com.oracle.common.internal, net.DemultiplexedSocketProvider.DemultiplexedSocket
getLocalSocketAddress( )—Method in class com.oracle.common.internal, net.MultiplexedSocketProvider.MultiplexedSocket
getLocalSocketAddress( )—Method in class com.oracle.common.internal.net.WrapperServerSocket
getLocalSocketAddress( )—Method in class com.oracle.common.internal.net.WrapperSocket
getLogger( )—Method in class com.oracle.common.internal.net.MultiplexedSocketProvider.DefaultDependencies
  Return the Logger to use.
getLogger( )—Method in interface com.oracle.common.internal, net.MultiplexedSocketProvider.Dependencies
  Return the Logger to use.
getLogger( )—Method in class com.oracle.common.internal.net.socketbus.AbstractSocketBus
  Return the bus's logger.
getLogger( )—Method in class com.oracle.common.internal.net.socketbus.SocketBusDriver.DefaultDependencies
  Return the Logger to use.
getLogger( )—Method in interface com.oracle.common.internal, net.socketbus.SocketBusDriver.Dependencies
  Return the Logger to use.
getLogger( )—Method in class com.oracle.common.net.exabus.util.SimpleDepot.DefaultDependencies
  Return the Logger to use.
getLogger( )—Method in interface com.oracle.common.net.exabus.util.SimpleDepot.Dependencies
  Return the Logger to use.
getLogger( )—Method in class com.oracle.common.net.SSLSocketProvider.DefaultDependencies
  Return the Logger to use.
getLogger( )—Method in interface com.oracle.common.net.SSLSocketProvider.Dependencies
  Return the Logger to use.
getMap( )—Method in class com.oracle.common.collections.ConverterCollections.ConverterMap
  Return the underlying Map.
getMap(Map<FK, FV>, Converter<FK, TK>, Converter<TK, FK>, Converter<FV, TV>, Converter<TV, FV>)—Static method in class com.oracle.common.collections.ConverterCollections
  Returns a Converter instance of Map.
getMaximumProtocolVersion( )—Method in class com.oracle.common.internal.net.socketbus.AbstractSocketBus
  Return maximum protocol version understood by this implementation.
getMaximumReceiptDelayMillis( )—Method in class com.oracle.common.internal.net.socketbus.SocketBusDriver.DefaultDependencies
  Max time after which the receipt acks will be sent to the peer.
getMaximumReceiptDelayMillis( )—Method in interface com.oracle.common.internal, net.socketbus.SocketBusDriver.Dependencies
  Max time after which the receipt acks will be sent to the peer.
getMaximumUnitSize( )—Method in class com.oracle.common.internal.io.AbstractBufferManager
  Return the maximum allocation size.
getMemoryBusProtocol( )—Method in class com.oracle.common.internal.net.socketbus.SocketBusDriver.DefaultDependencies
  Return the MemoryBus protocol prefix.
getMemoryBusProtocol( )—Method in interface com.oracle.common.internal, net.socketbus.SocketBusDriver.Dependencies
  Return the MemoryBus protocol prefix.
getMessage(int, long, long)—Static method in class com.oracle.common.net.exabus.util.MessageBusTest
  Construct a message.
getMessageBusProtocol( )—Method in class com.oracle.common.internal.net.socketbus.SocketBusDriver.DefaultDependencies
  Return the MessageBus protocol prefix.
getMessageBusProtocol( )—Method in interface com.oracle.common.internal, net.socketbus.SocketBusDriver.Dependencies
  Return the MessageBus protocol prefix.
getMessagesIn( )—Method in class com.oracle.common.net.exabus.util.MessageBusTest.EventProcessor
  Return the number of messages received.
getMessagesOut( )—Method in class com.oracle.common.net.exabus.util.MessageBusTest.EventProcessor
Return the number of Messages sent.
getMessagesOut( )—Method in class com.oracle.common.net.exabus.util.MessageBusTest.Transmitter
Return the number of Messages sent.
getMinimumProtocolVersion( )—Method in class com.oracle.common.internal.net.socketbus.AbstractSocketBus
Return minimum protocol version understood by this implementation.
getMinimumUnitSize( )—Method in class com.oracle.common.internal.io.AbstractBufferManager
Return the minimum allocation size.
getMultiplexedSocketAddress(SocketAddress)—Method in class com.oracle.common.internal.net.DemultiplexedSocketProvider
Helper method to convert InetSocketAddress to InetSocketAddress32 for use by MultiplexedSocketProvider
getNanos( )—Method in class com.oracle.common.util.Duration
Obtains the number of nano seconds in the Duration.
getNetworkDirectManager( )—Static method in class com.oracle.common.io.BufferManagers
Return the network optimized direct ByteBuffer based BufferManager.
getOOBlnline( )—Method in class com.oracle.common.internal.net.WrapperSocket
getOption(int)—Method in class com.oracle.common.net.SocketSettings
getOutputStream( )—Method in class com.oracle.common.internal.net.WrapperSocket
getPacketSize( )—Method in class com.oracle.common.internal, net.socketbus.AbstractSocketBus. Connection
Return the packet size for this connection.
getPeer( )—Method in class com.oracle.common.internal, net.socketbus.AbstractSocketBus. Connection
Return the peer associated with this connection.
getPeers( )—Method in class com.oracle.common.net.exabus.util.MessageBusTest.EventProcessor
Return the set of peers this processor is configured to transmit to
getPort( )—Method in class com.oracle.common.internal, net.DemultiplexedSocketProvider.DemultiplexedSocket
getPort( )—Method in class com.oracle.common.internal.net.MultiplexedSocketProvider.MultiplexedSocket
getPort( )—Method in class com.oracle.common.internal.net.WrapperSocket
getPort( )—Method in class com.oracle.common.net. InetSocketAddress32
Gets the port number.
getPreferredUnitSize( )—Method in class com.oracle.common.internal.io.AbstractBufferManager
Return the preferred unit size.
getPrevious( )—Method in class com.oracle.common.collections.AbstractStableIterator
Obtain the previous object provided by the Iterator.
getProtocol( )—Method in class com.oracle.common.net.exabus.util.UrlEndPoint
Return the protocol represented by this EndPoint.
getProtocolIdentifier( )—Method in class com.oracle.common.internal.net.socketbus.AbstractSocketBus
Return the protocol identifier.
getProtocolName( )—Method in class com.oracle.common.internal.net.socketbus.AbstractSocketBus
Return the protocol name.
getProtocolName( )—Method in class com.oracle.common.internal.net.socketbus.SocketMessageBus
Return the protocol name.
getProtocolReadyOps( )—Method in class com.oracle.common.internal.net.ssl.SSLSocketChannel.SSLSelectionKey
Return the SelectionKey operations which are ready on the SSLSelectableChannel protocol but not necessarily to the delegate channel.
getReadThrottleThreshold( )—Method in class com.oracle.common.internal.net.socketbus.SocketMessageBus.MessageConnection
Return the threshold at which to stop reading additional data from the socket, based on the number of undisposed bytes in the event queue.
getReceiptNanos( )—Method in class com.oracle.common.net.exabus.util.MessageBusTest.EventProcessor
Return the cumulative receipts time.
getReceiptRequestThreshold( )—Method in class com.oracle.common.internal.net.socketbus.SocketBusDriver.DefaultDependencies
Threshold at which to request an immediate receipt from the peer.
getReceiptRequestThreshold( )—Method in interface com.oracle.common.internal, net.socketbus.SocketBusDriver.Dependencies
Threshold at which to request an immediate receipt from the peer.
getReceiptSamples( )—Method in class com.oracle.common.net.exabus.util.MessageBusTest.EventProcessor
Return the number of receipt samples
getReceiptsIn( )—Method in class com.oracle.common.net.exabus.util.MessageBusTest.EventProcessor
Return the number of returned receipts.
getReceiveBufferSize( )—Method in class com.oracle.common.internal, net.socketbus.AbstractSocketBus. Connection
Return the receive buffer size for the underlying socket.
getReceiveBufferSize( )—Method in class com.oracle.common.internal.net.WrapperServerSocket
getReceiveBufferSize( )—Method in class com.oracle.common.internal.net.WrapperSocket
getReceivedBytes( )—Method in class com.oracle.common.net.exabus.util.MessageBusTest.DemultiplexingCollector
Return the total number of received bytes.
getRegisteredConnections( )—Method in class com.oracle.common.internal.net.socketbus.AbstractSocketBus
Return a collection containing all the currently registered connections.
getRemoteBacklogEvents( )—Method in class com.oracle.common.net.exabus.util.MessageBusTest.EventProcessor
Return the number of remote backlog events received.

getRemoteBacklogMillis( )—Method in class com.oracle.common.net.exabus.util.MessageBusTest.Transmitter
Return the total number of milliseconds for which the transmitter was blocked.
getRemoteSocketAddress( )—Method in class com.oracle.common.internal, net.DemultiplexedSocketProvider.DemultiplexedSocket
getRemoteSocketAddress( )—Method in class com.oracle.common.internal, net.MultiplexedSocketProvider.MultiplexedSocket
getRemoteSocketAddress( )—Method in class com.oracle.common.internal.net.WrapperSocket
getResidualBitMask( )—Method in enum com.oracle.common.io.MemorySize.Magnitude
Obtain the bit mask that when applied will return the fractional (right-most) bits that are below this MemorySize.Magnitude unit.
getResponseNanos( )—Method in class com.oracle.common.net.exabus.util.MessageBusTest.EventProcessor
Return the cumulative response time.
getResponsesIn( )—Method in class com.oracle.common.net.exabus.util.MessageBusTest.EventProcessor
Return the number of received responses.
getReuseAddress( )—Method in class com.oracle.common.internal.net.WrapperServerSocket
getReuseAddress( )—Method in class com.oracle.common.internal.net.WrapperSocket
getSafeBuffer( )—Method in class com.oracle.common.io.SingleBufferSequence
Return a view of the ByteBuffer which has it's position and limit set to their original values.
getSegment(int, int)—Method in class com.oracle.common.internal.net.socketbus.SharedBuffer
Return a segment of the shared buffer.
getSegment( )—Method in class com.oracle.common.internal.net.socketbus.SharedBuffer
Return a segment of the shared buffer covering its current position to limit.
getSelectionService( )—Method in class com.oracle.common.internal.net.MultiplexedSocketProvider.DefaultDependencies
getSelectionService( )—Method in interface com.oracle.common.internal.net.MultiplexedSocketProvider.Dependencies
Return the SelectionService to utilize for processing IO.
getSelectionService(SelectableChannel)—Method in class com.oracle.common.internal.net.MultiProviderSelectionService
getSelectionService( )—Method in class com.oracle.common.internal.net.socketbus.AbstractSocketBus
Return the SelectionService for this Bus.
getSelectionService( )—Method in class com.oracle.common.internal.net.socketbus.SocketBusDriver.DefaultDependencies
Return the SelectionService used to run this driver.
getSelectionService( )—Method in interface com.oracle.common.internal, net.socketbus.SocketBusDriver.Dependencies
Return the SelectionService used to run this driver.
getSendBufferSize( )—Method in class com.oracle.common.internal, net.socketbus.AbstractSocketBus. Connection
Return the send buffer size for the underlying socket.

getSendBufferSize( )—Method in class com.oracle.common.internal.net.WrapperSocket
getSet(Set<F>, Converter<F, T>, Converter<T, F>)—Static method in class com.oracle.common.collections.ConverterCollections
Returns an instance of Set that uses a Converter to view an underlying Set.
getSocketAddressHasher( )—Method in class com.oracle.common.internal.net.socketbus.SocketBusDriver.DefaultDependencies
Return the SocketAddress Hasher to use in comparing SocketAddresses.
getSocketAddressHasher( )—Method in interface com.oracle.common.internal, net.socketbus.SocketBusDriver.Dependencies
Return the SocketAddress Hasher to use in comparing SocketAddresses.
getSocketDriver( )—Method in class com.oracle.common.internal.net.socketbus.AbstractSocketBus
Return the SocketDriver for this bus.
getSocketOptions( )—Method in class com.oracle.common.internal.net.socketbus.SocketBusDriver.DefaultDependencies
Return the SocketOptions to utilize in this driver.
getSocketOptions( )—Method in interface com.oracle.common.internal, net.socketbus.SocketBusDriver.Dependencies
Return the SocketOptions to utilize in this driver.
getSocketProvider( )—Method in class com.oracle.common.internal.net.socketbus.SocketBusDriver.DefaultDependencies
Return the SocketProvider to use in producing sockets for this driver.
getSocketProvider( )—Method in interface com.oracle.common.internal, net.socketbus.SocketBusDriver.Dependencies
Return the SocketProvider to use in producing sockets for this driver.
getSocketProvider( )—Method in class com.oracle.common.internal.net.ssl.SSLServerSocketChannel
Return the SocketProvider which produced this socket.
getSocketProvider( )—Method in class com.oracle.common.internal.net.ssl.SSLSocketChannel
Return the SocketProvider which produced this socket.
getSocketReconnectDelayMillis( )—Method in class com.oracle.common.internal.net.socketbus.SocketBusDriver.DefaultDependencies
Reconnect interval for the Connection
getSocketReconnectDelayMillis( )—Method in interface com.oracle.common.internal.net.socketbus.SocketBusDriver.Dependencies
Reconnect interval for the Connection
getSoLinger( )—Method in class com.oracle.common.internal.net.WrapperSocket
getSortedMap( )—Method in class com.oracle.common.collections.ConverterCollections.ConverterSortedMap
Return the underlying SortedMap.
getSortedMap(SortedMap<FK, FV>, Converter<FK, TK>, Converter<TK, FK>, Converter<FV, TV>, Converter<TV, FV>)—Static method in class com.oracle.common.collections.ConverterCollections
Returns a Converter instance of SortedMap.
getSortedSet( )—Method in class com.oracle.common collections. ConverterCollections.ConverterSortedSet
    Return the underlying SortedSet.
getSortedSet(SortedSet<F>, Converter<F, T>, Converter<T, F>)—Static method in class com.oracle.common.collections.ConverterCollections
    Returns an instance of SortedSet that uses a Converter to view an underlying SortedSet.
getSoTimeout( )—Method in class com.oracle.common.internal.net.WrapperServerSocket
getSoTimeout( )—Method in class com.oracle.common.internal.net.WrapperSocket
getSSLContext( )—Method in class com.oracle.common.net.SSLSocketProvider.DefaultDependencies
    Return the SSLContext representing the SSL implementation and configuration.
getSSLContext( )—Method in interface com.oracle.common.net.SSLSocketProvider.Dependencies
    Return the SSLContext representing the SSL implementation and configuration.
getSSLParameters( )—Method in class com.oracle.common.net.SSLSocketProvider.DefaultDependencies
    Return a copy of the SSLParameters used by the SSLSocketProvider.
getSSLParameters( )—Method in interface com.oracle.common.net.SSLSocketProvider.Dependencies
    Return a copy of the SSLParameters used by the SSLSocketProvider.
getSubPort(int)—Static method in class com.oracle.common.internal.net.MultiplexedSocketProvider
    Return the sub-port for a given 32b port.
getSubPort( )—Method in enum com.oracle.common.internal.net.MultiplexedSocketProvider.WellKnownSubPorts
getSuffix( )—Method in enum com.oracle.common.io.Bandwidth.Magnitude
    Obtain the suffix of the Bandwidth.Magnitude.
getSuffix( )—Method in enum com.oracle.common.io.Bandwidth.Rate
    Obtain the suffix that identifies the Bandwidth.Rate.
getSuffix( )—Method in enum com.oracle.common.io.MemorySize.Magnitude
    Obtain the suffix of the MemorySize.Magnitude.
getSuffix( )—Method in enum com.oracle.common.util.Duration.Magnitude
    Obtain the default for the Duration.Magnitude.
getTcpNoDelay( )—Method in class com.oracle.common.internal.net.WrapperSocket
getTimestampNanos( )—Method in class com.oracle.common.net.exabus.util.MessageBusTest.Receipt
getTimestampNanos( )—Method in class com.oracle.common.net.exabus.util.MessageBusTest.StampedEvent
getTrafficClass( )—Method in class com.oracle.common.internal.net.WrapperSocket
getTransportAddress(InetSocketAddress32)—Static method in class com.oracle.common.internal.net.MultiplexedSocketProvider
    Return the underlying transport address for the specified address.
getType( )—Method in class com.oracle.common.internal, net.socketbus.MultiBufferMessageEvent
    Determine the event type.
getType( )—Method in class com.oracle.common.internal, net.socketbus.SingleBufferMessageEvent
    Determine the event type.
getType( )—Method in class com.oracle.common.internal.net.socketbus.SocketMessageBus.MessageConnection.ReadBatch.TaskEvent
getType( )—Method in interface com.oracle.common.net.exabus.Event
    Determine the event type.
getType( )—Method in class com.oracle.common.net.exabus.util.MessageBusTest.StampedEvent
getType( )—Method in class com.oracle.common.net.exabus.util.SimpleEvent
    Determine the event type.
getValue( )—Method in class com.oracle.common collections. ConverterCollections.AbstractConverterEntry
hashCode(V)—Method in interface com.oracle.common.base.Hasher
    Return a hash for the specified object.
hashCode(V)—Method in class com.oracle.common.base.IdentityHasher
    Return a hash for the specified object.
hashCode(V)—Method in class com.oracle.common.base.NaturalHasher
    Return a hash for the specified object.
hashCode( )—Method in class com.oracle.common collections. ConverterCollections.AbstractConverterEntry
hashCode( )—Method in class com.oracle.common.collections.ConverterCollections.ConverterEntrySet
hashCode( )—Method in class com.oracle.common.collections.ConverterCollections.ConverterList
hashCode( )—Method in class com.oracle.common.collections.ConverterCollections.ConverterMap
hashCode( )—Method in class com.oracle.common.collections.ConverterCollections.ConverterSet
hashCode( )—Method in class com.oracle.common.collections.UnmodifiableSetCollection
hashCode( )—Method in class com.oracle.common.internal.net.MultiplexedSocketProvider.MultiplexedSelectorProvider
hashCode( )—Method in class com.oracle.common.internal.net.ssl.SSLSelectorProvider
hashCode( )—Method in class com.oracle.common.io.Bandwidth
hashCode( )—Method in class com.oracle.common.io.MemorySize
hashCode( )—Method in interface com.oracle.common.net.exabus.EndPoint
hashCode( )—Method in class com.oracle.common.net.exabus.util.UrlEndPoint
hashCode(InetAddress)—Method in class com.oracle.common.net.InetAddressHasher
    Return a hash for the specified object.
hashCode( )—Method in class com.oracle.common.net.InetSocketAddress32
    Returns a hashcode for this socket address.

hashCode(SocketAddress)—Method in class com.oracle.common.net.InetSocketAddressHasher
  Return a hash for the specified object.
hashCode( )—Method in class com.oracle.common.util.Duration
Hasher<V>—Interface in com.oracle.common.base
  A Hasher provides an external means for producing hash codes and comparing objects for equality.
  HashSelectionService—Class in com.oracle.common.internal.net
    The HashSelectionService partitions channel registrations over a number of child
SelectionServices for the purposes of load balancing.
HashSelectionService(int, Factory<? extends SelectionService>)—Constructor for class com.oracle.common.internal.net.HashSelectionService
  Construct a HashSelectionService which delegates to the provided SelectionServices.
HashSelectionService.ServiceFactory—Class in com.oracle.common.internal.net
  Factory for producing HashSelectionServices.
HashSelectionService.ServiceFactory(int, Factory<? extends SelectionService>)—Constructor for class com.oracle.common.internal.net.HashSelectionService.ServiceFactory
  Construct a Service Factory which will produce HashSelectionServices with a given configuration.
hasMoreElements( )—Method in class com.oracle.common.collections.AbstractStableIterator
hasMoreElements( )—Method in class com.oracle.common.collections.ConverterCollections.ConverterEnumerator
  Tests if this enumeration contains more elements.
hasNext( )—Method in class com.oracle.common.collections.AbstractStableIterator
hasNext( )—Method in class com.oracle.common.collections.ConverterCollections.ConverterEntrySet.ConverterIterator
hasNext( )—Method in class com.oracle.common.collections.ConverterCollections.ConverterEnumerator
  Determine if this Iterator contains more elements.
hasNext( )—Method in class com.oracle.common.collections.ConverterCollections.ConverterListIterator
hasPrevious( )—Method in class com.oracle.common.collections.ConverterCollections.ConverterListIterator
headMap(TK)—Method in class com.oracle.common.collections.ConverterCollections.ConverterSortedMap
headSet(T)—Method in class com.oracle.common.collections.ConverterCollections.ConverterSortedSet
HIGHEST—Static variable in enum com.oracle.common.io.Bandwidth.Magnitude
  The highest defined order of Bandwidth.Magnitude.
HIGHEST—Static variable in enum com.oracle.common.io.MemorySize.Magnitude
  The highest defined order of MemorySize.Magnitude.
HIGHEST—Static variable in enum com.oracle.common.util.Duration.Magnitude
  The highest defined order of Duration.Magnitude.
Holder<V>—Interface in com.oracle.common.base
  A Holder is a reference like object, i.e.
IB_MEMORY_BUS_PROTOCOL—Static variable in class com.oracle.common.net.exabus.util.SimpleDepot
  Protocol name for the InfiniBus memory bus.
IB_MESSAGE_BUS_PROTOCOL—Static variable in class com.oracle.common.net.exabus.util.SimpleDepot
  Protocol name for the InfiniBus message bus.
IdentityHasher<V>—Class in com.oracle.common.base
  IdentityHasher provides a Hasher implementation based upon an object's identity hashCode and reference equality.
IdentityHasher( )—Constructor for class com.oracle.common.base.IdentityHasher
implCloseSelectableChannel( )—Method in class com.oracle.common.internal.net.MultiplexedSocketProvider.MultiplexedServerSocketChannel
implCloseSelectableChannel( )—Method in class com.oracle.common.internal.net.MultiplexedSocketProvider.MultiplexedSocketChannel
implCloseSelectableChannel( )—Method in class com.oracle.common.internal.net.ssl.SSLSocketChannel
implCloseSelectableChannel( )—Method in class com.oracle.common.internal.net.WrapperServerSocketChannel
implCloseSelectableChannel( )—Method in class com.oracle.common.internal.net.WrapperSocketChannel
implCloseSelector( )—Method in class com.oracle.common.internal.net.MultiplexedSocketProvider.MultiplexedSelector
implCloseSelector( )—Method in class com.oracle.common.internal.net.WrapperSelector
implConfigureBlocking(boolean)—Method in class com.oracle.common.internal.net.MultiplexedSocketProvider.MultiplexedServerSocketChannel
implConfigureBlocking(boolean)—Method in class com.oracle.common.internal.net.ssl.SSLServerSocketChannel
implConfigureBlocking(boolean)—Method in class com.oracle.common.internal.net.ssl.SSLSocketChannel
implConfigureBlocking(boolean)—Method in class com.oracle.common.internal.net.WrapperServerSocketChannel
implConfigureBlocking(boolean)—Method in class com.oracle.common.internal.net.WrapperSocketChannel
indexOf(Object)—Method in class com.oracle.common.collections.ConverterCollections.ConverterList
InetAddressComparator—Class in com.oracle.common.net
  Comparator implementation suitable for comparing InetAddresses.
InetAddressComparator( )—Constructor for class com.oracle.common.net.InetAddressComparator
InetAddressHasher—Class in com.oracle.common.net
  InetAddressHasher is a Hasher which supports both IPv4 and IPv6 InetAddresses.
InetAddressHasher( )—Constructor for class com.oracle.common.net.InetAddressHasher
InetSocketAddress32—Class in com.oracle.common.net
  InetSocketAddress32 is equivalent to the standard InetSocketAddress but supports 32 bit port numbers.
InetSocketAddress32(int)—Constructor for class com.oracle.common.net.InetSocketAddress32
  Creates a socket address where the IP address is the wildcard address and the port number a specified value.
InetSocketAddress32(InetAddress, int)—Constructor for class com.oracle.common.net.InetSocketAddress32
  Creates a socket address from an IP address and a port number.

InetSocketAddress32(String, int)—Constructor for class com.oracle.common.net.InetSocketAddress32
  Creates a socket address from a hostname and a port number.
InetSocketAddressComparator—Class in com.oracle.common.net
  Comparator implementation suitable for comparing InetSocketAddress objects.
InetSocketAddressComparator( )—Constructor for class com.oracle.common.net.InetSocketAddressComparator
InetSocketAddressHasher—Class in com.oracle.common.net
  InetSocketAddressHasher is a Hasher which supports both IPv4 and IPv6 based InetSocketAddresses.
InetSocketAddressHasher( )—Constructor for class com.oracle.common.net.InetSocketAddressHasher
InetSocketProvider—Class in com.oracle.common.net
  InetSocketProvider is a SocketProvider which utilizes InetSocketAddresses.
InetSocketProvider( )—Constructor for class com.oracle.common.net.InetSocketProvider
INFINI_BUS—Static variable in class com.oracle.common.net.exabus.util.SimpleDepot
  Driver name for InifiBus.
InputStreaming—Interface in com.oracle.common.io
  This is the interface represented by the Java InputStream class.
INSTANCE—Static variable in class com.oracle.common.base.IdentityHasher
  A singleton instance of the IdentityHasher.
INSTANCE—Static variable in class com.oracle.common.base.NaturalHasher
  A singleton instance of the NaturalHasher.
INSTANCE—Static variable in class com.oracle.common.net.InetAddressComparator
  Reusable instance of the comparator.
INSTANCE—Static variable in class com.oracle.common.net.InetAddressHasher
  Default instance of the InetAddressHasher.
INSTANCE—Static variable in class com.oracle.common.net.InetSocketAddressComparator
  Reusable instance of the comparator.
INSTANCE—Static variable in class com.oracle.common.net.InetSocketAddressHasher
  Default instance of the InetSocketAddressHasher.
INSTANCE—Static variable in class com.oracle.common.net.SdpSocketProvider
  A default SdpSocketProvider instance.
INSTANCE—Static variable in class com.oracle.common.net.TcpSocketProvider
  A default TcpSocketProvider instance.
INSTANCE—Static variable in class com.oracle.common.util.DaemonThreadFactory
  A reusable DaemonThreadFactory instance.
instantiateCollection(Collection<F>, Converter<F, T>, Converter<T, F>)—Static method in class com.oracle.common collections.ConverterCollections.ConverterCollection
  Create a Converter Collection.
instantiateCollection(Collection<F>, Converter<F, T>, Converter<T, F>)—Static method in class com.oracle.common.collections.ConverterCollections.ConverterMap
  Create a Converter Collection.
instantiateEntrySet(Collection<Map.Entry<FK, FV>>, Converter<FK, TK>, Converter<TK, FK>, Converter<FV, TV>, Converter<TV, FV>)—Static method in class com.oracle.common.collections.ConverterCollections.ConverterEntrySet
  Create a Converter Entry Set.
instantiateEntrySet(Set<Map.Entry<FK, FV>>, Converter<FK, TK>, Converter<TK, FK>, Converter<FV, TV>, Converter<TV, FV>)—Method in class com.oracle.common.collections.ConverterCollections.ConverterMap
  Create a Converter Entry Set.
instantiateIterator(Iterator<F>, Converter<F, T>)—Method in class com.oracle.common collections. ConverterCollections.ConverterCollection
  Create a Converter Iterator.
instantiateList(List<F>, Converter<F, T>, Converter<T, F>)—Static method in class com.oracle.common.collections.ConverterCollections.ConverterList
  Create a Converter List.
instantiateListIterator(ListIterator<F>, Converter<F, T>, Converter<T, F>)—Static method in class com.oracle.common.collections.ConverterCollections.ConverterList
  Create a Converter ListIterator.
instantiateMap(Map<FK, FV>, Converter<FK, TK>, Converter<TK, FK>, Converter<FV, TV>, Converter<TV, FV>)—Static method in class com.oracle.common.collections.ConverterCollections.ConverterMap
  Create a Converter Map.
instantiateSet(Set<F>, Converter<F, T>, Converter<T, F>)—Static method in class com.oracle.common.collections.ConverterCollections.ConverterMap
  Create a Converter Set.
instantiateSortedMap(SortedMap<FK, FV>, Converter<FK, TK>, Converter<TK, FK>, Converter<FV, TV>, Converter<TV, FV>)—Method in class com.oracle.common.collections.ConverterCollections.ConverterSortedMap
  Create a Converter SortedMap.
instantiateSortedSet(SortedSet<F>, Converter<F, T>, Converter<T, F>)—Method in class com.oracle.common collections. ConverterCollections.ConverterSortedSet
  Create a Converter SortedSet.
interestData(int)—Method in class com.oracle.common.internal.net.ssl.SSLSocketChannel.SSLSelectionKey
  Specify the operations of interest to the SSL data layer.
interestData( )—Method in class com.oracle.common.internal.net.ssl.SSLSocketChannel.SSLSelectionKey
  Return the interest operations for the SSL data layer
interestOps( )—Method in class com.oracle.common.internal.net.ssl.SSLSocketChannel.SSLSelectionKey
interestOps(int)—Method in class com.oracle.common.internal.net.ssl.SSLSocketChannel.SSLSelectionKey
interestOps( )—Method in class com.oracle.common.internal.net.WrapperSelector.WrapperSelection Key
interestOps(int)—Method in class com.oracle.common.internal.net.WrapperSelector.WrapperSelection Key
interestProtocol(int, int)—Method in class com.oracle.common.internal.net.ssl.SSLSocketChannel.SSLSelectionKey
    The operations of interest to the SSL protocol layer.
interestProtocol( )—Method in class com.oracle.common.internal.net.ssl.SSLSocketChannel.SSLSelectionKey
    Get the interest operations for the SSL protocol layer
invalidate( )—Method in class com.oracle.common collections. ConverterCollections.ConverterCollection
    Drop references to the underlying Collection and the Converters.
invoke(SelectableChannel, Runnable, long)—Method in class com.oracle.common.internal.net.HashSelectionService
    Invoke the runnable by the SelectionService.
invoke(SelectableChannel, Runnable, long)—Method in class com.oracle.common.internal.net.MultiProviderSelectionService
    Invoke the runnable by the SelectionService.
invoke(SelectableChannel, Runnable, long)—Method in class com.oracle.common.internal.net.ResumableSelectionService
    Invoke the runnable by the SelectionService.
invoke(SelectableChannel, Runnable, long)—Method in class com.oracle.common.internal.net.RunnableSelectionService
    Invoke the runnable by the SelectionService.
invoke(Runnable)—Method in class com.oracle.common.internal.net.socketbus.AbstractSocketBus.Connection
    Schedule an invocation against this channel on the SelectionService.
invoke(SelectableChannel, Runnable, long)—Method in interface com.oracle.common.net.SelectionService
    Invoke the runnable by the SelectionService.
isBound( )—Method in class com.oracle.common.internal.net.WrapperServerSocket
isBound( )—Method in class com.oracle.common.internal.net.WrapperSocket
isClientAuthenticationRequired( )—Method in class com.oracle.common.net.SSLSocketProvider.DefaultDependencies
    Return true iff produced server sockets will require client authentication.
isClientAuthenticationRequired( )—Method in interface com.oracle.common.net.SSLSocketProvider.Dependencies
    Return true iff produced server sockets will require client authentication.
isClosed( )—Method in class com.oracle.common.internal.net.WrapperServerSocket
isClosed( )—Method in class com.oracle.common.internal.net.WrapperSocket
isConnected( )—Method in class com.oracle.common.internal.net.MultiplexedSocketProvider.MultiplexedSocketChannel
isConnected( )—Method in class com.oracle.common.internal.net.WrapperSocket
isConnected( )—Method in class com.oracle.common.internal.net.WrapperSocketChannel
isConnectionPending( )—Method in class com.oracle.common.internal.net.MultiplexedSocketProvider.MultiplexedSocketChannel
isConnectionPending( )—Method in class com.oracle.common.internal.net.WrapperSocketChannel
isEmpty( )—Method in class com.oracle.common collections. ConverterCollections.ConverterCollection
isEmpty( )—Method in class com.oracle.common.collections.ConverterCollections.ConverterEntrySet
isEmpty( )—Method in class com.oracle.common.collections.ConverterCollections.ConverterMap
isEmpty( )—Method in class com.oracle.common.collections.UnmodifiableSetCollection
isFlushInProgress( )—Method in class com.oracle.common.internal.net.socketbus.AbstractSocketBus.Connection
    Return true if some thread is actively waiting to flush this connection.
isFlushRequired( )—Method in class com.oracle.common.internal.net.socketbus.BufferedSocketBus.BufferedConnection
    Return true there is application data pending a flush.
isIdle( )—Method in class com.oracle.common.internal.net.RunnableSelectionService
    Indicate if the service is idle (has no registered channels)).
isInputShutdown( )—Method in class com.oracle.common.internal, net.MultiplexedSocketProvider.MultiplexedSocket
isInputShutdown( )—Method in class com.oracle.common.internal.net.WrapperSocket
isOpen( )—Method in class com.oracle.common.internal, net.socketbus.AbstractSocketBus. Connection
    Return true iff the connection has not been released.
isOutputShutdown( )—Method in class com.oracle.common.internal.net.WrapperSocket
isPending( )—Method in class com.oracle.common.internal, net.MultiplexedSocketProvider.Listener.Switcher
    Return true iff the channel has yet to be "accepted".
isPortExtended(int)—Static method in class com.oracle.common.internal.net.MultiplexedSocketProvider
    Return true iff the specified port represents an extended port.
isReceiptFlushRequired( )—Method in class com.oracle.common.internal.net.socketbus.BufferedSocketBus.BufferedConnection
    Return true iff there are pending receipts that needs to be flushed but no application data to flush
issueLocalBacklog(Event)—Method in class com.oracle.common.internal.net.socketbus.SocketMessageBus.MessageConnection.ReadBatch
    Put this connection in the local backlog state, issuing any requisite events.
isSuffix(String)—Method in enum com.oracle.common.io.Bandwidth.Magnitude
    Determine if the passed suffix is compatible with this Bandwidth.Magnitude's suffix, ignoring case.
isSuffix(String)—Method in enum com.oracle.common.io.MemorySize.Magnitude
    Determine if the passed suffix is compatible with this MemorySize.Magnitude's suffix, ignoring case.

isSuffix(String)—Method in enum com.oracle.common.util.Duration.Magnitude
Determine if the passed suffix is compatible with this Duration.Magnitude's suffix, ignoring case.
isSupported(EndPoint)—Method in class com.oracle.common.internal.net.socketbus.SocketBusDriver
Indicate if the specified EndPoint is supported by this driver.
isSupported(EndPoint)—Method in interface com.oracle.common.net.exabus.spi.Driver
Indicate if the specified EndPoint is supported by this driver.
isSupported(EndPoint)—Method in class com.oracle.common.net.exabus.util.MessageBusTest.EchoBus.EchoDriver
isUnderUtilized(ByteBuffer)—Method in class com.oracle.common.internal.io.AbstractBufferManager
Identify if the specified buffer is under utilized.
isUnresolved( )—Method in class com.oracle.common.net.InetSocketAddress32
Checks whether the address has been resolved or not.
isValid( )—Method in class com.oracle.common.internal, net.socketbus.AbstractSocketBus. Connection
Return if the connection is valid
isValid( )—Method in class com.oracle.common.internal.net.WrapperSelector.WrapperSelectionKey
iterator( )—Method in class com.oracle.common collections. ConverterCollections.ConverterCollection
iterator( )—Method in class com.oracle.common.collections.ConverterCollections.ConverterEntrySet
iterator( )—Method in class com.oracle.common.collections.UnmodifiableSetCollection
keys( )—Method in class com.oracle.common.internal.net.MultiplexedSocketProvider.MultiplexedSelector
keys( )—Method in class com.oracle.common.internal.net.WrapperSelector
keySet( )—Method in class com.oracle.common.collections.ConverterCollections.ConverterMap
last( )—Method in class com.oracle.common collections. ConverterCollections.ConverterSortedSet
lastIndexOf(Object)—Method in class com.oracle.common.collections.ConverterCollections.ConverterList
lastKey( )—Method in class com.oracle.common.collections.ConverterCollections.ConverterSortedMap
listIterator( )—Method in class com.oracle.common.collections.ConverterCollections.ConverterList
listIterator(int)—Method in class com.oracle.common.collections.ConverterCollections.ConverterList
LOGGER—Variable in class com.oracle.common.internal.io.CheckedBufferManager
The Logger to use.
LOGGER—Static variable in class com.oracle.common.internal.io.SegmentedBufferManager
The logger.
LOWEST—Static variable in enum com.oracle.common.io.Bandwidth.Magnitude
The lowest defined order of Bandwidth.Magnitude.
LOWEST—Static variable in enum com.oracle.common.io.MemorySize.Magnitude
The lowest defined order of MemorySize.Magnitude.
LOWEST—Static variable in enum com.oracle.common.util.Duration.Magnitude
The lowest defined order of Duration.Magnitude.
m_aBuffClear—Variable in class com.oracle.common.internal.net.ssl.SSLSocketChannel
An ByteBuffer array containing just the clear text buffer
m_aBuffer—Variable in class com.oracle.common.internal.net.socketbus.BufferedSocketBus.BufferedConnection.WriteBatch
The ByteBuffer array.
m_aBuffer—Variable in class com.oracle.common.internal.net.socketbus.SocketMessageBus.MessageConnection.ReadBatch
The ByteBuffer array.
m_aBuffer—Variable in class com.oracle.common.io.MultiBufferSequence
The ByteBuffer array.
m_aBufferRecycle—Variable in class com.oracle.common.internal.net.socketbus.BufferedSocketBus.BufferedConnection.WriteBatch
The optional ByteBuffer array to recycle in dispose.
m_aBuffSingleInbound—Variable in class com.oracle.common.internal.net.ssl.SSLSocketChannel
A reusable single element buffer array for reads, which also serves as the monitor to protect against multiple concurrent readers.
m_aBuffSingleOutbound—Variable in class com.oracle.common.internal.net.ssl.SSLSocketChannel
A reusable single element buffer array for writes, which also serves as the monitor to protect against multiple concurrent writers.
m_addressLocal—Variable in class com.oracle.common.internal, net.DemultiplexedSocketProvider.DemultiplexedSocket
Local address
m_addressRemote—Variable in class com.oracle.common.internal, net.DemultiplexedSocketProvider.DemultiplexedSocket
Peer address
m_addrLocal—Variable in class com.oracle.common.internal, net.MultiplexedSocketProvider.MultiplexedSocket
Local address
m_addrLocal—Variable in class com.oracle.common.internal.net.MultiplexedSocketProvider.MultiplexedSocketChannel
The socket's local address.
m_addrPeer—Variable in class com.oracle.common.internal, net.MultiplexedSocketProvider.MultiplexedSocket
Peer address
m_addrPeer—Variable in class com.oracle.common.internal.net.MultiplexedSocketProvider.MultiplexedSocketChannel
The peer's address.
m_aPosLimit—Variable in class com.oracle.common.io.MultiBufferSequence
An array of the original positions and limits of each buffer.
m_aProcessor—Variable in class com.oracle.common.net.exabus.util.MessageBusTest.DemultiplexingCollector The array of processors to dispatch to.

m_asCipherSuitesEnabled—Variable in class com.oracle.common.net.SSLSocketProvider.DefaultDependencies The enabled cipher suites or null for default.

m_aServices—Variable in class com.oracle.common.internal.net.HashSelectionService An array of child SelectionServices.

m_aSet—Variable in class com.oracle.common.collections.UnmodifiableSetCollection Wrapped sets m_aTransmitter—Variable in class com.oracle.common.net.exabus.util.MessageBusTest.EventProcessor The number of transmit threads to run.

m_buf—Variable in class com.oracle.common.internal, net.MultiplexedSocketProvider.Listener.Switcher m_buf—Variable in class com.oracle.common.io.BufferSequenceInputStream The ByteBuffer object from which data is read.

m_buffClearin—Variable in class com.oracle.common.internal.net.ssl.SSLSocketChannel Buffered "clear text" data ready to be delivered to the user of this channel.

m_buffEncIn—Variable in class com.oracle.common.internal.net.ssl.SSLSocketChannel Buffered encrypted data from the delegate channel, waiting to be decrypted.

m_buffEncOut—Variable in class com.oracle.common.internal.net.ssl.SSLSocketChannel Buffered encrypted data waiting to be written to the delegate channel.

m_buffer—Variable in class com.oracle.common.internal.net.socketbus.SharedBuffer The buffer.

m_buffer—Variable in class com.oracle.common.io.BufferSequenceOutputStream

The current "unflushed" buffer.

m_buffer—Variable in class com.oracle.common.io.SingleBufferSequence

The ByteBuffer.

m_buffer0—Variable in class com.oracle.common.internal, net.socketbus.MultiBufferMessageEvent The SharedBuffer which manages the first accessable buffer in the array, i.e. m_bufferManager—Variable in class com.oracle.common.internal.net.socketbus.SocketBusDriver.DefaultDependencies The BufferManager.

m_bufferMsgHdr—Variable in class com.oracle.common.internal.net.socketbus.SocketMessageBus.MessageConnection ByteBuffer to write Message headers m_bufferN—Variable in class com.oracle.common.internal, net.socketbus.MultiBufferMessageEvent The SharedBuffer which manages the last accessable buffer in the array, i.e. m_bufferRecycleOutboundReceipts—Variable in class com.oracle.common.internal.net.socketbus.BufferedSocketBus.BufferedConnection ByteBuffer to write Receipt messages m_bufferSegment—Variable in class com.oracle.common.internal.net.socketbus.SharedBuffer.Segment The local accessable portion of the shared buffer.

m_bufferShared—Variable in class com.oracle.common.internal.net.socketbus.SingleBufferMessageEvent The SharedBuffer which manages buffer.

m_bufferShared—Variable in class com.oracle.common.internal.net.socketbus.SocketMessageBus.MessageConnection.ReadBatch Shared buffer protecting remainder of buffer at m_ofReadable.

m_bufHeaderIn—Variable in class com.oracle.common.internal.net.MultiplexedSocketProvider.MultiplexedSocketChannel The inbound protocol header, or more specifically bytes which were read looking for the header but need to be returned from socket read calls before any further socket data.

m_bufHeaderOut—Variable in class com.oracle.common.internal.net.MultiplexedSocketProvider.MultiplexedSocketChannel The outbound protocol header.

m_bufseq—Variable in class com.oracle.common.io.BufferSequenceInputStream

The BufferSequence object from which data is read.

m_bus—Variable in class com.oracle.common.net.exabus.util.MessageBusTest.DemultiplexingCollector The Bus associated with the EventProcessors.

m_bus—Variable in class com.oracle.common.net.exabus.util.MessageBusTest.EventProcessor The MessageBus for this processor.

m_bus—Variable in class com.oracle.common.net.exabus.util.MessageBusTest.Transmitter The associated MessageBus.

m_cb—Variable in class com.oracle.common.io.BufferSequenceInputStream

The number of bytes remaining in the stream.

m_cb—Variable in class com.oracle.common.io.BufferSequenceOutputStream

The sequence length.

m_cBacklogEventsLocal—Variable in class com.oracle.common.net.exabus.util.MessageBusTest.EventProcessor The total number of local backlog events received.

m_cBacklogEventsRemote—Variable in class com.oracle.common.net.exabus.util.MessageBusTest.EventProcessor The total number of remote backlog events received.

m_cBacklogLocal—Variable in class com.oracle.common.internal.net.socketbus.SocketMessageBus The count of the number of connections in the local backlog state.

m_cBacklogMillisLocal—Variable in class com.oracle.common.net.exabus.util.MessageBusTest.EventProcessor The total number of milliseconds for which the EventProcessor was locally backlogged.

m_cbAutoFlush—Variable in class com.oracle.common.internal.net.socketbus.SocketBusDriver.DefaultDependencies Auto flush threshold m_cbAutoFlushThreshold—Variable in class com.oracle.common.internal.net.socketbus.BufferedSocketBus.BufferedConnection The auto-flush threshold.

m_cbBacklogExcessiveThreshold—Variable in class com.oracle.common.internal.net.socketbus.BufferedSocketBus.BufferedConnection
The excessive backlog threshold.

m_cbBatch—Variable in class com.oracle.common.internal.net.socketbus.BufferedSocketBus.BufferedConnection.WriteBatch
The total number of bytes remaining in the batch.

m_cbBuffer—Variable in class com.oracle.common.io.MultiBufferSequence
The number of bytes in the sequence.

m_cbEventQueue—Variable in class com.oracle.common.internal.net.socketbus.SocketMessageBus.MessageConnection
The approximate size of the data in the event queue.

m_cbForceAckThreshold—Variable in class com.oracle.common.internal.net.socketbus.BufferedSocketBus.BufferedConnection
The force ack threshold.

m_cbIn—Variable in class com.oracle.common.net.exabus.util.MessageBusTest.EventProcessor
The number of bytes read.

m_cbMark—Variable in class com.oracle.common.io.BufferSequenceInputStream
The number of bytes remaining in the stream after the mark.

m_cbOut—Variable in class com.oracle.common.net.exabus.util.MessageBusTest.EventProcessor
The number of bytes written.

m_cbOut—Variable in class com.oracle.common.net.exabus.util.MessageBusTest.Transmitter
The number of bytes written.

m_cbQueued—Variable in class com.oracle.common.internal.net.socketbus.BufferedSocketBus.BufferedConnection
The number of bytes in the write queue.

m_cbReadable—Variable in class com.oracle.common.internal.net.socketbus.SocketMessageBus.MessageConnection.ReadBatch
The number of readable bytes.

m_cbReadThreshold—Variable in class com.oracle.common.internal.net.socketbus.SocketMessageBus.MessageConnection
The limit on how much inbound data to buffer.

m_cbReceiptRequest—Variable in class com.oracle.common.internal.net.socketbus.SocketBusDriver.DefaultDependencies
Threshold after which to request receipts.

m_cbReceived—Variable in class com.oracle.common.net.exabus.util.MessageBusTest.DemultiplexingCollector
Array containing received message size totals.

m_cbRequired—Variable in class com.oracle.common.internal.net.socketbus.SocketMessageBus.MessageConnection.ReadBatch
The number of bytes required for the next header or message.

m_cbs—Variable in class com.oracle.common.net.exabus.util.MessageBusTest.Transmitter
The target data rate.

m_cbsIn—Variable in class com.oracle.common.net.exabus.util.MessageBusTest.EventProcessor
The target inbound data rate.

m_cBuffer—Variable in class com.oracle.common.internal.net.socketbus.BufferedSocketBus.BufferedConnection.WriteBatch
The number of buffers remaining.

m_cBuffer—Variable in class com.oracle.common.io.MultiBufferSequence
The number of ByteBuffers in the sequence.

m_cBufferRecycle—Variable in class com.oracle.common.internal.net.socketbus.BufferedSocketBus.BufferedConnection.WriteBatch
The number of buffers to recycle.

m_cBufferWritable—Variable in class com.oracle.common.internal.net.socketbus.SocketMessageBus.MessageConnection.ReadBatch
The number of unfilled buffers remaining, starting at m_ofWritable.

m_cbWritable—Variable in class com.oracle.common.internal.net.socketbus.SocketMessageBus.MessageConnection.ReadBatch
The number of writable bytes.

m_cBytesUnacked—Variable in class com.oracle.common.internal.net.socketbus.BufferedSocketBus.BufferedConnection
As estimate of the number of unacked bytes since the last received ack or sent forced flush.

m_cConnections—Variable in class com.oracle.common.net.exabus.util.MessageBusTest.EventProcessor
The number of open connections.

m_channel—Variable in class com.oracle.common.internal, net.DemultiplexedSocketProvider.DemultiplexedSocket
Associated Socket channel.

m_channel—Variable in class com.oracle.common.internal, net.MultiplexedSocketProvider.MultiplexedSocket
Associated Socket channel.

m_cJobsPending—Variable in class com.oracle.common.internal.net.ssl.SSLSocketChannel
The number of pending jobs scheduled on behalf of the engine.

m_cMaxReceiptDelayMillis—Variable in class com.oracle.common.internal.net.socketbus.SocketBusDriver.DefaultDependencies
Maximum receipt ack delay in millis m_cMillisBacklog—Variable in class com.oracle.common.net.exabus.util.MessageBusTest.Transmitter
The number of milliseconds the transmitter was blocked waiting for peers.

m_cMillisIdentify—Variable in class com.oracle.common.internal.net.MultiplexedSocketProvider.DefaultDependencies
The accept timeout.

m_cMsgIn—Variable in class com.oracle.common.net.exabus.util.MessageBusTest.EventProcessor
The number of received messages.

m_cMsgOut—Variable in class com.oracle.common.net.exabus.util.MessageBusTest.EventProcessor
The number of sent messages.

m_cMsgOut—Variable in class com.oracle.common.net.exabus.util.MessageBusTest.Transmitter
The number of sent messages.

m_cNameSuffix—Variable in class com.oracle.common.util.DaemonThreadFactory
The thread name counter.
m_col—Variable in class com.oracle.common.collections.ConverterCollections.ConverterCollection
The underlying Collection.
m_collector—Variable in class com.oracle.common.net.exabus.util.MessageBusTest.EchoBus
m_connection—Variable in class com.oracle.common.internal.net.socketbus.AbstractSocketBus.HandshakeHandler
Non-null once we can associate the handshake with a local Connection.
m_conv—Variable in class com.oracle.common.collections.ConverterCollections.ConverterEnumerator
Converter to convert each item.
m_convDown—Variable in class com.oracle.common.collections.ConverterCollections.ConverterCollection
The Converter from this Collection to the underlying Collection.
m_convDown—Variable in class com.oracle.common.collections.ConverterCollections.ConverterListIterator
The Converter from this ListIterator to the underlying ListIterator.
m_convKeyDown—Variable in class com.oracle.common.collections.ConverterCollections.ConverterEntrySet
The Converter used to pass keys down to the Entry Set.
m_convKeyDown—Variable in class com.oracle.common.collections.ConverterCollections.ConverterMap
The Converter used to pass keys down to the Map.
m_convKeyUp—Variable in class com.oracle.common.collections.ConverterCollections.ConverterEntry
The Converter used to view the Entry's key.
m_convKeyUp—Variable in class com.oracle.common.collections.ConverterCollections.ConverterEntrySet
The Converter used to view keys stored in the Entry Set.
m_convKeyUp—Variable in class com.oracle.common.collections.ConverterCollections.ConverterMap
The Converter used to view keys stored in the Map.
m_convUp—Variable in class com.oracle.common.collections.ConverterCollections.ConverterCollection
The Converter from the underlying Collection to this Collection.
m_convUp—Variable in class com.oracle.common.collections.ConverterCollections.ConverterListIterator
The Converter from the underlying ListIterator to this ListIterator.
m_convValDown—Variable in class com.oracle.common.collections.ConverterCollections.ConverterEntry
The Converter used to store the Entry's value.
m_convValDown—Variable in class com.oracle.common.collections.ConverterCollections.ConverterEntrySet
The Converter used to pass values down to the Entry Set.
m_convValDown—Variable in class com.oracle.common.collections.ConverterCollections.ConverterMap
The Converter used to pass keys down to the Map.
m_convValUp—Variable in class com.oracle.common.collections.ConverterCollections.ConverterEntry
The Converter used to view the Entry's value.
m_convValUp—Variable in class com.oracle.common.collections.ConverterCollections.ConverterEntrySet
The Converter used to view values stored in the Entry Set.
m_convValUp—Variable in class com.oracle.common.collections.ConverterCollections.ConverterMap
The Converter used to view values stored in the Map.
m_cPendingResponses—Variable in class com.oracle.common.net.exabus.util.MessageBusTest.Transmitter
The number of pending responses.
m_cReceiptsIn—Variable in class com.oracle.common.net.exabus.util.MessageBusTest.EventProcessor
The total number of returned receipts.
m_cReceiptsNanos—Variable in class com.oracle.common.net.exabus.util.MessageBusTest.EventProcessor
The total RTT time for all received receipts.
m_cReceiptsReturn—Variable in class com.oracle.common.internal.net.socketbus.BufferedSocketBus.BufferedConnection
The number of receipts to return to the peer on our next send.
m_cReceiptsUnflushed—Variable in class com.oracle.common.internal.net.socketbus.BufferedSocketBus.BufferedConnection
The number of receipts associated with the unflushed WriteBatch.
m_cReceiptTimings—Variable in class com.oracle.common.net.exabus.util.MessageBusTest.EventProcessor
The total number of received timed receipts.
m_cReconnectDelayMillis—Variable in class com.oracle.common.internal.net.socketbus.SocketBusDriver.DefaultDependencies
Reconnect interval for the Connection in millis
m_cRefs—Variable in class com.oracle.common.internal.net.socketbus.SharedBuffer
The reference count.
m_cResponseIn—Variable in class com.oracle.common.net.exabus.util.MessageBusTest.EventProcessor
The total number of received responses.
m_cResponseNanos—Variable in class com.oracle.common.net.exabus.util.MessageBusTest.EventProcessor
The total RTT time for all received responses.
m_cThreadsDirect—Variable in class com.oracle.common.internal.net.socketbus.SocketBusDriver.DefaultDependencies
The maximum number of concurrent writers on which to attempt direct writes.
m_ctx—Variable in class com.oracle.common.net.SSLSocketProvider.DefaultDependencies
The SSLContext used by this SocketProvider.
m_cWriters—Variable in class com.oracle.common.internal.net.socketbus.BufferedSocketBus.BufferedConnection.WriteBatch An estimate of the number of threads which contributed to the batch.

m_cWritersWaiting—Variable in class com.oracle.common.internal.net.socketbus.SocketMessageBus.MessageConnection The number of threads waiting to send.

m_delegate—Variable in class com.oracle.common.internal.io.CheckedBufferManager

The wrapped BufferManager.

m_delegate—Variable in class com.oracle.common.internal.net.DemultiplexedSocketProvider Underlying MultiplexedSocketProvider m_delegate—Variable in class com.oracle.common.internal.net.MultiplexedSocketProvider.MultiplexedSelectorProvider The delegate SelectorProvider.

m_delegate—Variable in class com.oracle.common.internal.net.ssl.SSLSelectorProvider The delegate SelectorProvider.

m_delegate—Variable in class com.oracle.common.internal.net.WrapperSelector

The wrapped Selector.

m_delegate—Variable in class com.oracle.common.internal.net.WrapperSelector.WrapperSelection Key The delegate SelectionKey.

m_delegate—Variable in class com.oracle.common.internal.net.WrapperServerSocket

The delegate socket.

m_delegate—Variable in class com.oracle.common.internal.net.WrapperServerSocketChannel The delegate channel.

m_delegate—Variable in class com.oracle.common.internal.net.WrapperSocket

The delegate socket.

m_delegate—Variable in class com.oracle.common.internal.net.WrapperSocketChannel The delegate SocketChannel.

m_delegate—Variable in class com.oracle.common.net.SSLSocketProvider.DefaultDependencies The SocketProvider which produces the underlying cleartext sockets.

m_dependencies—Variable in class com.oracle.common.internal.net.MultiplexedSocketProvider The provider's dependencies.

m_dependencies—Variable in class com.oracle.common.internal.net.socketbus.SocketBusDriver The driver's dependencies.

m_dependencies—Variable in class com.oracle.common.net.exabus.util.SimpleDepot

The Depot's Dependencies.

m_dependencies—Variable in class com.oracle.common.net.SSLSocketProvider

The SSLSocketProvider's dependencies.

m_depot—Variable in class com.oracle.common.internal.net.socketbus.SocketBusDriver The Depot managing this driver.

m_depot—Variable in class com.oracle.common.net.exabus.util.MessageBusTest.EchoBus.EchoDriver m_disposer—Variable in class com.oracle.common.internal.net.socketbus.SharedBuffer The associated Disposer m_disposer—Variable in class com.oracle.common.internal.net.socketbus.SocketMessageBus.MessageConnection.ReadBatch Disposer for shared buffers m_driver—Variable in class com.oracle.common.internal.net.socketbus.AbstractSocketBus The SocketDriver which produced this bus.

m_engine—Variable in class com.oracle.common.internal.net.ssl.SSLSocketChannel

The SSLEngine which provides SSL to this channel.

m_entry—Variable in class com.oracle.common collections. ConverterCollections.AbstractConverterEntry The underlying entry.

m_evt—Variable in class com.oracle.common.net.exabus.util.MessageBusTest.StampedEvent m_executor—Variable in class com.oracle.common.net.SSLSocketProvider.DefaultDependencies The SSL executor, or null for default.

m_factory—Variable in class com.oracle.common.internal.net.MultiProviderSelectionService The factory to use when creating new SelectionServices.

m_factory—Variable in class com.oracle.common.internal.net.ResumableSelectionService The Thread Factory to use for producing the threads to run the service.

m_fBacklog—Variable in class com.oracle.common.internal.net.socketbus.BufferedSocketBus.BufferedConnection True if in the backlog state, false otherwise.

m_fBacklogLocal—Variable in class com.oracle.common.internal.net.socketbus.SocketMessageBus.MessageConnection True if we are locally backlogged.

m_fBlock—Variable in class com.oracle.common.net.exabus.util.MessageBusTest.Transmitter True if the transmitter should block while awaiting a response.

m_fBlocking—Variable in class com.oracle.common.internal.net.ssl.SSLServerSocketChannel A cached copy of the configured blocking mode.

m_fBlocking—Variable in class com.oracle.common.internal.net.ssl.SSLSocketChannel A cached copy of the configured blocking mode.

m_fClientAuthRequired—Variable in class com.oracle.common.net.SSLSocketProvider.DefaultDependencies True if client authentication is required.

m_fClosed—Variable in class com.oracle.common.internal.net.MultiplexedSocketProvider.MultiplexedServerSocketChannel Flag indicating if the channel is closed.

m_fFlush—Variable in class com.oracle.common.net.exabus.util.MessageBusTest.DemultiplexingCollector True if the collector requires a bus.flush to be performed.

m_fHandshaking—Variable in class com.oracle.common.internal.net.ssl.SSLSocketChannel Flag indicating if the channel is currently handshaking.

m_fHeader—Variable in class com.oracle.common.internal.net.socketbus.SocketMessageBus.MessageConnection.ReadBatch True if waiting for a message header, false if waiting for a message.

m_fSafe—Variable in class com.oracle.common.io.SingleBufferSequence

Indicates if the original buffer can be returned without duplication.

m_hasher—Variable in class com.oracle.common.internal.net.socketbus.SocketBusDriver.DefaultDependencies The SocketAddress hasher.

m_headerIn—Variable in class com.oracle.common.internal.net.socketbus.AbstractSocketBus.HandshakeHandler The in-bound protocol header.

m_headerOut—Variable in class com.oracle.common.internal.net.socketbus.AbstractSocketBus.HandshakeHandler The out-bound protocol header.

m_hostnameVerifier—Variable in class com.oracle.common.net.SSLSocketProvider.DefaultDependencies The HostnameVerifier used by this SocketProvider.

m_iter—Variable in class com.oracle.common.collections.ConverterCollections.ConverterEntrySet.ConverterIterator The underlying Iterator.

m_iter—Variable in class com.oracle.common.collections.ConverterCollections.ConverterEnumerator Iterator of Objects to convert.

miter—Variable in class com.oracle.common.collections.ConverterCollections.ConverterListIterator The underlying ListIterator.

m_keyFirst—Variable in class com.oracle.common.internal.net.ssl.SSLSocketChannel A linked list of registered SSLSelectionKeys, the linked list must be accessed while holding the read lock, i.e m_aBuffSingleInbound m_keyHead—Variable in class com.oracle.common.internal.net.MultiplexedSocketProvider.MultiplexedServerSocketChannel The head of the SelectionKey linked-list.

m_keyNext—Variable in class com.oracle.common.internal.net.ssl.SSLSocketChannel.SSLSelectionKey A link to the next SSLSelectionKey registered against the associated channel.

m_keyStore—Variable in class com.oracle.common.internal.security.PeerX509TrustManager The key store used by this TrustManager.

m_ldtBacklogLocalStart—Variable in class com.oracle.common.net.exabus.util.MessageBusTest.EventProcessor The time at which the current local backlog condition started, or zero if there is none.

m_ldtBacklogStart—Variable in class com.oracle.common.net.exabus.util.MessageBusTest.Transmitter The start time of the current backlog, or 0 if none is active m_ldtNanos—Variable in class com.oracle.common.net.exabus.util.MessageBusTest.StampedEvent m_listBuffers—Variable in class com.oracle.common.io.BufferSequenceOutputStream The list of flushed buffers.

m_logger—Variable in class com.oracle.common.internal.net.MultiplexedSocketProvider.DefaultDependencies The Logger.

m_logger—Variable in class com.oracle.common.internal.net.socketbus.SocketBusDriver.DefaultDependencies The Logger.

m_logger—Variable in class com.oracle.common.net.exabus.util.SimpleDepot.DefaultDependencies The Logger.

m_logger—Variable in class com.oracle.common.net.SSLSocketProvider.DefaultDependencies The Logger to use.

m_lWritersBitSet—Variable in class com.oracle.common.internal.net.socketbus.BufferedSocketBus.BufferedConnection.WriteBatch Bit set used to identify threads contributing to the batch m_manager—Variable in class com.oracle.common.io.BufferSequenceOutputStream The BufferManager to use in producing the sequence, or null if closed.

m_manager—Variable in class com.oracle.common.io.MultiBufferSequence

The BufferManager m_manager—Variable in class com.oracle.common.io.SingleBufferSequence The BufferManager m_map—Variable in class com.oracle.common.collections.ConverterCollections.ConverterMap The underlying Map.

m_mapBindings—Variable in class com.oracle.common.internal.net.MultiplexedSocketProvider.Listener Map of port to servers.

m_mapDriver—Variable in class com.oracle.common.net.exabus.util.SimpleDepot.DefaultDependencies The Drivers to use.

m_mapListener—Variable in class com.oracle.common.internal.net.MultiplexedSocketProvider Map of Listener addresses to their corresponding Listener object m_mapOptions—Variable in class com.oracle.common.net.SocketSettings A map of the specified options.

m_mapServices—Variable in class com.oracle.common.internal.net.MultiProviderSelectionService Map of SelectorProvider to SelectionService.

m_nBacklog—Variable in class com.oracle.common.internal.net.MultiplexedSocketProvider.DefaultDependencies The backlog.

m_nFlushOn—Variable in class com.oracle.common.net.exabus.util.MessageBusTest.EventProcessor The number of messages to send before flushing.

m_nFlushOn—Variable in class com.oracle.common.net.exabus.util.MessageBusTest.Transmitter The number of messages to send before flushing.

m_nId—Variable in class com.oracle.common.net.exabus.util.MessageBusTest.Transmitter The transmitter ID.

m_nLimit—Variable in class com.oracle.common.io.SingleBufferSequence

The buffer's original limit.

m_nOpsInterestApp—Variable in class com.oracle.common.internal.net.ssl.SSLSocketChannel.SSLSelectionKey
The interest set as specified by the application
m_nOpsInterestData—Variable in class com.oracle.common.internal.net.ssl.SSLSocketChannel.SSLSelectionKey
The interest set as specified by the SSL data layer.
m_nOpsInterestExclude—Variable in class com.oracle.common.internal.net.ssl.SSLSocketChannel.SSLSelectionKey
The interest operations to exclude.
m_nOpsInterestProtocol—Variable in class com.oracle.common.internal.net.ssl.SSLSocketChannel.SSLSelectionKey
The operations which are ready in the SSL protocol layer.
m_nOpsReadyData—Variable in class com.oracle.common.internal.net.ssl.SSLSocketChannel.SSLSelectionKey
The operations which are ready in the SSL data layer.
m_nOpsReadyProtocol—Variable in class com.oracle.common.internal.net.ssl.SSLSocketChannel.SSLSelectionKey
The interest set as specified by the SSL protocol layer.
m_nPortEphemeralHi—Variable in class com.oracle.common.internal.net.MultiplexedSocketProvider
The maximum base ephemeral port number which has at some point been allocated.
m_nPortEphemeralLow—Variable in class com.oracle.common.internal.net.MultiplexedSocketProvider
The minimum base ephemeral port number which has at some point been allocated.
m_nPosition—Variable in class com.oracle.common.io.SingleBufferSequence
The buffer's original position.
m_nSubport—Variable in class com.oracle.common.internal.net.DemultiplexedSocketProvider
Subport to be used by this DemultiplexedSocketProvider
m_of—Variable in class com.oracle.common.io.BufferSequenceInputStream
The offset of the next ByteBuffer to read from.
m_ofBuffer—Variable in class com.oracle.common.internal.net.socketbus.BufferedSocketBus.BufferedConnection.WriteBatch
The current offset into m_aBuffer.
m_ofBuffer—Variable in class com.oracle.common.io.MultiBufferSequence
The offset of the first buffer.
m_ofBufferRecycle—Variable in class com.oracle.common.internal.net.socketbus.BufferedSocketBus.BufferedConnection.WriteBatch
The current offset into m_aBufferRecycle.
m_ofMark—Variable in class com.oracle.common.io.BufferSequenceInputStream
The offset of the buffer associated with the mark.
m_ofReadable—Variable in class com.oracle.common.internal, net.socketbus.SocketMessageBus.MessageConnection.ReadBatch
The array offset of the first readable buffer.
m_ofSafe—Variable in class com.oracle.common.io.MultiBufferSequence
The relative offset of the first buffer in m_aBuffer which is safe to return without duplicating.
m_ofWritable—Variable in class com.oracle.common.internal.net.socketbus.SocketMessageBus.MessageConnection.ReadBatch
The offset of the first buffer to read into (i.e.
m_oKeyUp—Variable in class com.oracle.common collections. ConverterCollections.AbstractConverterEntry
Cached converted key.
m_options—Variable in class com.oracle.common.internal.net.socketbus.SocketBusDriver.DefaultDependencies
The SocketOptions.
m_oValueUp—Variable in class com.oracle.common collections. ConverterCollections.AbstractConverterEntry
Cached converted value.
m_phase—Variable in class com.oracle.common.internal.net.socketbus.AbstractSocketBus.HandshakeHandler
The handshake state.
m_pointSelf—Variable in class com.oracle.common.net.exabus.util.MessageBusTest.EchoBus
m_posMark—Variable in class com.oracle.common.io.BufferSequenceInputStream
The buffer position of the buffer associated with the mark.
m_provider—Variable in class com.oracle.common.internal.net.MultiplexedSocketProvider.DefaultDependencies
The SocketProvider to utilize.
m_provider—Variable in class com.oracle.common.internal.net.MultiplexedSocketProvider.MultiplexedServerSocketChannel
MultiplexedSocketProvider associated with this ServerSocketChannel
m_provider—Variable in class com.oracle.common.internal.net.socketbus.SocketBusDriver.DefaultDependencies
The SocketProvider to use when producing sockets.
m_provider—Variable in class com.oracle.common.internal.net.ssl.SSLServerSocket
The SSLSocketProvider that created this SSLSocket.
m_provider—Variable in class com.oracle.common.internal.net.ssl.SSLSocket
The SSLSocketProvider that created this SSLSocket.
m_providerSocket—Variable in class com.oracle.common.internal.net.ssl.SSLServerSocketChannel
The SSLSocketProvider associated with this socket.
m_providerSocket—Variable in class com.oracle.common.internal.net.ssl.SSLSocketChannel
The SSLSocketProvider associated with this socket.
m_queue—Variable in class com.oracle.common.internal.net.MultiplexedSocketProvider.MultiplexedServerSocketChannel
The queue of ready client channels.
m_queue—Variable in class com.oracle.common.net.exabus.util.MessageBusTest.EventProcessor
The event queue, or null for reentrant processing.
m_queueWrite—Variable in class com.oracle.common.internal.net.socketbus.BufferedSocketBus.BufferedConnection
Queue of WriteBatches which will be written by the service thread.
m_readBatch—Variable in class com.oracle.common.internal.net.socketbus.SocketMessageBus.MessageConnection
The read buffer data.

m_refBufferRecycledInbound—Variable in class com.oracle.common.internal.net.socketbus.SocketMessageBus.MessageConnection.ReadBatch
ByteBuffer recyclable by ReadBatch w/o releasing it to BufferManager
m_sDefaultMemBusEndPoint—Variable in class com.oracle.common.net.exabus.util.SimpleDepot.DefaultDependencies
The default MemoryBus EndPoint name.
m_sDefaultMsgBusEndPoint—Variable in class com.oracle.common.net.exabus.util.SimpleDepot.DefaultDependencies
The default MessageBus EndPoint name.
m_selector—Variable in class com.oracle.common.internal.net.WrapperSelector.WrapperSelectionKey
The associated WrapperSelector.
m_service—Variable in class com.oracle.common.internal.net.MultiplexedSocketProvider.DefaultDependencies
The SelectionService to utilize.
m_service—Variable in class com.oracle.common.internal.net.socketbus.SocketBusDriver.DefaultDependencies
The SelectionService the busses will use for IO processing.
m_set—Variable in class com.oracle.common.collections.ConverterCollections.ConverterEntrySet
The underlying Entry Set (or Collection of Map Entry objects).
m_set—Variable in class com.oracle.common.collections.ConverterCollections.ConverterMap
The Entry Set.
m_setAllocated—Variable in class com.oracle.common.internal.io.CheckedBufferManager
The set of buffers which this manager has handed out but which have yet to be returned.
m_setCancelled—Variable in class com.oracle.common.internal.net.MultiplexedSocketProvider.MultiplexedSelector
The cancelled key set.
m_setEphemeral—Variable in class com.oracle.common.internal.net.MultiplexedSocketProvider.Listener
The Set of allocated sub-ports in the ephemeral range.
m_setKeys—Variable in class com.oracle.common.internal.net.MultiplexedSocketProvider.MultiplexedSelector
The registered key set.
m_setKeys—Variable in class com.oracle.common.internal.net.WrapperSelector
The selector's keys
m_setKeysRO—Variable in class com.oracle.common.internal.net.MultiplexedSocketProvider.MultiplexedSelector
The exposed registered key set.
m_setPeer—Variable in class com.oracle.common.net.exabus.util.MessageBusTest.EventProcessor
Set of peer's to transmit to.
m_setPending—Variable in class com.oracle.common.internal.net.MultiplexedSocketProvider.MultiplexedSelector
The pending ready key set.
m_setReady—Variable in class com.oracle.common.internal.net.MultiplexedSocketProvider.MultiplexedSelector
The ready key set.
m_setReady—Variable in class com.oracle.common.net.exabus.util.MessageBusTest.EventProcessor
Subset of m_setPeer that ready to be transmitted to, i.e.
m_setReady—Variable in class com.oracle.common.net.exabus.util.MessageBusTest.Transmitter
The EndPoints to send to.
m_setSelectedKeys—Variable in class com.oracle.common.internal.net.WrapperSelector
The selector's selected keys
m_sNamePrefix—Variable in class com.oracle.common.util.DaemonThreadFactory
The prefix to use for un-named threads produced by the factory.
m_socket—Variable in class com.oracle.common.internal.net.MultiplexedSocketProvider.MultiplexedServerSocketChannel
The ServerSocket representation of this channel.
m_socket—Variable in class com.oracle.common.internal.net.WrapperServerSocketChannel
The associated ServerSocket.
m_socket—Variable in class com.oracle.common.internal.net.WrapperSocketChannel
The associated WrapperSocket.
m_sProtocolMemoryBus—Variable in class com.oracle.common.internal.net.socketbus.SocketBusDriver.DefaultDependencies
The message bus protocol prefix.
m_sProtocolMessageBus—Variable in class com.oracle.common.internal.net.socketbus.SocketBusDriver.DefaultDependencies
The message bus protocol prefix.
m_src—Variable in class com.oracle.common.internal.net.socketbus.MultiBufferMessageEvent
The MessageConnection associated with the event.
m_src—Variable in class com.oracle.common.internal.net.socketbus.SingleBufferMessageEvent
The MessageConnection associated with the event.
m_thread—Variable in class com.oracle.common.internal.net.ResumableSelectionService
The thread running the service.
m_value—Variable in class com.oracle.common.base.SimpleHolder
The held value.
m_value—Variable in class com.oracle.common.base.VolatileHolder
The held value.
m_writeBatchFirst—Variable in class com.oracle.common.internal.net.socketbus.BufferedSocketBus.BufferedConnection
The next writeBatch to be processed by the SelectionService thread.
m_writeBatchUnflushed—Variable in class com.oracle.common.internal.net.socketbus.BufferedSocketBus.BufferedConnection
The current unflushed WriteBatch, or null.
main(String[ ])—Static method in class com.oracle.common.net.exabus.util.MessageBusTest
Run the MessageBusTest application.
makeConnection(UrlEndPoint)—Method in class com.oracle.common.internal.net.socketbus.AbstractSocketBus Factory pattern method for instantiating Connection objects.
makeConnection(UrlEndPoint)—Method in class com.oracle.common.internal.net.socketbus.SocketMessageBus
Factory pattern method for instantiating Connection objects.
makeExceptionRecord(Level, Throwable, String, Object . . . )—Method in class com.oracle.common.internal.net.socketbus.AbstractSocketBus
Construct a log record with an exception.
makeKey(Selector)—Method in class com.oracle.common.internal.net.MultiplexedSocketProvider.MultiplexedServerSocketChannel
Register this channel with specified selector.
makeRecord(Level, String, Object . . . )—Method in class com.oracle.common.internal.net.socketbus.AbstractSocketBus
Construct a log record.
mark(int)—Method in class com.oracle.common.io.BufferSequenceInputStream
mark(int)—Method in interface com.oracle.common.io.InputStreaming
Marks the current read position in the InputStream in order to support the stream to be later "rewound" (using the InputStreaming.reset( )method) to the current position.
markKeysReadable(boolean)—Method in class com.oracle.common.internal.net.ssl.SSLSocketChannel
Prepare the registered keys for selection.
markSupported( )—Method in class com.oracle.common.io.BufferSequenceInputStream
markSupported( )—Method in interface com.oracle.common.io.InputStreaming
Determine if this InputStream supports the InputStreaming.mark(int) and InputStreaming.reset( )methods.
MemoryBus—Interface in com.oracle.common.net.exabus
A MemoryBus provides access to regions of remotely accessible memory.
MemorySize—Class in com.oracle.common.io
A MemorySize represents an amount of memory, with byte accuracy.
MemorySize(long)—Constructor for class com.oracle.common.io.MemorySize
Construct a MemorySize give a specified number of bytes.
MemorySize(MemorySize)—Constructor for class com.oracle.common.io.MemorySize
Constructs a MemorySize based on another MemorySize.
MemorySize(String)—Constructor for class com.oracle.common.io.MemorySize
Construct a MemorySize by parsing the specified String.
MemorySize(double, MemorySize.Magnitude)—Constructor for class com.oracle.common.io.MemorySize
Construct a MemorySize given a specified amount of a MemorySize.Magnitude.
MemorySize(int, MemorySize.Magnitude)—Constructor for class com.oracle.common.io.MemorySize
Construct a MemorySize given a specified amount of a MemorySize.Magnitude.
MemorySize(String, MemorySize.Magnitude)—Constructor for class com.oracle.common.io.MemorySize
Construct a MemorySize by parsing the specified String.
MemorySize.Magnitude—Enum in com.oracle.common.io
The MemorySize.Magnitude of the MemorySize.
MessageBus—Interface in com.oracle.common.net.exabus
A MessageBus is a Bus that provides a message-passing communication model.
MessageBusTest—Class in com.oracle.common.net.exabus.util
MessageBusTest is an application for testing the performance characteristics of MessageBus implementations and the network on which they operate.
MessageBusTest( )—Constructor for class com.oracle.common.net.exabus.util.MessageBusTest
MessageBusTest.DemultiplexingCollector—Class in com.oracle.common.net.exabus.util
MessageBusTest.DemultiplexingCollector(Bus, MessageBusTest. EventProcessor[ ])—Constructor for class com.oracle.common.net.exabus.util.MessageBusTest.DemultiplexingCollector
Construct a DemultiplexingCollector which dispatches to the specified queues.
MessageBusTest.EchoBus—Class in com.oracle.common.net.exabus.util
EchoBus is a simple MessageBus implementation which echos all messages back to itself.
MessageBusTest. EchoBus(EndPoint)—Constructor for class com.oracle.common.net.exabus.util.MessageBusTest.EchoBus
MessageBusTest.EchoBus.EchoDriver—Class in com.oracle.common.net.exabus.util
MessageBusTest.EchoBus.EchoDriver( )—Constructor for class com.oracle.common.net.exabus.util.MessageBusTest.EchoBus.EchoDriver
MessageBusTest.EventProcessor—Class in com.oracle.common.net.exabus.util
EventProcessor is the basis for a thread which will handle bus event streams.
MessageBusTest.EventProcessor(MessageBus, Set<EndPoint>, Set<EndPoint>,
MessageBusTest.Transmitter[ ], long, int)—Constructor for class com.oracle.common.net.exabus.util.MessageBusTest.EventProcessor
Construct an EventProcessor.
MessageBusTest.Receipt—Class in com.oracle.common.net.exabus.util
Receipt object used in the test.
MessageBusTest.Receipt(long, Disposable)—Constructor for class com.oracle.common.net.exabus.util.MessageBusTest.Receipt
MessageBusTest.SkipStream—Class in com.oracle.common.net.exabus.util
SkipStream in an OutputStream with the ability to skip a number of bytes.
MessageBusTest.SkipStream(BufferManager, int)—Constructor for class com.oracle.common.net.exabus.util.MessageBusTest.SkipStream
Construct a SkipStream
MessageBusTest.StampedEvent—Class in com.oracle.common.net.exabus.util
StampedEvent adds a nano-resolution timestamp to events at the time of construction.
MessageBusTest.StampedEvent(Event)—Constructor for class com.oracle.common.net.exabus.util.MessageBusTest.StampedEvent
MessageBusTest.Transmitter—Class in com.oracle.common.net.exabus.util
A Transmitter is responsible for sending messages on a bus to a series of peers.
MessageBusTest.Transmitter(MessageBus, int, Set<EndPoint>, int, boolean)—Constructor for class com.oracle.common.net.exabus.util.MessageBusTest.Transmitter
Construct a Transmitter.
METHOD_OPEN_CLIENT—Static variable in class com.oracle.common.net.SdpSocketProvider
The method for opening SDP Socket.
METHOD_OPEN_CLIENT_CHANNEL—Static variable in class
com.oracle.common.net.SdpSocketProvider
The method for opening SDP SocketChannels.
METHOD_OPEN_SERVER—Static variable in class
com.oracle.common.net.SdpSocketProvider
The method for opening SDP ServerSocket.
METHOD_OPEN_SERVER_CHANNEL—Static variable in class
com.oracle.common.net.SdpSocketProvider
The method for opening SDP ServerSocketChannels.
MSG_HEADER_SIZE—Static variable in class
com.oracle.common.internal.net.socketbus.SocketMessageBus
The size of the message header.
MSG_HEADER_SIZE—Static variable in class
com.oracle.common.net.exabus.util.MessageBusTest
The message header size used in the test.
MSG_RECEIPT—Static variable in class
com.oracle.common.internal.net.socketbus.BufferedSocketBus
Internal message type for exchanging receipts.
MSG_RECEIPT_SIZE—Static variable in class
com.oracle.common.internal.net.socketbus.BufferedSocketBus
Receipt message size
MSG_SIGNAL—Static variable in class
com.oracle.common.internal.net.socketbus.BufferedSocketBus
Internal message type indicating that a signal event should be raised.
MultiBufferMessageEvent—Class in com.oracle.common.internal.net.socketbus
MultiBufferMessageEvent is an implementation of a Bus Event for Messages over a series of
Buffers where the first and last buffer in the series come from SharedBuffers.
MultiBufferMessageEvent(SocketMessageBus.MessageConnection, BufferManager,
ByteBuffer[ ], int, int, long, SharedBuffer, SharedBuffer)—Constructor for class
com.oracle.common.internal, net.socketbus.MultiBufferMessageEvent
Construct a MultiBufferMessageEvent.
MultiBufferSequence—Class in com.oracle.common.io
MultiBufferSequence is a thread-safe BufferSequence implementation based on an array of ByteBuffers.
MultiBufferSequence(BufferManager, ByteBuffer[ ])—Constructor for class
com.oracle.common.io.MultiBufferSequence
Construct a MultiBufferSequence from an array of ByteBuffers.
MultiBufferSequence(BufferManager, ByteBuffer[ ], int, int)—Constructor for class
com.oracle.common.io.MultiBufferSequence
Construct a MultiBufferSequence from an array of ByteBuffers.
MultiBufferSequence(BufferManager, ByteBuffer[ ], int, int, long)—Constructor for class
com.oracle.common.io.MultiBufferSequence
Construct a MultiBufferSequence from an array of ByteBuffers.
MULTIPLEXED—Static variable in class com.oracle.common.net.SdpSocketProvider
A default Multiplexed SdpSocketProvider.
MULTIPLEXED—Static variable in class com.oracle.common.net.TcpSocketProvider
A default Multiplexed TcpSocketProvider.
MultiplexedSocketProvider—Class in com.oracle.common.internal.net
MultiplexedSocketProvider produces a family of sockets which utilize extended port values to allow for multiplexing of sockets.
MultiplexedSocketProvider(MultiplexedSocketProvider.Dependencies)—Constructor for class
com.oracle.common.internal.net.MultiplexedSocketProvider
Construct a MultiplexedSocketProvider.
MultiplexedSocketProvider.DefaultDependencies—Class in com.oracle.common.internal.net
DefaultDependencies provides a default implementation of the Dependencies interface.
MultiplexedSocketProvider.DefaultDependencies( )—Constructor for class
com.oracle.common.internal.net.MultiplexedSocketProvider. DefaultDependencies
Produce a DefaultDependencies object initialized with all defaults.
MultiplexedSocketProvider.DefaultDependencies(MultiplexedSocketProvider.Dependencies)—Constructor for class
com.oracle.common.internal.net.MultiplexedSocketProvider. DefaultDependencies
Produce a copy based on the supplied Dependencies.
MultiplexedSocketProvider.Dependencies—Interface in com.oracle.common.internal.net
Dependencies describes the MultiplexedSocketProvider's dependencies.
MultiplexedSocketProvider.ListenChannel—Class in com.oracle.common.internal.net
Helper wrapper for the real ServerSocketChannel to allow it to be managed by the multiplexed SelectionService.
MultiplexedSocketProvider.ListenChannel(ServerSocketChannel)—Constructor for class
com.oracle.common.internal.net.MultiplexedSocketProvider.ListenChannel
MultiplexedSocketProvider.Listener—Class in com.oracle.common.internal.net
Listener is a SelectionHandler which waits on the real ServerSocketChannel for new connections.
MultiplexedSocketProvider.Listener(ServerSocketChannel)—Constructor for class
com.oracle.common.internal.net.MultiplexedSocketProvider.Listener
MultiplexedSocketProvider.Listener.Switcher—Class in com.oracle.common.internal.net
Switcher handles the initial protocol header from new connections.

MultiplexedSocketProvider.Listener.Switcher(SocketChannel)—Constructor for class com.oracle.common.internal, net.MultiplexedSocketProvider.Listener.Switcher MultiplexedSocketProvider.MultiplexedChannel—Interface in com.oracle.common.internal.net
Common interface implemented by all channels serviced by this provider.

MultiplexedSocketProvider.MultiplexedSelector—Class in com.oracle.common.internal.net
MultiplexedSelector is a Selector implementation for use with Sockets produced by this provider.

MultiplexedSocketProvider.MultiplexedSelector(Selector, SelectorProvider)—Constructor for class com.oracle.common.internal.net.MultiplexedSocketProvider.MultiplexedSelector
Construct a MultiplexedSelector.

MultiplexedSocketProvider.MultiplexedSelectorProvider—Class in com.oracle.common.internal.net
MultiplexedSelectorProvider provides a SelectorProvider interface to this SocketProvider.

MultiplexedSocketProvider.MultiplexedSelectorProvider(SelectorProvider)—Constructor for class com.oracle.common.internal.net.MultiplexedSocketProvider.MultiplexedSelectorProvider MultiplexedSocketProvider.MultiplexedSelectorProvider(SocketProvider)—Constructor for class com.oracle.common.internal, net.MultiplexedSocketProvider.MultiplexedSelectorProvider MultiplexedSocketProvider.MultiplexedServerSocketChannel—Class in com.oracle.common.internal.net
MultiplexedServerSocketChannel is an implementation of a ServerSocketChannel which shares an underlying ServerSocketChannel with a number of other MultiplexedServerSocketChannels.

MultiplexedSocketProvider.MultiplexedServerSocketChannel(MultiplexedSocketProvider)—Constructor for class com.oracle.common.internal, net.MultiplexedSocketProvider.MultiplexedServerSocketChannel MultiplexedSocketProvider.MultiplexedSocket—Class in com.oracle.common.internal.net
MultiplexedSocket is an implementation of a Socket that works with multiplexed socket addresses represented by InetSocketAddress32.

MultiplexedSocketProvider.MultiplexedSocket(Socket, MultiplexedSocketProvider.MultiplexedSocketChannel)—Constructor for class com.oracle.common.internal, net.MultiplexedSocketProvider.MultiplexedSocket
Construct a MultiplexedSocket.

MultiplexedSocketProvider.MultiplexedSocketChannel—Class in com.oracle.common.internal.net
MultiplexedSocketChannel MultiplexedSocketProvider.MultiplexedSocketChannel(SocketChannel, SocketAddress, ByteBuffer)—Constructor for class com.oracle.common.internal.net.MultiplexedSocketProvider.MultiplexedSocketChannel
Create a MultiplexedSocketChannel for an incoming SocketChannel MultiplexedSocketProvider.MultiplexedSocketChannel.SocketSelectionKey—Class in com.oracle.common.internal.net
SelectionKey which is aware of the state of the channel's inbound buffer.

MultiplexedSocketProvider.MultiplexedSocketChannel.SocketSelectionKey(WrapperSelector, Selection Key, Object)—Constructor for class com.oracle.common.internal.net.MultiplexedSocketProvider.MultiplexedSocketChannel.SocketSelectionKey MultiplexedSocketProvider.WellKnownSubPorts—Enum in com.oracle.common.internal.net
WellKnownSubports are sub-ports that are reserved for use by components.

MultiProviderSelectionService—Class in com.oracle.common.internal.net
The MultiProviderSelectionService supports registration of channels from multiple SelectorProviders.

Multi ProviderSelectionService(Factory<? extends SelectionService>)—Constructor for class com.oracle.common.internal.net.MultiProviderSelectionService
Construct a Multi ProviderSelectionService.

NAME—Static variable in class com.oracle.common.internal.security.SecurityProvider
The name of this provider.

NaturalAssociator—Class in com.oracle.common.base
NaturalAssociator provides an Associator implementation for objects that implement the Associated interface.

NaturalAssociator( )—Constructor for class com.oracle.common.base.NaturalAssociator NaturalHasher<V>—Class in com.oracle.common.base
NaturalHasher provides a Hasher implementation based upon an object's internal hashCode and equals implementation.

NaturalHasher( )—Constructor for class com.oracle.common.base.NaturalHasher newThread(Runnable)—Method in class com.oracle.common.util.DaemonThreadFactory next( )—Method in class com.oracle.common.collections.AbstractStableIterator next( )—Method in class com.oracle.common.collections.ChainedIterator next( )—Method in class com.oracle.common.collections.ConverterCollections.ConverterEntrySet.ConverterIterator next( )—Method in class com.oracle.common.collections.ConverterCollections.ConverterEnumerator
Returns the next element of this Iterator.

next( )—Method in class com.oracle.common.collections.ConverterCollections.ConverterListIterator next( )—Method in enum com.oracle.common.io.Bandwidth.Magnitude
Obtain the next order of Bandwidth.Magnitude (above this one).

next( )—Method in enum com.oracle.common.io.MemorySize.Magnitude
Obtain the next order of MemorySize.Magnitude (above this one).

next( )—Method in enum com.oracle.common.util.Duration.Magnitude
Obtain the next order of Duration.Magnitude (above this one).

nextElement( )—Method in class com.oracle.common.collections.AbstractStableIterator nextElement( )—Method in class com.oracle.common.collections.ConverterCollections.ConverterEnumerator
  Get the next element in the enumeration.
nextIndex( )—Method in class com.oracle.common.collections.ConverterCollections.ConverterListIterator
onAbandon( )—Method in class com.oracle.common.internal.net.socketbus.AbstractSocketBus.HandshakeHandler
  Handle extra data supplied to an abandoned connection.
onAccept( )—Method in class com.oracle.common.internal.net.socketbus.AbstractSocketBus.HandshakeHandler
  Evaluate the "accept" byte.
onClose( )—Method in class com.oracle.common.internal.net.socketbus.AbstractSocketBus
  Called as part of the closing the bus.
onControlMessage(Event, Event)—Method in class com.oracle.common.internal.net.socketbus.SocketMessageBus.MessageConnection.ReadBatch
  Handle a control event.
onEndOfStream( )—Method in class com.oracle.common.internal.net.ssl.SSLSocketChannel
  Called to indicate that the inbound stream will emit no further data.
onEvent(Event)—Method in class com.oracle.common.net.exabus.util.MessageBusTest.EventProcessor
  Process an event
onException(Throwable)—Method in class com.oracle.common.internal.net.MultiplexedSocketProvider.Listener
onException(Throwable)—Method in class com.oracle.common.internal.net.socketbus.AbstractSocketBus.AcceptHandler
  Called in the event that SafeSelectionHandler.onReadySafe(int) resulted in an exception.
onException(Throwable)—Method in class com.oracle.common.internal, net.socketbus.AbstractSocketBus. Connection
  Called in the event that AbstractSocketBus.Connection.onReadySafe(int) resulted in an exception.
onException(Throwable)—Method in class com.oracle.common.internal.net.socketbus.AbstractSocketBus.HandshakeHandler
  Called in the event that SafeSelectionHandler.onReadySafe(int) resulted in an exception.
onException(Throwable)—Method in class com.oracle.common.net.SafeSelectionHandler
  Called in the event that SafeSelectionHandler.onReadySafe(int) resulted in an exception.
onIdentify( )—Method in class com.oracle.common.internal.net.socketbus.AbstractSocketBus.HandshakeHandler
  Evaluate the peer's protocol identification.
onIntroduce( )—Method in class com.oracle.common.internal.net.socketbus.AbstractSocketBus.HandshakeHandler
  Evaluate the introduction.
onLastEvent(Event)—Method in class com.oracle.common.internal.net.socketbus.SocketMessageBus.MessageConnection.ReadBatch
  onLastEvent is called when the last event is is ready to be emitted (see onReady).
onMessage(Event)—Method in class com.oracle.common.net.exabus.util.MessageBusTest.EventProcessor
  Handle an inbound message.
onMessageDispose(BufferSequence)—Method in class com.oracle.common.internal, net.socketbus.SocketMessageBus.MessageConnection
  Called as part of disposing a MessageEvent.
onOpen( )—Method in class com.oracle.common.internal.net.socketbus.AbstractSocketBus
  Called once a bus has been opened.
onOpen( )—Method in class com.oracle.common.internal.net.socketbus.BufferedSocketBus
  Called once a bus has been opened.
onReady(int)—Method in class com.oracle.common.internal, net.socketbus.AbstractSocketBus. Connection
  Called when the channel has been selected.
onReady( )—Method in class com.oracle.common.internal.net.socketbus.SocketMessageBus.MessageConnection.ReadBatch
  Process the next message(s) from the already read data.
onReady(int)—Method in class com.oracle.common.net.SafeSelectionHandler
  Called when the channel has been selected.
onReady(int)—Method in interface com.oracle.common.net.SelectionService.Handler
  Called when the channel has been selected.
onReadySafe(int)—Method in class com.oracle.common.internal.net.MultiplexedSocketProvider.Listener
onReadySafe(int)—Method in class com.oracle.common.internal, net.MultiplexedSocketProvider.Listener.Switcher
onReadySafe(int)—Method in class com.oracle.common.internal.net.socketbus.AbstractSocketBus.AcceptHandler
  Called when the channel has been selected.
onReadySafe(int)—Method in class com.oracle.common.internal, net.socketbus.AbstractSocketBus.Connection
  Called when the channel has been selected.
onReadySafe(int)—Method in class com.oracle.common.internal.net.socketbus.AbstractSocketBus.HandshakeHandler
  Called when the channel has been selected.
onReadySafe(int)—Method in class com.oracle.common.internal.net.socketbus.BufferedSocketBus.BufferedConnection
  Called when the channel has been selected.
onReadySafe(int)—Method in class com.oracle.common.net.SafeSelectionHandler
  Called when the channel has been selected.
onReleased( )—Method in class com.oracle.common.internal, net.socketbus.AbstractSocketBus. Connection
  Called once a connection has been released.
onReleased( )—Method in class com.oracle.common.internal.net.socketbus.BufferedSocketBus.BufferedConnection
  Called once a connection has been released.
onReleased( )—Method in class com.oracle.common.internal.net.socketbus.SocketMessageBus.MessageConnection
  Called once a connection has been released.
onSocketConnectException(IOException)—Method in class com.oracle.common.internal, net.socketbus.AbstractSocketBus. Connection
    Called when a socket connect fails do to a SocketException.
OP_ACCEPT—Static variable in interface com.oracle.common.net.SelectionService.Handler
    Operation-set bit for socket-accept operations.
OP_CONNECT—Static variable in interface com.oracle.common.net.SelectionService.Handler
    Operation-set bit for socket-connect operations.
OP_EAGER—Static variable in interface com.oracle.common.net.SelectionService.Handler
    Operation-set bit indicating that it is likely that at least one of the other bits in the set are likely to be satisfied soon.
OP_READ—Static variable in interface com.oracle.common.net.SelectionService.Handler
    Operation-set bit for read operations.
OP_WRITE—Static variable in interface com.oracle.common.net.SelectionService.Handler
    Operation-set bit for write operations.
open(InetSocketAddress32, MultiplexedSocketProvider.MultiplexedServerSocketChannel)—Method in class com.oracle.common.internal.net.MultiplexedSocketProvider
    Start listening for connections on the specified address.
open( )—Method in class com.oracle.common.internal.net.socketbus.AbstractSocketBus
    Open the bus, allowing it to begin exchanging data.
open( )—Static method in class com.oracle.common.internal.net.WrapperSelector
    Unsupported.
open( )—Static method in class com.oracle.common.internal.net.WrapperServerSocketChannel
    Unsupported.
open( )—Static method in class com.oracle.common.internal.net.WrapperSocketChannel
    Unsupported.
open( )—Method in interface com.oracle.common.net.exabus.Bus
Open the bus, allowing it to begin exchanging data.
open( )—Method in class com.oracle.common.net.exabus.util.MessageBusTest.EchoBus
openDatagramChannel( )—Method in class com.oracle.common.internal.net.MultiplexedSocketProvider.MultiplexedSelectorProvider
openDatagramChannel( )—Method in class com.oracle.common.internal.net.ssl.SSLSelectorProvider
openPipe( )—Method in class com.oracle.common.internal.net.MultiplexedSocketProvider.MultiplexedSelectorProvider
openPipe( )—Method in class com.oracle.common.internal.net.ssl.SSLSelectorProvider
openSelector( )—Method in class com.oracle.common.internal.net.MultiplexedSocketProvider.MultiplexedSelectorProvider
openSelector( )—Method in class com.oracle.common.internal.net.ssl.SSLSelectorProvider
openServerSocket( )—Method in class com.oracle.common.internal.net.DemultiplexedSocketProvider
    Create an ServerSocket.
openServerSocket( )—Method in class com.oracle.common.internal.net.MultiplexedSocketProvider
    Create an ServerSocket.
openServerSocket( )—Method in class com.oracle.common.net.SdpSocketProvider
openServerSocket( )—Method in interface com.oracle.common.net.SocketProvider
    Create an ServerSocket.
openServerSocket( )—Method in class com.oracle.common.net.SSLSocketProvider
    Create an ServerSocket.
openServerSocket( )—Method in class com.oracle.common.net.TcpSocketProvider
openServerSocketChannel( )—Method in class com.oracle.common.internal.net.DemultiplexedSocketProvider
    Create an ServerSocketChannel.
openServerSocketChannel( )—Method in class com.oracle.common.internal.net.MultiplexedSocketProvider.MultiplexedSelectorProvider
openServerSocketChannel( )—Method in class com.oracle.common.internal.net.MultiplexedSocketProvider
    Create an ServerSocketChannel.
openServerSocketChannel( )—Method in class com.oracle.common.internal.net.ssl.SSLSelectorProvider
openServerSocketChannel( )—Method in class com.oracle.common.net.SdpSocketProvider
openServerSocketChannel( )—Method in interface com.oracle.common.net.SocketProvider
    Create an ServerSocketChannel.
openServerSocketChannel( )—Method in class com.oracle.common.net.SSLSocketProvider
    Create an ServerSocketChannel.
openServerSocketChannel( )—Method in class com.oracle.common.net.TcpSocketProvider
openSocket( )—Method in class com.oracle.common.internal.net.DemultiplexedSocketProvider
    Create a Socket.
openSocket( )—Method in class com.oracle.common.internal.net.MultiplexedSocketProvider
    Create a Socket.
openSocket( )—Method in class com.oracle.common.net.SdpSocketProvider
openSocket( )—Method in interface com.oracle.common.net.SocketProvider
    Create a Socket.
openSocket( )—Method in class com.oracle.common.net.SSLSocketProvider
    Create a Socket.
openSocket( )—Method in class com.oracle.common.net.TcpSocketProvider
openSocketChannel( )—Method in class com.oracle.common.internal.net.DemultiplexedSocketProvider
    Create a SocketChanel.
openSocketChannel( )—Method in class com.oracle.common.internal.net.MultiplexedSocketProvider.MultiplexedSelectorProvider
openSocketChannel( )—Method in class com.oracle.common.internal.net.MultiplexedSocketProvider
    Create a SocketChanel.
openSocketChannel( )—Method in class com.oracle.common.internal.net.ssl.SSLSelectorProvider
openSocketChannel( )—Method in class com.oracle.common.net.SdpSocketProvider
openSocketChannel( )—Method in interface com.oracle.common.net.SocketProvider
    Create a SocketChanel.

openSocketChannel( )—Method in class com.oracle.common.net.SSLSocketProvider
Create a SocketChanel.
openSocketChannel( )—Method in class com.oracle.common.net.TcpSocketProvider
openSSLEngine( )—Method in class com.oracle.common.internal.net.ssl.SSLSocketChannel
Create and return a new SSLEngine.
optimisticFlush( )—Method in class com.oracle.common.internal.net.socketbus.AbstractSocketBus.Connection
Perform an optimistic flush, i.e.
parseArgs(String[ ])—Static method in class com.oracle.common.net.exabus.util.MessageBusTest
Parse command line arguments into key value pairs.
parseDependencies(String, Properties)—Static method in class com.oracle.common.net.exabus.util.MessageBusTest
Parse the supplied properties object into a SimpleDepot.Dependencies object.
parseEndPoints(Depot, String)—Static method in class com.oracle.common.net.exabus.util.MessageBusTest
Parse a string containing a space separated list of EndPoint names.
PeerX509TrustManager—Class in com.oracle.common.internal.security
X509TrustManager implementation that requires the peer's certificate to be present in a configured key store.
PeerX509TrustManager(KeyStore)—Constructor for class com.oracle.common.internal.security.PeerX509TrustManager
Create a new PeerTrustManager that requires the peer's certificate to be present in the given key store.
PeerX509TrustManagerFactory—Class in com.oracle.common.internal.security
A factory for PeerX509TrustManager instances.
PeerX509TrustManagerFactory( )—Constructor for class com.oracle.common.internal.security.PeerX509Trust-ManagerFactory
potentialStreamClosedException(NullPointerException)—Method in class com.oracle.common.io.BufferSequenceInputStream
Check if an NPE is caused by the stream being closed.
Predicate<T>—Interface in com.oracle.common.base
Predicate represents a boolean test of an object.
previous( )—Method in class com.oracle.common collections. ConverterCollections.ConverterListIterator
previous( )—Method in enum com.oracle.common.io.Bandwidth.Magnitude
Obtain the previous order of Bandwidth.Magnitude (above this one).
previous( )—Method in enum com.oracle.common.io.MemorySize.Magnitude
Obtain the previous order of MemorySize.Magnitude (above this one).
previous( )—Method in enum com.oracle.common.util.Duration.Magnitude
Obtain the previous order of Duration.Magnitude (above this one).
previousIndex( )—Method in class com.oracle.common.collections.ConverterCollections.ConverterListIterator
printHelp(PrintStream)—Static method in class com.oracle.common.net.exabus.util.MessageBusTest
process( )—Method in class com.oracle.common.internal.net.RunnableSelectionService
Perform service processing.
processPendingKeys( )—Method in class com.oracle.common.internal.net.MultiplexedSocketProvider.MultiplexedSelector
Update Selector ready set with ready keys added to the pending set from the underlying Selector.
processReads(boolean)—Method in class com.oracle.common.internal.net.socketbus.BufferedSocketBus.BufferedConnection
Handle any incoming data.
processReads(boolean)—Method in class com.oracle.common.internal.net.socketbus.SocketMessageBus.MessageConnection
Handle any incoming data.
processRegistrations( )—Method in class com.oracle.common.internal.net.RunnableSelectionService
Process any pending registrations.
processRunnables( )—Method in class com.oracle.common.internal.net.RunnableSelectionService
Execute Runnable in the SelectionService thread
processWrites(boolean)—Method in class com.oracle.common.internal.net.socketbus.BufferedSocketBus.BufferedConnection
Write the contents of the WriteQueue to the channel.
PROTOCOL_DELIMITER—Static variable in class com.oracle.common.net.exabus.util.UrlEndPoint
The protocol delimiter
PROTOCOL_ID—Static variable in class com.oracle.common.internal.net.MultiplexedSocketProvider
The protocol identifier.
put(TK, TV)—Method in class com.oracle.common.collections.ConverterCollections.ConverterMap
putAll(Map<? extends TK, ? extends TV>)—Method in class com.oracle.common.collections.ConverterCollections.ConverterMap
read(ByteBuffer)—Method in class com.oracle.common.internal.net.MultiplexedSocketProvider.MultiplexedSocketChannel
read(ByteBuffer[ ], int, int)—Method in class com.oracle.common.internal.net.MultiplexedSocketProvider.MultiplexedSocketChannel
read(ByteBuffer[ ], int, int)—Method in class com.oracle.common.internal.net.socketbus.AbstractSocketBus.Connection
read(ByteBuffer[ ])—Method in class com.oracle.common.internal.net.socketbus.AbstractSocketBus.Connection
read(ByteBuffer)—Method in class com.oracle.common.internal.net.socketbus.AbstractSocketBus.Connection
read( )—Method in class com.oracle.common.internal.net.socketbus.SocketMessageBus.MessageConnection.ReadBatch
Process reads.
read(ByteBuffer)—Method in class com.oracle.common.internal.net.ssl.SSLSocketChannel
read(ByteBuffer[ ], int, int)—Method in class com.oracle.common.internal.net.ssl.SSLSocketChannel
read(ByteBuffer)—Method in class com.oracle.common.internal.net.WrapperSocketChannel
read(ByteBuffer[ ], int, int)—Method in class com.oracle.common.internal.net.WrapperSocketChannel
read( )—Method in class com.oracle.common.io.BufferSequenceInputStream
read(byte[ ], int, int)—Method in class com.oracle.common.io.BufferSequenceInputStream read( )—Method in interface com.oracle.common.io.InputStreaming
Read the next byte of data from the InputStream.
read(byte[ ])—Method in interface com.oracle.common.io.InputStreaming
Read some number of bytes from the input stream and store them into the passed array ab.
read(byte[ ], int, int)—Method in interface com.oracle.common.io.InputStreaming
Read up to cb bytes from the input stream and store them into the passed array ab starting at offset of.
read(EndPoint, long, BufferSequence, Object)—Method in interface
com.oracle.common.net.exabus.MemoryBus
Request a read from the peer's memory into the supplied BufferSequence.
READ_AHEAD_SIZE—Static variable in class
com.oracle.common.internal.net.socketbus.SocketMessageBus
The amount to attempt to read ahead by when reading from the socket.
read Boolean( )—Method in class com.oracle.common.io.BufferSequenceInputStream
readByte( )—Method in class com.oracle.common.io.BufferSequenceInputStream
readChar( )—Method in class com.oracle.common.io.BufferSequenceInputStream
readDouble( )—Method in class com.oracle.common.io.BufferSequenceInputStream
readEncrypted( )—Method in class com.oracle.common.internal.net.ssl.SSLSocketChannel
Attempt to read from the network into the inbound encrypted buffer.
readFloat( )—Method in class com.oracle.common.io.BufferSequenceInputStream
readFully(byte[ ])—Method in class com.oracle.common.io.BufferSequenceInputStream
readFully(byte[ ], int, int)—Method in class com.oracle.common.io.BufferSequenceInputStream
readHeader(ByteBuffer[ ], int, int)—Method in class
com.oracle.common.internal.net.MultiplexedSocketProvider.MultiplexedSocketChannel
Transfer as many bytes as possible from the inbound header buffer to the supplied buffer
readInt( )—Method in class com.oracle.common.io.BufferSequenceInputStream
readInternal(ByteBuffer[ ], int, int)—Method in class
com.oracle.common.internal.net.ssl.SSLSocketChannel
Attempt to read into the supplied buffers as per the general contract of ScatteringChannel.read.
readLine( )—Method in class com.oracle.common.io.BufferSequenceInputStream Deprecated.
readLong( )—Method in class com.oracle.common.io.BufferSequenceInputStream
readShort( )—Method in class com.oracle.common.io.BufferSequenceInputStream
readUnsignedByte( )—Method in class com.oracle.common.io.BufferSequenceInputStream
readUnsignedShort( )—Method in class com.oracle.common.io.BufferSequenceInputStream
readUTF( )—Method in class com.oracle.common.io.BufferSequenceInputStream
readyOps( )—Method in class
com.oracle.common.internal.net.MultiplexedSocketProvider.ListenChannel
readyOps( )—Method in interface
com.oracle.common.internal.net.MultiplexedSocketProvider.MultiplexedChannel
Return the operations that can be satisfied by already buffered data.
readyOps( )—Method in class
com.oracle.common.internal.net.MultiplexedSocketProvider.MultiplexedServerSocketChannel
readyOps( )—Method in class
com.oracle.common.internal.net.MultiplexedSocketProvider.MultiplexedSocketChannel
readyOps( )—Method in class
com.oracle.common.internal.net.MultiplexedSocketProvider.MultiplexedSocketChannel.SocketSelectionKey
readyOps( )—Method in class
com.oracle.common.internal.net.ssl.SSLSocketChannel.SSLSelectionKey
readyOps( )—Method in class
com.oracle.common.internal.net.WrapperSelector.WrapperSelectionKey
register(SelectableChannel, SelectionService.Handler)—Method in class
com.oracle.common.internal.net.HashSelectionService
Register a channel with the service.
register(int, MultiplexedSocketProvider.MultiplexedServerSocketChannel)—Method in class
com.oracle.common.internal.net.MultiplexedSocketProvider.Listener
Register an acceptor queue with a sub-port on this listener
register(AbstractSelectableChannel, int, Object)—Method in class
com.oracle.common.internal.net.MultiplexedSocketProvider.MultiplexedSelector
register(SelectableChannel, SelectionService.Handler)—Method in class
com.oracle.common.internal.net.MultiProviderSelectionService
Register a channel with the service.
register(SelectableChannel, SelectionService.Handler)—Method in class
com.oracle.common.internal.net.ResumableSelectionService
Register a channel with the service.
register(SelectableChannel, SelectionService.Handler)—Method in class
com.oracle.common.internal.net.RunnableSelectionService
Register a channel with the service.
register(AbstractSelectableChannel, int, Object)—Method in class
com.oracle.common.internal.net.WrapperSelector
register(SelectableChannel, SelectionService.Handler)—Method in interface
com.oracle.common.net.SelectionService
Register a channel with the service.
registerDriver(Driver)—Method in class com.oracle.common.net.exabus.util.SimpleDepot
Register a Driver with the Depot.
registerInternal(WrapperSelector, int, Object)—Method in class
com.oracle.common.internal.net.MultiplexedSocketProvider.MultiplexedSocketChannel
registerInternal(WrapperSelector, int, Object)—Method in class
com.oracle.common.internal.net.ssl.SSLSocketChannel
Register with the specified selector.
registerinternal(WrapperSelector, int, Object)—Method in interface com.oracle.common.internal.net.WrapperSelector.WrapperSelectableChannel
Register with the specified selector.
registerInternal(WrapperSelector, int, Object)—Method in class com.oracle.common.internal.net.WrapperServerSocketChannel
Register with the specified selector.
registerInternal(WrapperSelector, int, Object)—Method in class com.oracle.common.internal.net.WrapperSocketChannel
Register with the specified selector.
release(ByteBuffer)—Method in class com.oracle.common.internal.io.AbstractBufferManager
Release a formerly acquired ByteBuffer.
release(ByteBuffer)—Method in class com.oracle.common.internal.io.CheckedBufferManager
Release a formerly acquired ByteBuffer.
release(ByteBuffer)—Method in interface com.oracle.common.internal.io.SegmentedBufferManager.BufferAllocator
Release a ByteBuffer back to the allocator.
release(ByteBuffer)—Method in class com.oracle.common.internal.io.SegmentedBufferManager
release(ByteBuffer)—Method in class com.oracle.common.internal.io.WrapperBufferManager
release(EndPoint)—Method in class com.oracle.common.internal.net.socketbus.AbstractSocketBus
Release an EndPoint from this bus.
release(ByteBuffer)—Method in interface com.oracle.common.io.BufferManager
Release a formerly acquired ByteBuffer.
release(EndPoint)—Method in interface com.oracle.common.net.exabus.Bus
Release an EndPoint from this bus.
release(EndPoint)—Method in class com.oracle.common.net.exabus.util.MessageBusTest.EchoBus
remove( )—Method in class com.oracle.common.collections.AbstractStableIterator
remove(Object)—Method in class com.oracle.common.collections.AbstractStableIterator
Remove the specified item.
remove(Object)—Method in class com.oracle.common.collections.ChainedIterator
Remove the specified item.
remove(Object)—Method in class com.oracle.common.collections.ConverterCollections.ConverterCollection
remove( )—Method in class com.oracle.common.collections.ConverterCollections.ConverterEntrySet.ConverterIterator
remove(Object)—Method in class com.oracle.common.collections.ConverterCollections.ConverterEntrySet
remove( )—Method in class com.oracle.common.collections.ConverterCollections.ConverterEnumerator
Remove the last-returned element that was returned by the Iterator.
remove(int)—Method in class com.oracle.common.collections.ConverterCollections.ConverterList
remove( )—Method in class com.oracle.common.collections.ConverterCollections.ConverterListIterator
remove(Object)—Method in class com.oracle.common.collections.ConverterCollections.ConverterMap
remove(Object)—Method in class com.oracle.common.collections.UnmodifiableSetCollection
removeAll(Collection<?>)—Method in class com.oracle.common.collections.ConverterCollections.ConverterCollection
removeAll(Collection<?>)—Method in class com.oracle.common.collections.ConverterCollections.ConverterEntrySet
removeAll(Collection<?>)—Method in class com.oracle.common.collections.UnmodifiableSetCollection
removeFlushable(AbstractSocketBus.Connection)—Method in class com.oracle.common.internal.net.socketbus.AbstractSocketBus
Remove a Connection from the flushable set.
removeReceipt( )—Method in class com.oracle.common.internal.net.socketbus.AbstractSocketBus.Connection
Remove the next receipt from the queue and return it as a RECEIPT event.
reset( )—Method in class com.oracle.common.internal.net.socketbus.BufferedSocketBus.BufferedConnection.WriteBatch
Reset the batch, recycling any recyclable data
reset( )—Method in class com.oracle.common.io.BufferSequenceInputStream
reset( )—Method in interface com.oracle.common.io.InputStreaming
Rewind this stream to the position at the time the InputStreaming.mark(int) method was last called on this InputStream.
resolveAddress(String)—Method in class com.oracle.common.internal.net.MultiplexedSocketProvider
Resolve the specified address.
resolveAddress(String)—Method in class com.oracle.common.net.InetSocketProvider
Resolve the specified address.
resolveAddress(String)—Method in class com.oracle.common.net.SdpSocketProvider
resolveAddress(String)—Method in interface com.oracle.common.net.SocketProvider
Resolve the specified address.
resolveAddress(String)—Method in class com.oracle.common.net.SSLSocketProvider
Resolve the specified address.
resolveBindPoint(String, ServerSocket)—Method in class com.oracle.common.internal.net.socketbus.SocketBusDriver
Resolve the EndPoint which the specified service socket is bound to.
resolveEndPoint(String)—Method in class com.oracle.common.internal.net.socketbus.SocketBusDriver
Resolve the EndPoint for the specified canonical name.
resolveEndPoint(String)—Method in interface com.oracle.common.net.exabus.Depot
Resolve the EndPoint for the specified canonical name.
resolveEndPoint(String)—Method in interface com.oracle.common.net.exabus.spi.Driver
Resolve the EndPoint for the specified canonical name.
resolveEndPoint(String)—Method in class com.oracle.common.net.exabus.util.MessageBusTest.EchoBus.EchoDriver resolveEndPoint(String)—Method in class com.oracle.common.net.exabus.util.SimpleDepot
Resolve the EndPoint for the specified canonical name.
resolveSocketEndPoint(String)—Method in class com.oracle.common.internal.net.socketbus.SocketBusDriver
Resolve the supplied canonical name into a SocketEndPoint.
ResumableSelectionService—Class in com.oracle.common.internal.net
The ResumableSelectionService will automatically allocate and release threads to handle the SelectionService.
ResumableSelectionService(ThreadFactory)—Constructor for class com.oracle.common.internal.net.ResumableSelectionService
Construct a RestartableSelectionService.
ResumableSelectionService.ServiceFactory—Class in com.oracle.common.internal.net
Factory for producing ResumableSelectionServices.
ResumableSelectionService.ServiceFactory(ThreadFactory, long)—Constructor for class com.oracle.common.internal.net.ResumableSelectionService.ServiceFactory
Construct a Service Factory which will produce ResumableSelectionServices with a given configuration.
retainAll(Collection<?>)—Method in class com.oracle.common collections. ConverterCollections.ConverterCollection
retainAll(Collection<?>)—Method in class com.oracle.common.collections.ConverterCollections.ConverterEntrySet
retainAll(Collection<?>)—Method in class com.oracle.common.collections.UnmodifiableSetCollection
returnReceipts(int)—Method in class com.oracle.common.internal, net.socketbus.AbstractSocketBus. Connection
Return a series of receipts as events.
run( )—Method in class com.oracle.common.internal, net.MultiplexedSocketProvider.Listener.Switcher
Run the accept timeout task
run( )—Method in class com.oracle.common.internal.net.ResumableSelectionService
run( )—Method in class com.oracle.common.internal.net.RunnableSelectionService
run( )—Method in class com.oracle.common.net.exabus.util.MessageBusTest.EventProcessor
run( )—Method in class com.oracle.common.net.exabus.util.MessageBusTest.Transmitter
RunnableSelectionService—Class in com.oracle.common.internal.net
RunnableSelectionService is a single-threaded SelectionService implementation.
RunnableSelectionService( )—Constructor for class com.oracle.common.internal.net. RunnableSelectionService
runProtocol( )—Method in class com.oracle.common.internal.net.ssl.SSLSocketChannel
Run the next stage of the SSL handshake protocol if any.
s_aBuffEmpty—Static variable in class com.oracle.common.internal.net.ssl.SSLSocketChannel
A shared empty byte buffer.
s_cbMsgMax—Static variable in class com.oracle.common.net.exabus.util.MessageBusTest
The maximum message size
s_cbMsgMin—Static variable in class com.oracle.common.net.exabus.util.MessageBusTest
The minimum message size.
s_cErrors—Static variable in class com.oracle.common.net.exabus.util.MessageBusTest
Count of the number of errors encountered during the test.
s_cMillisIdentifyDefault—Static variable in class com.oracle.common.internal.net.MultiplexedSocketProvider.DefaultDependencies
The default accept timeout.
s_fFlowControl—Static variable in class com.oracle.common.net.exabus.util.MessageBusTest
Switch govering if flow control events should be respected.
s_fReceipts—Static variable in class com.oracle.common.net.exabus.util.MessageBusTest
True if receipts should be used.
s_fVerbose—Static variable in class com.oracle.common.net.exabus.util.MessageBusTest
Flag for verbose logging.
s_manager—Static variable in class com.oracle.common.net.exabus.util.MessageBusTest
The BufferManager to use in the test.
s_nBacklogDefault—Static variable in class com.oracle.common.internal.net.MultiplexedSocketProvider.DefaultDependencies
The default backlog value.
s_nLatencyFreq—Static variable in class com.oracle.common.net.exabus.util.MessageBusTest
The frequency (in messages), at which latency will be sampled.
s_rand—Static variable in class com.oracle.common.net.exabus.util.MessageBusTest
Shared randomizer.
safeAdjust(boolean)—Method in class com.oracle.common.internal.net.socketbus.SharedBuffer
Perform a safe increment or decrement of the reference counter.
SafeSelectionHandler<C extends java.nio.channels.SelectableChannel>—Class in com.oracle.common.net
SafeChannelHandler is an abstract SelectorService.Handler implementation with additional error handling support.
SafeSelectionHandler(C)—Constructor for class com.oracle.common.net.SafeSelectionHandler
Construct a SafeChannel for the specified channel.
scheduleDisconnect(Throwable)—Method in class com.oracle.common.internal, net.socketbus.AbstractSocketBus. Connection
Schedule a disconnect.
scheduleShutdown(Throwable, boolean)—Method in class com.oracle.common.internal.net.socketbus.AbstractSocketBus.Connection
Register a Runnable with the SelectionService to perform the disconnect logic and optionally release it.
scheduleTask(Runnable, long)—Static method in class com.oracle.common.internal.net.RunnableSelectionService
Schedule a task for future execution.
scheduleTask(Runnable, long)—Method in class com.oracle.common.internal.net.socketbus.AbstractSocketBus
Schedule a task for future execution.
SDP_MEMORY_BUS_PROTOCOL—Static variable in class com.oracle.common.net.exabus.util.SimpleDepot
Protocol name for the SDP memory bus.
SDP_MESSAGE_BUS_PROTOCOL—Static variable in class com.oracle.common.net.exabus.util.SimpleDepot
Protocol name for the SDP message bus.
SDP_SECURE_MEMORY_BUS_PROTOCOL—Static variable in class com.oracle.common.net.exabus.util.SimpleDepot
Protocol name for the SSL protected SDP memory bus.
SDP_SECURE_MESSAGE_BUS_PROTOCOL—Static variable in class com.oracle.common.net.exabus.util.SimpleDepot
Protocol name for the SSL protected SDP message bus.
SDP_SECURE_SOCKET_BUS—Static variable in class com.oracle.common.net.exabus.util.SimpleDepot
Driver name for Secure SDP Socket Bus.
SDP_SOCKET_BUS—Static variable in class com.oracle.common.net.exabus.util.SimpleDepot
Driver name for SDP Socket Bus.
SdpSocketProvider—Class in com.oracle.common.net
SdpSocketProvider produces SDP based sockets.
SdpSocketProvider( )—Constructor for class com.oracle.common.net.SdpSocketProvider
SecurityProvider—Class in com.oracle.common.internal.security
Security Provider implementation that returns custom security services.
SegmentedBufferManager—Class in com.oracle.common.internal.io
/** The SegmentedBufferManager provides pooling of ByteBuffers.
SegmentedBufferManager(SegmentedBufferManager.BufferAllocator, long)—Constructor for class com.oracle.common.internal.io.SegmentedBufferManager
Default constructor.
SegmentedBufferManager(String, SegmentedBufferManager.BufferAllocator, int, int, int)—Constructor for class com.oracle.common.internal.io.SegmentedBufferManager
Create a SegmentedBufferManager.
SegmentedBufferManager.BufferAllocator—Interface in com.oracle.common.internal.io
A BufferAllocator is provides a mean for allocating ByteBuffers.
select(long)—Method in class com.oracle.common.internal.net.MultiplexedSocketProvider.MultiplexedSelector
select( )—Method in class com.oracle.common.internal.net.MultiplexedSocketProvider.MultiplexedSelector
select( )—Method in class com.oracle.common.internal.net.WrapperSelector
select(long)—Method in class com.oracle.common.internal.net.WrapperSelector
selectedKeys( )—Method in class com.oracle.common.internal.net.MultiplexedSocketProvider.MultiplexedSelector
selectedKeys( )—Method in class com.oracle.common.internal.net.WrapperSelector
SelectionService—Interface in com.oracle.common.net
The SelectionService interface describes a service for selecting on channels.
SelectionService.Handler—Interface in com.oracle.common.net
Handler provides a pluggable callback which is invoked when the registered channel needs servicing.
SelectionServices—Class in com.oracle.common.net
The SelectionServices class provides helper methods related to SelectionServices.
SelectionServices( )—Constructor for class com.oracle.common.net.SelectionServices
selectNow( )—Method in class com.oracle.common.internal.net.MultiplexedSocketProvider.MultiplexedSelector
selectNow( )—Method in class com.oracle.common.internal.net.WrapperSelector
selector( )—Method in class com.oracle.common.internal.net.WrapperSelector.WrapperSelectionKey
send(BufferSequence, Object)—Method in class com.oracle.common.internal,net.socketbus.SocketMessageBus.MessageConnection
Schedule a send of the specified BufferSequence.
send(EndPoint, BufferSequence, Object)—Method in class com.oracle.common.internal.net.socketbus.SocketMessageBus
Send a message to an EndPoint.
send(EndPoint, BufferSequence, Object)—Method in interface com.oracle.common.net.exabus.MessageBus
Send a message to an EndPoint.
send(EndPoint, BufferSequence, Object)—Method in class com.oracle.common.net.exabus.util.MessageBusTest.EchoBus
sendUrgentData(int)—Method in class com.oracle.common.internal.net.WrapperSocket
SERVER_CHANNEL_CLOSED_MARKER—Static variable in class com.oracle.common.internal.net.MultiplexedSocketProvider.MultiplexedServerSocketChannel
Special SocketChannel that is added to the client channel queue to indicate that this ServerSocketChannel is closed.
set(V)—Method in interface com.oracle.common.base.Holder
Specify the held object.
set(V)—Method in class com.oracle.common.base.SimpleHolder
Specify the held object.
set(V)—Method in class com.oracle.common.base.VolatileHolder
Specify the held object.
set(int, T)—Method in class com.oracle.common.collections.ConverterCollections.ConverterList
set(T)—Method in class com.oracle.common.collections.ConverterCollections.ConverterListIterator
set(ByteBuffer)—Method in class com.oracle.common.internal.net.socketbus.SharedBuffer.Segment
Specify the held object.
set(ByteBuffer)—Method in class com.oracle.common.internal.net.socketbus.SharedBuffer
Specify the held object.
set(int, Object)—Method in class com.oracle.common.net.SocketSettings
Set the specified option.
setAutoFlushThreshold(long)—Method in class com.oracle.common.internal.net.socketbus.SocketBusDriver.DefaultDependencies
Set threshold for auto flush
setBacklog(int)—Method in class com.oracle.common.internal.net.MultiplexedSocketProvider.DefaultDependencies
Specify the backlog to use when binding the underlying ServerSocket.

setBufferManager(BufferManager)—Method in class com.oracle.common.internal.net.socketbus.SocketBusDriver.DefaultDependencies
  Specify the BufferManager to be used by this driver.
setCapacity(long)—Method in interface com.oracle.common.net.exabus.MemoryBus
  Specify the local capacity of this MemoryBus.
setClientAuthenticationRequired(boolean)—Method in class com.oracle.common.net.SSLSocketProvider.DefaultDependencies
  Specify if client authentication is required.
setDataReadyOps(int)—Method in class com.oracle.common.internal.net.ssl.SSLSocketChannel.SSLSelectionKey
  Set SelectionKey ops which apply to the SSLSelectableChannel but not necessarily to the delegate channel.
setDefaultMemoryBusEndPoint(String)—Method in class com.oracle.common.net.exabus.util.SimpleDepot.DefaultDependencies
  Specify the default MemoryBus EndPoint name.
setDefaultMemoryBusEndPoint(String)—Method in interface com.oracle.common.net.exabus.util.SimpleDepot.Dependencies
  Specify the default MemoryBus EndPoint name.
setDefaultMessageBusEndPoint(String)—Method in class com.oracle.common.net.exabus.util.SimpleDepot.DefaultDependencies
  Specify the default MessageBus EndPoint name.
setDefaultMessageBusEndPoint(String)—Method in interface com.oracle.common.net.exabus.util.SimpleDepot.Dependencies
  Specify the default MessageBus EndPoint name.
setDelegate(SocketProvider)—Method in class com.oracle.common.net.SSLSocketProvider.DefaultDependencies
  Specify the SocketProvider to delegate to.
setDelegateProvider(SocketProvider)—Method in class com.oracle.common.internal.net.MultiplexedSocketProvider.DefaultDependencies
  Specify the SocketProvider to which the MultiplexedSocketProvider will delegate to.
setDepot(Depot)—Method in class com.oracle.common.internal.net.socketbus.SocketBusDriver
  Set the depot associated with this driver.
setDepot(Depot)—Method in interface com.oracle.common.net.exabus.spi.Driver
  Set the depot associated with this driver.
setDepot(Depot)—Method in class com.oracle.common.net.exabus.util.MessageBusTest.EchoBus.EchoDriver
setDirectWriteThreadThreshold(int)—Method in class com.oracle.common.internal.net.socketbus.SocketBusDriver.DefaultDependencies
  Specify the direct write threshold.
setDrivers(Map<String, Driver>)—Method in class com.oracle.common.net.exabus.util.SimpleDepot.DefaultDependencies
  Specify the set of Drivers to use in this Depot, keyed by a descriptive name.
setDrivers(Map<String, Driver>)—Method in interface com.oracle.common.net.exabus.util.SimpleDepot.Dependencies
  Specify the set of Drivers to use in this Depot, keyed by a descriptive name.

setEnabledCipherSuites(String[ ])—Method in class com.oracle.common.net.SSLSocketProvider.DefaultDependencies
  Specify the enabled cipher suites.
setEventCollector(Collector<Event>)—Method in class com.oracle.common.internal.net.socketbus.AbstractSocketBus
  Register a collector which will receive events for this Bus.
setEventCollector(Collector<Event>)—Method in interface com.oracle.common.net.exabus.Bus
  Register a collector which will receive events for this Bus.
setEventCollector(Collector<Event>)—Method in class com.oracle.common.net.exabus.util.MessageBusTest.EchoBus
setExecutor(Executor)—Method in class com.oracle.common.net.SSLSocketProvider.DefaultDependencies
  Specify the Executor to use.
setHostnameVerifier(HostnameVerifier)—Method in class com.oracle.common.net.SSLSocketProvider.DefaultDependencies
  Specify the HostnameVerifier.
setIdentificationTimeoutMillis(long)—Method in class com.oracle.common.internal.net.MultiplexedSocketProvider.DefaultDependencies
  Specify the identification timeout in milliseconds.
setIdleTimeout(long)—Method in class com.oracle.common.internal.net.RunnableSelectionService
  Set the duration the RunnableSelectionService.run( )method should block with no registered keys before returning.
setKeepAlive(boolean)—Method in class com.oracle.common.internal.net.WrapperSocket
setLogger(Logger)—Method in class com.oracle.common.internal.net.MultiplexedSocketProvider.DefaultDependencies
  Specify the Logger to use.
setLogger(Logger)—Method in class com.oracle.common.internal.net.socketbus.SocketBusDriver.DefaultDependencies
  Specify the Logger to use.
setLogger(Logger)—Method in class com.oracle.common.net.exabus.util.SimpleDepot.DefaultDependencies
  Specify the Logger to use.
setLogger(Logger)—Method in class com.oracle.common.net.SSLSocketProvider.DefaultDependencies
  Specify the Logger to utilize.
setMaximumReceiptDelayMillis(long)—Method in class com.oracle.common.internal.net.socketbus.SocketBusDriver.DefaultDependencies
  Set maximum receipt ack delay
setMemoryBusProtocol(String)—Method in class com.oracle.common.internal.net.socketbus.SocketBusDriver.DefaultDependencies
  Specify the memory bus protocol name
setMessageBusProtocol(String)—Method in class com.oracle.common.internal.net.socketbus.SocketBusDriver.DefaultDependencies
  Specify the message bus protocol name
setNext(T)—Method in class com.oracle.common.collections.AbstractStableIterator
  Specify the next object to provide from the Iterator.
setOOBInline(boolean)—Method in class com.oracle.common.internal.net.WrapperSocket setOption(int, Object)—Method in class com.oracle.common.net.SocketSettings
setOptions(SocketOptions)—Method in class com.oracle.common.net.SocketSettings
    Set any options indicated by the supplied SocketOptions into this SocketOptions.
setPerformancePreferences(int, int, int)—Method in class com.oracle.common.internal.net.WrapperServerSocket
setPerformancePreferences(int, int, int)—Method in class com.oracle.common.internal.net.WrapperSocket
setProtocolReadyOps(int)—Method in class com.oracle.common.internal.net.ssl.SSLSocketChannel.SSLSelectionKey
    Specify the SelectionKey operations which are ready on the SSLSelectableChannel protocol but not necessarily to the delegate channel.
setReceiptRequestThreshold(long)—Method in class com.oracle.common.internal.net.socketbus.SocketBusDriver.DefaultDependencies
    Set threshold for receipt requests
setReceiveBufferSize(int)—Method in class com.oracle.common.internal.net.WrapperServerSocket
setReceiveBufferSize(int)—Method in class com.oracle.common.internal.net.WrapperSocket
setReuseAddress(boolean)—Method in class com.oracle.common.internal.net.WrapperServerSocket
setReuseAddress(boolean)—Method in class com.oracle.common.internal.net.WrapperSocket
setSelectionService(SelectionService)—Method in class com.oracle.common.internal.net.MultiplexedSocketProvider.DefaultDependencies
    Specify the SelectionService to use for IO processing.
setSelectionService(SelectionService)—Method in class com.oracle.common.internal.net.socketbus.SocketBusDriver.DefaultDependencies
    Specify the SelectionService to be used by this driver.
setSendBufferSize(int)—Method in class com.oracle.common.internal.net.WrapperSocket
setSocketAddressHahser(Hasher<? super SocketAddress>)—Method in class com.oracle.common.internal.net.socketbus.SocketBusDriver.DefaultDependencies
    Specify the SocketAddress Hasher to be used in comparing addresses.
setSocketOptions(SocketOptions)—Method in class com.oracle.common.internal.net.socketbus.SocketBusDriver.DefaultDependencies
    Specify the SocketOptions to use.
setSocketProvider(SocketProvider)—Method in class com.oracle.common.internal.net.socketbus.SocketBusDriver.DefaultDependencies
    Specify the SocketProvider to use.
setSocketReconnectDelayMillis(long)—Method in class com.oracle.common.internal.net.socketbus.SocketBusDriver.DefaultDependencies
    Set reconnect interval for the Connection
setSoLinger(boolean, int)—Method in class com.oracle.common.internal.net.WrapperSocket
setSoTimeout(int)—Method in class com.oracle.common.internal.net.WrapperServerSocket
setSoTimeout(int)—Method in class com.oracle.common.internal.net.WrapperSocket
setSSLContext(SSLContext)—Method in class com.oracle.common.net.SSLSocketProvider.DefaultDependencies
    Specify the SSLContex to utilize.
setTcpNoDelay(boolean)—Method in class com.oracle.common.internal.net.WrapperSocket
setTrafficClass(int)—Method in class com.oracle.common.internal.net.WrapperSocket
setTransmitRate(long)—Method in class com.oracle.common.net.exabus.util.MessageBusTest.Transmitter
    Reset the transmit rate.
setValue(TV)—Method in class com.oracle.common collections. ConverterCollections.AbstractConverterEntry
SharedBuffer—Class in com.oracle.common.internal.net.socketbus
    SharedBuffer holds a ByteBuffer, and releases it back to its BufferManager when its reference count reaches zero.
Shared Buffer(ByteBuffer, SharedBuffer.Disposer)—Constructor for class com.oracle.common.internal.net.socketbus.SharedBuffer
    Construct a SharedBuffer from a ByteBuffer and its associated BufferManager.
Shared Buffer. Disposer—Interface in com.oracle.common.internal.net.socketbus
    Disposer used by the SharedBuffer to dispose ByteBuffer
SharedBuffer.Segment—Class in com.oracle.common.internal.net.socketbus
    Segment represents a segment of a Shared Buffer.
SharedBuffer.Segment( )—Constructor for class com.oracle.common.internal.net.socketbus.SharedBuffer.Segment
    Construct a holder for a shared buffer, around its current position to limit.
SharedBuffer.Segment(int, int)—Constructor for class com.oracle.common.internal.net.socketbus.SharedBuffer.Segment
    Construct a holder for a shared buffer.
shutdown( )—Method in class com.oracle.common.internal.net.HashSelectionService
    Shutdown the SelectionService.
shutdown( )—Method in class com.oracle.common.internal.net.MultiProviderSelectionService
    Shutdown the SelectionService.
shutdown( )—Method in class com.oracle.common.internal.net.RunnableSelectionService
    Shutdown the SelectionService.
shutdown( )—Method in interface com.oracle.common.net.SelectionService
    Shutdown the SelectionService.
shutdownInput( )—Method in class com.oracle.common.internal, net.MultiplexedSocketProvider.MultiplexedSocket
shutdownInput( )—Method in class com.oracle.common.internal.net.WrapperSocket
shutdownOutput( )—Method in class com.oracle.common.internal.net.WrapperSocket
signal(Object)—Method in class com.oracle.common.internal, net.socketbus.AbstractSocketBus. Connection
    Signal the connection.
signal(EndPoint, Object)—Method in class com.oracle.common.internal.net.socketbus.AbstractSocketBus
signal(Object)—Method in class com.oracle.common.internal.net.socketbus.BufferedSocketBus.BufferedConnection
    Schedule a signal.

signal(EndPoint, Object)—Method in interface com.oracle.common.net.exabus.MemoryBus
Signal a peer.
SimpleDepot—Class in com.oracle.common.net.exabus.util
SimpleDepot is a Depot of well-known bus drivers.
SimpleDepot( )—Constructor for class com.oracle.common.net.exabus.util.SimpleDepot
Construct the Depot with default dependencies.
SimpleDepot(SimpleDepot.Dependencies)—Constructor for class
com.oracle.common.net.exabus.util.SimpleDepot
Construct the Depot from the specified dependencies.
SimpleDepot. DefaultDependencies—Class in com.oracle.common.net.exabus.util
DefaultDepenencies provides a default implementation of the Depot's dependencies.
SimpleDepot.DefaultDependencies( )—Constructor for class
com.oracle.common.net.exabus.util.SimpleDepot.DefaultDependencies
Construct a DefaultDependencies object.
SimpleDepot.DefaultDependencies(SimpleDepot.Dependencies)—Constructor for class
com.oracle.common.net.exabus.util.SimpleDepot.DefaultDependencies
Construct a DefaultDependencies object copying the values from the specified dependencies object.
SimpleDepot. Dependencies—Interface in com.oracle.common.net.exabus.util
Dependencies specifies all dependency requirements of the SimpleDepot.
SimpleEvent—Class in com.oracle.common.net.exabus.util
SimpleEvent(Event.Type, EndPoint)—Constructor for class com.oracle.common.net.exabus.util.SimpleEvent
Construct a SimpleEvent.
SimpleEvent(Event.Type, EndPoint, Object)—Constructor for class
com.oracle.common.net.exabus.util.SimpleEvent
Construct a SimpleEvent.
SimpleHolder<V>—Class in com.oracle.common.base
SimpleHolder is a basic implementation of the Holder interface.
SimpleHolder( )—Constructor for class com.oracle.common.base.SimpleHolder
Construct a SimpleHolder with no value.
SimpleHolder(V)—Constructor for class com.oracle.common.base.SimpleHolder
Construct a SimpleHolder with an initial value.
SingleBufferMessageEvent—Class in com.oracle.common.internal.net.socketbus
SingleBufferMessageEvent is an implementation of a Bus Event for Messages over a single Shared Buffer.
SingleBufferMessageEvent(SocketMessageBus.MessageConnection, Shared Buffer)—Constructor for class
com.oracle.common.internal.net.socketbus.SingleBufferMessageEvent
Construct a SingleBufferSequence around a single ByteBuffer.
SingleBufferSequence—Class in com.oracle.common.io
SingleBufferSequence is a thread-safe BufferSequence implementation which wraps a single ByteBuffer.
SingleBufferSequence(BufferManager, ByteBuffer)—Constructor for class
com.oracle.common.io.SingleBufferSequence
Construct a SingleBufferSequence around a single ByteBuffer.

size( )—Method in class com.oracle.common collections. ConverterCollections.ConverterCollection
size( )—Method in class com.oracle.common.collections.ConverterCollections.ConverterEntrySet
size( )—Method in class com.oracle.common.collections.ConverterCollections.ConverterMap
size( )—Method in class com.oracle.common.collections.UnmodifiableSetCollection
skip(long)—Method in class com.oracle.common.io.BufferSequenceInputStream
skip(long)—Method in interface com.oracle.common.io.InputStreaming
Skips over up to the specified number of bytes of data from this InputStream.
skip(long)—Method in class com.oracle.common.net.exabus.util.MessageBusTest.SkipStream
Skip over the specified number of output bytes.
skipBytes(int)—Method in class com.oracle.common.io.BufferSequenceInputStream
socket( )—Method in class com.oracle.common.internal.net.MultiplexedSocketProvider.MultiplexedServerSocketChannel
socket( )—Method in class com.oracle.common.internal.net.WrapperServerSocketChannel
socket( )—Method in class com.oracle.common.internal.net.WrapperSocketChannel
SocketBusDriver—Class in com.oracle.common.internal.net.socketbus
SocketDriver is a base implementation for socket based busses.
SocketBusDriver(SocketBusDriver.Dependencies)—Constructor for class
com.oracle.common.internal.net.socketbus.SocketBusDriver
Construct a SocketDriver.
SocketBusDriver.DefaultDependencies—Class in com.oracle.common.internal.net.socketbus
SimpleDependencies provides a basic Dependencies implementation as well as default values where applicable.
SocketBusDriver.DefaultDependencies( )—Constructor for class
com.oracle.common.internal, net.socketbus.SocketBusDriver.DefaultDependencies
Construct a DefaultDependencies object.
SocketBusDriver. DefaultDependencies(SocketBusDriver.Dependencies)—Constructor for class
com.oracle.common.internal, net.socketbus.SocketBusDriver.DefaultDependencies
Construct a DefaultDependencies object copying the values from the specified dependencies object
SocketBusDriver.Dependencies—Interface in com.oracle.common.internal.net.socketbus
Dependencies provides an interface by which the SocketBusDriver can be provided with its external dependencies.
SocketMessageBus—Class in com.oracle.common.internal.net.socketbus
SocketMessageBus is a reliable MessageBus implementation based upon sockets.
SocketMessageBus(SocketBusDriver, UrlEndPoint)—Constructor for class com.oracle.common.internal.net.socketbus.SocketMessageBus
Construct a SocketMessageBus.
SocketMessageBus.MessageConnection—Class in com.oracle.common.internal.net.socketbus
MessageConnection implements a reliable message connection,
SocketMessageBus.MessageConnection(UrlEndPoint)—Constructor for class
com.oracle.common.internal, net.socketbus.SocketMessageBus.MessageConnection
Create a MessageConnection for the specified peer.
SocketMessageBus.MessageConnection.ReadBatch—Class in
com.oracle.common.internal.net.socketbus
ReadBatch handles the reading and processing of the inbound byte stream.
SocketMessageBus.MessageConnection.ReadBatch( )—Constructor for class
com.oracle.common.internal.net.socketbus.SocketMessageBus.MessageConnection.ReadBatch
SocketMessageBus.MessageConnection.ReadBatch.SharedBufferDisposer—Class in
com.oracle.common.internal.net.socketbus
SharedBufferDisposer disposes the shared buffer by first trying to add it to the reusable buffer reference in ReadBatch.
SocketMessageBus.MessageConnection. Read Batch. Shared BufferDisposer( )—Constructor for class
com.oracle.common.internal.net.socketbus.SocketMessageBus.MessageConnection.ReadBatch.SharedBufferDisposer
SocketMessageBus.MessageConnection.ReadBatch.TaskEvent—Class in
com.oracle.common.internal.net.socketbus
TaskEvent is a wrapper around a normal event, but utilizes the mandatory dispose( ) call to run a number of tasks on behalf of the bus, hopefully from the application rather then the bus thread.
SocketMessageBus.MessageConnection.ReadBatch.TaskEvent(Event, Runnable . . . )—Constructor for class
com.oracle.common.internal.net.socketbus.SocketMessageBus.MessageConnection.ReadBatch.TaskEvent
SocketProvider—Interface in com.oracle.common.net
SocketProvider defines an interface for creating sockets.
Sockets—Class in com.oracle.common.net
Sockets provides static helper methods related to sockets.
Sockets( )—Constructor for class com.oracle.common.net.Sockets
SocketSettings—Class in com.oracle.common.net
SocketSettings provides a means to configure the various aspects of Sockets.
SocketSettings( )—Constructor for class com.oracle.common.net.SocketSettings
Construct an empty SocketOptions configuration.
SocketSettings(SocketOptions)—Constructor for class
com.oracle.common.net.SocketSettings
Construct a SocketOptions configuration based upon the supplied options.
SSLSelectorProvider—Class in com.oracle.common.internal.net.ssl
SSLSelectorProvider is a provider of Selectors for SSL based channels.
SSLSelectorProvider(SelectorProvider)—Constructor for class
com.oracle.common.internal.net.ssl.SSLSelectorProvider
SSLServerSocket—Class in com.oracle.common.internal.net.ssl
Wrapper server socket implementation that performs hostname verification during connect.
SSLServerSocket(ServerSocket, SSLSocketProvider)—Constructor for class
com.oracle.common.internal.net.ssl.SSLServerSocket
Create a new SSLServerSocket that delegates all operations to the given server socket.
SSLServerSocketChannel—Class in com.oracle.common.internal.net.ssl
SSLServerSocketChannel is a ServerSocketChannel which accepts SSL clients and returns SSLSocketChannels.
SSLServerSocketChannel(ServerSocketChannel, SSLSocketProvider)—Constructor for class
com.oracle.common.internal.net.ssl.SSLServerSocketChannel
Construct an SSLServerSocketChannel which wraps an un-secured ServerSocketChannel.
SSLSocket—Class in com.oracle.common.internal.net.ssl
Wrapper socket implementation that performs hostname verification during connect.
SSLSocket(Socket, SSLSocketProvider)—Constructor for class
com.oracle.common.internal.net.ssl.SSLSocket
Create a new SSLSocket that delegates all operations to the given socket.
SSLSocketChannel—Class in com.oracle.common.internal.net.ssl
SSLSocketChannel layers SSL security onto an existing un-secured Socket.
SSLSocketChannel(SocketChannel, SSLSocketProvider)—Constructor for class
com.oracle.common.internal.net.ssl.SSLSocketChannel
Construct an SSLSocketChannel which layers SSL protection onto the provided channel.
SSLSocketChannel.SSLSelectionKey—Class in com.oracle.common.internal.net.ssl
An SSL aware SelectionKey.
SSLSocketChannel.SSLSelectionKey(WrapperSelector, SelectionKey, Object)—Constructor for class com.oracle.common.internal.net.ssl.SSLSocketChannel.SSLSelectionKey
SSLSocketProvider—Class in com.oracle.common.net
SocketProvider that produces instances of socket and channel implementations which utilize SSL.
SSLSocketProvider( )—Constructor for class com.oracle.common.net.SSLSocketProvider
Construct an SSLSocketProvider.
SSLSocketProvider(SSLSocketProvider.Dependencies)—Constructor for class
com.oracle.common.net.SSLSocketProvider
Construct an SSLSocketProvider.
SSLSocketProvider.DefaultDependencies—Class in com.oracle.common.net
DefaultDependenceis is a basic implementation of the Dependencies interface providing "setter" methods for each property.
SSLSocketProvider.DefaultDependencies( )—Constructor for class
com.oracle.common.net.SSLSocketProvider.DefaultDependencies
Construct a DefaultDependencies object.
SSLSocketProvider. DefaultDependencies(SSLSocketProvider. Dependencies)—Constructor for class com.oracle.common.net.SSLSocketProvider.DefaultDependencies
Construct a DefaultDependencies object copying the values from the specified dependencies object
SSLSocketProvider.Dependencies—Interface in com.oracle.common.net
Dependencies specifies all dependency requirements of the SSLSocketProvider.
start( )—Method in class com.oracle.common.net.exabus.util.MessageBusTest.EventProcessor
subList(int, int)—Method in class com.oracle.common.collections.ConverterCollections.ConverterList
subMap(TK, TK)—Method in class com.oracle.common.collections.ConverterCollections.ConverterSortedMap
subSet(T, T)—Method in class com.oracle.common.collections.ConverterCollections.ConverterSortedSet
SUFFIXES—Variable in enum com.oracle.common.util.Duration.Magnitude
The suffixes that for the Duration.Magnitude.
tailMap(TK)—Method in class com.oracle.common.collections.ConverterCollections.ConverterSortedMap
tailSet(T)—Method in class com.oracle.common.collections.ConverterCollections.ConverterSortedSet
TCP_MEMORY_BUS_PROTOCOL—Static variable in class com.oracle.common.net.exabus.util.SimpleDepot
Protocol name for the TCP memory bus.
TCP_MESSAGE_BUS_PROTOCOL—Static variable in class com.oracle.common.net.exabus.util.SimpleDepot
Protocol name for the TCP message bus.
TCP_SECURE_MEMORY_BUS_PROTOCOL—Static variable in class com.oracle.common.net.exabus.util.SimpleDepot
Protocol name for the SSL protected TCP memory bus.
TCP_SECURE_MESSAGE_BUS_PROTOCOL—Static variable in class com.oracle.common.net.exabus.util.SimpleDepot
Protocol name for the SSL protected TCP message bus.
TCP_SECURE_SOCKET_BUS—Static variable in class com.oracle.common.net.exabus.util.SimpleDepot
Driver name for Secure TCP Socket Bus.
TCP_SOCKET_BUS—Static variable in class com.oracle.common.net.exabus.util.SimpleDepot
Driver name for TCP Socket Bus.
TcpSocketProvider—Class in com.oracle.common.net
TcpSocketProvider produces standard TCP sockets.
TcpSocketProvider( )—Constructor for class com.oracle.common.net.TcpSocketProvider
ThreadLocalRandom—Class in com.oracle.common.util
This is an implementation of a highly concurrent Random.
ThreadLocalRandom( )—Constructor for class com.oracle.common.util.ThreadLocalRandom
toArray( )—Method in class com.oracle.common collections. ConverterCollections.ConverterCollection
toArray(E[ ])—Method in class com.oracle.common collections. ConverterCollections.ConverterCollection
toArray( )—Method in class com.oracle.common.collections.ConverterCollections.ConverterEntrySet
toArray(T[ ])—Method in class com.oracle.common.collections.ConverterCollections.ConverterEntrySet
toArray( )—Method in class com.oracle.common.collections.UnmodifiableSetCollection
toArray(T[ ])—Method in class com.oracle.common.collections.UnmodifiableSetCollection
toBits(long)—Method in enum com.oracle.common.io.Bandwidth.Rate
Convert the specified number of units of this Bandwidth.Rate into a bits Bandwidth.Rate.
toBufferSequence( )—Method in class com.oracle.common.io.BufferSequenceOutputStream
Close the stream and return its contents as a BufferSequence.
toString( )—Method in class com.oracle.common collections. ConverterCollections.AbstractConverterEntry
toString( )—Method in class com.oracle.common.collections.ConverterCollections.ConverterCollection
Return a String description for this collection.
toString( )—Method in class com.oracle.common.collections.ConverterCollections.ConverterEntrySet
toString( )—Method in class com.oracle.common.collections.ConverterCollections.ConverterMap
toString( )—Method in class com.oracle.common.internal.io.WrapperBufferManager
toString( )—Method in class com.oracle.common.internal.net.DemultiplexedSocketProvider
toString( )—Method in class com.oracle.common.internal.net.MultiplexedSocketProvider.MultiplexedSelector
toString( )—Method in class com.oracle.common.internal.net.RunnableSelectionService
toString( )—Method in class com.oracle.common.internal, net.socketbus.AbstractSocketBus. Connection
toString( )—Method in class com.oracle.common.internal.net.socketbus.AbstractSocketBus
toString( )—Method in class com.oracle.common.internal, net.socketbus.MultiBufferMessageEvent
toString( )—Method in class com.oracle.common.internal.net.socketbus.SingleBufferMessageEvent
toString( )—Method in class com.oracle.common.internal.net.socketbus.SocketMessageBus.MessageConnection.ReadBatch.TaskEvent
toString( )—Method in class com.oracle.common.internal.net.ssl.SSLServerSocket
toString( )—Method in class com.oracle.common.internal.net.ssl.SSLSocket
toString( )—Method in class com.oracle.common.internal.net.ssl.SSLSocketChannel.SSLSelectionKey
toString( )—Method in class com.oracle.common.internal.net.ssl.SSLSocketChannel
toString( )—Method in class com.oracle.common.internal.net.WrapperSelector.WrapperSelectionKey
toString( )—Method in class com.oracle.common.internal.net.WrapperServerSocket toString( )—Method in class com.oracle.common.internal.net.WrapperSocket
toString(boolean)—Method in class com.oracle.common.io.Bandwidth
Obtains a String representation of the Bandwidth (in {@link Rate#BITS).
toString( )—Method in class com.oracle.common.io.Bandwidth
toString(ByteBuffer)—Static method in class com.oracle.common.io.Buffers
Return a String containing the remaining contents of the specified ByteBuffer.
toString(boolean)—Method in class com.oracle.common.io.MemorySize
Obtains a String representation of the MemorySize using the most appropriate
MemorySize.Magnitude to simplify the representation.
toString( )—Method in class com.oracle.common.io.MemorySize
toString( )—Method in class com.oracle.common.net.exabus.util.SimpleEvent
toString( )—Method in class com.oracle.common.net.exabus.util.UrlEndPoint
toString( )—Method in class com.oracle.common.net.InetSocketAddress32
Constructs a string representation of this InetSocketAddress32.
toString( )—Method in class com.oracle.common.net.SocketSettings
toString( )—Method in class com.oracle.common.net.SSLSocketProvider.DefaultDependencies
toString( )—Method in class com.oracle.common.net.SSLSocketProvider
toString(boolean)—Method in class com.oracle.common.util.Duration
Obtains a String representation of the Duration using the most appropriate
Duration.Magnitude to simplify the representation.
toString( )—Method in class com.oracle.common.util.Duration
truncate(ByteBuffer)—Method in class com.oracle.common.internal.io.AbstractBufferManager
Truncate a formerly allocated buffer, returning a buffer whose size more closely matches the amount of space used (as indicated by Buffer.remaining( )) in the specified buffer.
truncate(ByteBuffer)—Method in class com.oracle.common.internal.io.CheckedBufferManager
Truncate a formerly allocated buffer, returning a buffer whose size more closely matches the amount of space used (as indicated by Buffer.remaining( )) in the specified buffer.
truncate(ByteBuffer)—Method in class com.oracle.common.internal.io.SegmentedBufferManager
truncate(ByteBuffer)—Method in class com.oracle.common.internal.io.WrapperBufferManager
Truncate a formerly allocated buffer, returning a buffer whose size more closely matches the amount of space used (as indicated by Buffer.remaining( )) in the specified buffer.
truncate(ByteBuffer)—Method in interface com.oracle.common.io.BufferManager
Truncate a formerly allocated buffer, returning a buffer whose size more closely matches the amount of space used (as indicated by Buffer.remaining( )) in the specified buffer.
UnmodifiableSetCollection<E>—Class in com.oracle.common.collections
UnmodifiableSetCollection is a wrapper set that provides a read-only view of the underlying Sets.
UnmodifiableSetCollection(Set<E> . . . )—Constructor for class com.oracle.common.collections.UnmodifiableSetCollection
Construct a UnmodifiableSetCollection
UrlEndPoint—Class in com.oracle.common.net.exabus.util
UrlEndPoint is an EndPoint formatted using URL like syntax.
UrlEndPoint(String, SocketProvider, Hasher<? super SocketAddress>)—Constructor for class com.oracle.common.net.exabus.util.UrlEndPoint
Construct a SocketEndPoint.
validate( )—Method in class com.oracle.common.internal.net.MultiplexedSocketProvider.DefaultDependencies
Validate the dependencies object.
validate( )—Method in class com.oracle.common.internal.net.socketbus.SocketBusDriver.DefaultDependencies
Validate the supplied dependencies.
validate( )—Method in class com.oracle.common.net.exabus.util.SimpleDepot.DefaultDependencies
Validate the supplied dependencies.
validate( )—Method in class com.oracle.common.net.SSLSocketProvider.DefaultDependencies
Validate the dependencies.
validateAssociated(Associated)—Method in class com.oracle.common.base.NaturalAssociator
Check if given Associated object generates a circular association.
validatePeer( )—Method in class com.oracle.common.internal.net.ssl.SSLSocketChannel
Validate that the connected peer acceptable.
valueOf(String)—Static method in enum com.oracle.common.internal.net.MultiplexedSocketProvider.WellKnownSubPorts
Returns the enum constant of this type with the specified name.
valueOf(String)—Static method in enum com.oracle.common.internal.net.socketbus.AbstractSocketBus.BusState
Returns the enum constant of this type with the specified name.
valueOf(String)—Static method in enum com.oracle.common.internal.net.socketbus.AbstractSocketBus.ConnectionState
Returns the enum constant of this type with the specified name.
valueOf(String)—Static method in enum com.oracle.common.internal.net.socketbus.AbstractSocketBus.HandshakePhase
Returns the enum constant of this type with the specified name.
valueOf(String)—Static method in enum com.oracle.common.io.Bandwidth.Magnitude
Returns the enum constant of this type with the specified name.
valueOf(String)—Static method in enum com.oracle.common.io.Bandwidth.Rate
Returns the enum constant of this type with the specified name.
valueOf(String)—Static method in enum com.oracle.common.io.MemorySize.Magnitude Returns the enum constant of this type with the specified name.
valueOf(String)—Static method in enum com.oracle.common.net.exabus.Event.Type
Returns the enum constant of this type with the specified name.
valueOf(String)—Static method in enum com.oracle.common.util.Duration.Magnitude
Returns the enum constant of this type with the specified name.
values( )—Method in class com.oracle.common.collections.ConverterCollections.ConverterMap
values( )—Static method in enum com.oracle.common.internal.net.MultiplexedSocketProvider.WellKnownSubPorts
Returns an array containing the constants of this enum type, in the order they are declared.
values( )—Static method in enum com.oracle.common.internal.net.socketbus.AbstractSocketBus.BusState
Returns an array containing the constants of this enum type, in the order they are declared.
values( )—Static method in enum com.oracle.common.internal.net.socketbus.AbstractSocketBus.ConnectionState
Returns an array containing the constants of this enum type, in the order they are declared.
values( )—Static method in enum com.oracle.common.internal.net.socketbus.AbstractSocketBus.HandshakePhase
Returns an array containing the constants of this enum type, in the order they are declared.
values( )—Static method in enum com.oracle.common.io.Bandwidth.Magnitude
Returns an array containing the constants of this enum type, in the order they are declared.
values( )—Static method in enum com.oracle.common.io.Bandwidth.Rate
Returns an array containing the constants of this enum type, in the order they are declared.
values( )—Static method in enum com.oracle.common.io.MemorySize.Magnitude
Returns an array containing the constants of this enum type, in the order they are declared.
values( )—Static method in enum com.oracle.common.net.exabus.Event.Type
Returns an array containing the constants of this enum type, in the order they are declared.
values( )—Static method in enum com.oracle.common.util.Duration.Magnitude
Returns an array containing the constants of this enum type, in the order they are declared.
verifyEndPoint(EndPoint)—Method in class com.oracle.common.internal.net.socketbus.AbstractSocketBus
Verify that the supplied EndPoint is a InetSocketEndPoint.
verifySDP( )—Static method in class com.oracle.common.net.SdpSocketProvider
Verify that an SDP socket implementation is available.
verifyState(AbstractSocketBus.BusState)—Method in class com.oracle.common.internal.net.socketbus.AbstractSocketBus
Verify that the bus is in a given state.
VolatileHolder<V>—Class in com.oracle.common.base
VolatileHolder is a basic implementation of the Holder interface where the held object is referenced from a volatile reference.
VolatileHolder( )—Constructor for class com.oracle.common.base.VolatileHolder
Construct a VolatileHolder with no value.
VolatileHolder(V)—Constructor for class com.oracle.common.base.VolatileHolder
Construct a VolatileHolder with an initial value.
wakeup( )—Method in class com.oracle.common.internal, net.socketbus.AbstractSocketBus. Connection
Force the SelectionService to process this channel.
wakeup( )—Method in class com.oracle.common.internal.net.WrapperSelector
warnBufferSize(Object, String, int, int)—Static method in class com.oracle.common.net.Sockets
Issue a warning regarding an undersized socket buffer.
warnReuseAddr(boolean)—Static method in class com.oracle.common.net.Sockets
Issue a warning regarding overrideing SO_REUSEADDR
WELL_KNOWN_SUB_PORT_END—Static variable in class com.oracle.common.internal.net.MultiplexedSocketProvider
The end of the well-known sub-port range.
wrapEntry(Map.Entry<FK, FV>)—Method in class com.oracle.common.collections.ConverterCollections.ConverterEntrySet
Wrap an Entry from the Entry Set to make a Converter Entry.
wrapIterator(Iterator<Map.Entry<FK, FV>>)—Method in class com.oracle.common.collections.ConverterCollections.ConverterEntrySet
Wrap an Iterator from the Entry Set to make a Converter Iterator.
WrapperBufferManager—Class in com.oracle.common.internal.io
WrapperBufferManager is a BufferManager wrapper.
WrapperBufferManager(BufferManager)—Constructor for class com.oracle.common.internal.io.WrapperBufferManager
Create a new WrapperBufferManager.
WrapperSelector—Class in com.oracle.common.internal.net
WrapperSelector is a Selector implementation which delegates all calls to a delegate Selector.
WrapperSelector(Selector, SelectorProvider)—Constructor for class com.oracle.common.internal.net.WrapperSelector
Construct a WrapperSelector
WrapperSelector.KeySet—Class in com.oracle.common.internal.net
A layered set implementation used for key sets.
WrapperSelector.KeySet(Set)—Constructor for class com.oracle.common.internal.net.WrapperSelector.KeySet
WrapperSelector.WrapperSelectableChannel—Interface in com.oracle.common.internal.net
An interface to be implemented by all channels which will be selectable using this Selector.
WrapperSelector.WrapperSelectionKey—Class in com.oracle.common.internal.net
WraperSelectionKey which delegates to a real Selection Key.

WrapperSelector.WrapperSelectionKey(WrapperSelector, Selection Key, Object)—Constructor for class com.oracle.common.internal.net.WrapperSelector.WrapperSelectionKey
WrapperServerSocket—Class in com.oracle.common.internal.net
　Wrapper server socket which delegates all operations to a delegate socket.
WrapperServerSocket(ServerSocket)—Constructor for class com.oracle.common.internal.net.WrapperServerSocket
　Create a new ServerSocket that delegates all operations to the given server socket.
WrapperServerSocketChannel—Class in com.oracle.common.internal.net
　Wrapper ServerSocketChannel implementation that delegates all operations to a delegate ServerSocketChannel.
WrapperServerSocketChannel(ServerSocketChannel, SelectorProvider)—Constructor for class com.oracle.common.internal.net.WrapperServerSocketChannel
WrapperSocket—Class in com.oracle.common.internal.net
　Wrapper socket implementation that delegates all operations to a delegate socket.
WrapperSocket(Socket)—Constructor for class com.oracle.common.internal.net.WrapperSocket
　Create a new Socket that delegates all operations to the given socket.
WrapperSocketChannel—Class in com.oracle.common.internal.net
　Wrapper SocketChannel implementation that delegates all operations to a delegate SocketChannel.
WrapperSocketChannel(SocketChannel, SelectorProvider)—Constructor for class com.oracle.common.internal.net.WrapperSocketChannel
wrapSocket(Socket)—Method in class com.oracle.common.internal.net.DemultiplexedSocketProvider.DemultiplexedSocketChannel
wrapSocket(Socket)—Method in class com.oracle.common.internal.net.MultiplexedSocketProvider.MultiplexedSocketChannel
　Produce a wrapper around the specified socket.
wrapSocket(Socket, boolean)—Method in class com.oracle.common.internal.net.ssl.SSLSocket
　Wrap the supplied plain Socket as an SSLSocket.
wrapSocket(Socket)—Method in class com.oracle.common.internal.net.ssl.SSLSocketChannel
　Produce a wrapper around the specified socket.
wrapSocket(ServerSocket)—Method in class com.oracle.common.internal.net.WrapperServerSocketChannel
　Produce a wrapper around the specified socket.
wrapSocket(Socket)—Method in class com.oracle.common.internal.net.WrapperSocketChannel
　Produce a wrapper around the specified socket.
write(ByteBuffer)—Method in class com.oracle.common.internal.net.MultiplexedSocketProvider.MultiplexedSocketChannel
write(ByteBuffer[ ], int, int)—Method in class com.oracle.common.internal.net.MultiplexedSocketProvider.MultiplexedSocketChannel
write(ByteBuffer[ ], int, int)—Method in class com.oracle.common.internal, net.socketbus.AbstractSocketBus.Connection
write(ByteBuffer[ ])—Method in class com.oracle.common.internal, net.socketbus.AbstractSocketBus.Connection
write(ByteBuffer)—Method in class com.oracle.common.internal, net.socketbus.AbstractSocketBus.Connection
write( )—Method in class com.oracle.common.internal.net.socketbus.BufferedSocketBus.BufferedConnection.WriteBatch
　Attempt to write the batch to the connection.
write(ByteBuffer)—Method in class com.oracle.common.internal.net.ssl.SSLSocketChannel
write(ByteBuffer[ ], int, int)—Method in class com.oracle.common.internal.net.ssl.SSLSocketChannel
write(ByteBuffer)—Method in class com.oracle.common.internal.net.WrapperSocketChannel
write(ByteBuffer[ ], int, int)—Method in class com.oracle.common.internal.net.WrapperSocketChannel
write(int)—Method in class com.oracle.common.io.BufferSequenceOutputStream
write(byte[ ], int, int)—Method in class com.oracle.common.io.BufferSequenceOutputStream
write(EndPoint, long, BufferSequence, Object)—Method in interface com.oracle.common.net.exabus.MemoryBus
　Request a write into the peer's memory from the specified BufferSequence.
writeBoolean(boolean)—Method in class com.oracle.common.io.BufferSequenceOutputStream
writeByte(int)—Method in class com.oracle.common.io.BufferSequenceOutputStream
writeBytes(String)—Method in class com.oracle.common.io.BufferSequenceOutputStream
writeChar(int)—Method in class com.oracle.common.io.BufferSequenceOutputStream
writeChars(String)—Method in class com.oracle.common.io.BufferSequenceOutputStream
writeDouble(double)—Method in class com.oracle.common.io.BufferSequenceOutputStream
writeEncrypted( )—Method in class com.oracle.common.internal.net.ssl.SSLSocketChannel
　Attempt to write the contents the outbound buffer to the network.
writeFloat(float)—Method in class com.oracle.common.io.BufferSequenceOutputStream
writeInt(int)—Method in class com.oracle.common.io.BufferSequenceOutputStream
writeInternal(ByteBuffer[ ], int, int)—Method in class com.oracle.common.internal.net.ssl.SSLSocketChannel
　Attempt to read into the supplied buffers as per the general contract of GatheringChannel.write.
writeLong(long)—Method in class com.oracle.common.io.BufferSequenceOutputStream
writeShort(int)—Method in class com.oracle.common.io.BufferSequenceOutputStream
writeUTF(String)—Method in class com.oracle.common.io.BufferSequenceOutputStream

What is claimed is:

1. A method for using a message bus implementation and messaging API that enables messaging within a computing appliance utilizing a communication fabric, said communication fabric connecting one or more processor nodes in, and application environments executing on, said computing appliance, the one or more processor nodes having a sender and a receiver executing thereon that support one or more application environments, said method comprising:

receiving, via the messaging API, a request from a sender's application environment to communicate message data to a receiver's application environment;

storing the message data at a memory space location at the sender;

communicating a notification to the receiver providing the location of the message data in the sender's memory space, the communicating including executing a send operation at the sender that initiates a write operation and an allocation of memory space at the receiver;

requesting by the receiver that the message data be retrieved from its location at the sender, by initiating a read operation at the receiver to copy the message data to the receiver's memory space; and acknowledging, to the sender's application environment, receipt of the message data at the receiver, asynchronously with providing the message data to the receiver's application environment.

2. The method of claim 1, wherein the messaging API uses remote direct memory access (RDMA).

3. The method of claim 2, wherein the messaging API uses RDMA to
receive the send operation for the message data,
schedule the write operation as an RDMA write operation and release the send operation, and
asynchronously schedule the read operation as an RDMA read operation and provide a receipt to the sender's application environment.

4. The method of claim 1, whereupon receipt of the request to communicate the message data to the application environment of the receiver, a buffer manager allocates pools of memory within direct byte buffers to store the message data.

5. The method of claim 1, wherein the message bus implementation includes a collector for collecting events as the events occur, and surfacing the events to applications in an application tier.

6. The method of claim 1, wherein the message bus implementation surfaces inbound messages through the use of callbacks that enable a receiving application to be made aware of an inbound message data on a thread.

7. The method of claim 1, wherein the method is performed by the computing appliance comprising the one or more processor nodes, and the sender and the receiver executing thereon that support the one or more application environments.

8. A system for using a message bus implementation and messaging API that enables messaging within a computing appliance utilizing a communication fabric, said communication fabric connecting one or more processor nodes in, and application environments executing on, said computing appliance, the one or more processor nodes having a sender and a receiver executing thereon that support one or more application environments, said system comprising:
the one or more processor nodes; and
wherein the system is configured to:
receive a request from the application environment of the sender to communicate message data to the application environment of the receiver;
allocate space in a memory of the sender and storing the message data in the allocated memory space;
communicate a notification to the receiver providing the location of the message data in the allocated memory space, the communicating including executing a send operation at the sender that initiates a write operation at the receiver; and request by the receiver that the message data be retrieved from the location at the sender by initiating a read operation at the receiver to copy the message data to memory of the receiver; and
wherein copying the message data from the sender to the receiver is carried out asynchronously with providing the message data to-receiver's application environment.

9. The system of claim 8, wherein the messaging API uses remote direct memory access (RDMA).

10. The system of claim 9, wherein the messaging API uses RDMA to
receive the send operation for the message data,
schedule the write operation as an RDMA write operation and release the send operation, and
asynchronously schedule the read operation as an RDMA read operation and provide a receipt to the sender's application environment.

11. The system of claim 8, whereupon receipt of the request to communicate the message data to the application environment of the receiver, pools of memory within direct byte buffers are allocated by a buffer manager to store the message data.

12. The system of claim 8, wherein the message bus implementation includes a collector for collecting events as the events occur, and surfacing the events to applications in an application tier.

13. The system of claim 8, wherein the message bus implementation surfaces inbound messages through the use of callbacks that enable a receiving application to be made aware of an inbound message data on a thread.

14. A system comprising:
a first processor node;
a second processor node; and
a communication fabric connecting the first and second processor nodes, wherein
the first processor node has a first messaging application program interface (API),
the second processor node has a second messaging API,
the first and second messaging APIs enable
the first processor node to issue a request to communicate a message data to the second processor node,
the first processor node to store the message data in a memory of the first processor node,
the first processor node to communicate a notification to the second processor node providing the location of the message data, the communicating including executing a send operation at the first processor node that initiates a write operation at the second processor node and an allocation of memory space at the second processor node, and
the second processor node to copy the message data from the first processor node to the second processor node by initiating a read operation at the second processor node,
wherein an acknowledgement of the copying of the message data is provided to an application environment at the first processing node asynchronously with providing the message data to an application environment at the second processor node.

15. The system of claim 14, wherein the first and second messaging APIs use remote direct memory access (RDMA).

16. The system of claim 15, wherein the first and second messaging APIs use RDMA to
receive the send operation for the message data,
schedule the write operation as an RDMA write operation and release the send operation, and asynchronously schedule the read operation as an RDMA read operation and provide a receipt to the sender's application environment.

17. The system of claim 14, whereupon receipt of the request to communicate the message data to the application environment of the second processor node, a buffer manager allocates pools of memory within direct byte buffers to store the message data.

18. The system of claim 14, wherein the system is included within a computing appliance utilizing the communication fabric, said communication fabric connecting the first and second processor nodes and the application environments executing thereon.

19. The system of claim 14, wherein the system includes a message bus implementation that includes a collector for collecting events as the events occur, and surfacing the events to applications in an application tier.

20. The system of claim 19, wherein the message bus implementation surfaces inbound messages through the use of callbacks that enable a receiving application to be made aware of an inbound message data on a thread.

\* \* \* \* \*